United States Patent
Sorvari et al.

(10) Patent No.: US 7,570,943 B2
(45) Date of Patent: Aug. 4, 2009

(54) SYSTEM AND METHOD FOR PROVIDING CONTEXT SENSITIVE RECOMMENDATIONS TO DIGITAL SERVICES

(75) Inventors: Antti Sorvari, Itäsalmi (FI); Markus Kähäri, Helsinki (FI); Hannu Toivonen, Helsinki (FI); Heikki Mannila, Espoo (FI); Jukka-Pekka Salmenkaita, Helsinki (FI)

(73) Assignee: Nokia Corporation, Espoo (FI)

( * ) Notice: Subject to any disclaimer, the term of this patent is extended or adjusted under 35 U.S.C. 154(b) by 1017 days.

(21) Appl. No.: 10/230,111

(22) Filed: Aug. 29, 2002

(65) Prior Publication Data

US 2004/0043758 A1 Mar. 4, 2004

(51) Int. Cl.
H04M 3/42 (2006.01)
(52) U.S. Cl. .............. 455/414.1; 455/403; 455/550.1; 379/88.17; 709/219; 709/228
(58) Field of Classification Search .............. 455/414.1, 455/466, 406, 408, 410, 418, 419; 709/219, 709/228; 379/88.17
See application file for complete search history.

(56) References Cited

U.S. PATENT DOCUMENTS

| | | | |
|---|---|---|---|
| 5,396,255 A * | 3/1995 | Durkota et al. .............. 342/360 |
| 5,717,725 A * | 2/1998 | Campana, Jr. ................ 375/347 |
| 5,815,407 A * | 9/1998 | Huffman et al. .............. 702/57 |
| 6,167,255 A * | 12/2000 | Kennedy et al. .......... 455/414.1 |
| 6,182,113 B1 | 1/2001 | Narayanaswami |
| 6,208,839 B1 | 3/2001 | Davani ....................... 455/31.3 |
| 6,285,364 B1 | 9/2001 | Giordano, III et al. ...... 345/347 |
| 6,522,875 B1 | 2/2003 | Dowling et al. ............. 455/414 |
| 6,535,743 B1 * | 3/2003 | Kennedy et al. .......... 455/456.1 |
| 6,547,830 B1 | 4/2003 | Mercer ........................ 715/518 |
| 6,560,640 B2 * | 5/2003 | Smethers .................... 709/219 |
| 6,714,778 B2 * | 3/2004 | Nykanen et al. .......... 455/414.1 |
| 6,782,253 B1 * | 8/2004 | Shteyn et al. ............. 455/414.1 |
| 2001/0013012 A1 * | 8/2001 | Hanaoka et al. ............... 705/14 |
| 2002/0077085 A1 | 6/2002 | Kalish et al. |
| 2002/0147000 A1 * | 10/2002 | Holmes-Kinsella ......... 455/405 |

(Continued)

FOREIGN PATENT DOCUMENTS

EP 0924916 A2 6/1999

(Continued)

OTHER PUBLICATIONS

Rabiner, L.R., "A tutorial on hidden Markov models and selected applications in speech recognition", *Proceedings of the IEEE*, vol. 77, No. 2, 1989, pp. 257-286.

(Continued)

*Primary Examiner*—CongVan Tran
(74) *Attorney, Agent, or Firm*—Ditthavong Mori & Steiner, P.C.

(57) ABSTRACT

A system and method is disclosed to provide recommendations to a wireless device, based on stored bookmark/short-cut data. When a wireless device accesses services, data pertaining to the service access, along with any context related information is transmitted within the wireless device, or to a remote server. The data is processed in conjunction with bookmarks/short-cuts specified within the device, and are organized and presented to the wireless device in accordance with preference instructions specified within the wireless device.

98 Claims, 34 Drawing Sheets

U.S. PATENT DOCUMENTS

| | | | |
|---|---|---|---|
| 2003/0013483 A1* | 1/2003 | Ausems et al. | 455/556 |
| 2003/0036376 A1* | 2/2003 | Annan et al. | 455/406 |
| 2003/0036380 A1* | 2/2003 | Skidmore | 455/414 |
| 2005/0182675 A1* | 8/2005 | Huettner | 705/14 |

FOREIGN PATENT DOCUMENTS

| | | | |
|---|---|---|---|
| EP | 1130883 | A2 | 9/2001 |
| WO | 0067159 | A2 | 11/2000 |

OTHER PUBLICATIONS

Rabiner, et al., "An introduction to hidden Markov models", *IEEE ASSP Magazine*, Jan. 1986, pp. 4-16.

Fraser, et al., "Forecasting Probability Densities by Using Hidden Markov Models with Mixed States", *Time Series Prediction: Forecasting the Future Understanding the Past*, Addison-Wesley, editor Weigend, Andreas S. and Gershenfeld, Neil A., 1994.

Yi-Bing Lin, et al., *Wireless and Mobile Network Architectures*, John Wiley & Sons, 2001.

Jim Geier, *Wireless LANs*, Macmillan Technical Publishing, 1999.

Heather Williamson, *XML: The Complete Reference*, Osborne/McGraw-Hill, 2001.

Elliotte Harold, et al, *XML In A Nutshell*, O'Reilly & Associates, 2001.

Bruce Schneier, entitled *Applied Cryptography—2nd Edition* published by John Wiley and Sons, 1996.

Richard E. Smith, *Internet Cryptography*, Addison Wesley, 1997.

Charniak, Eugene, *Statistical Language Learning*, MIT Press, Cambridge, Massachusetts, 1993.

Ed Roman, entitled *Mastering Enterprise Java Beans*, published by John Wiley and Sons, 1999.

Matthew Reynolds, entitled *Beginning E-Commerce*, Wrox Press Inc., 2000, (ISBN: 1861003986).

Fields, et al. entitled *Web Development with Java Server Pages*, published by Manning Publications Co., 2000.

International Search Report mailed on Jan. 13, 2004, in corresponding International Application No. PCT/IB03/03575.

EP Search Report (May 6, 2006).

* cited by examiner

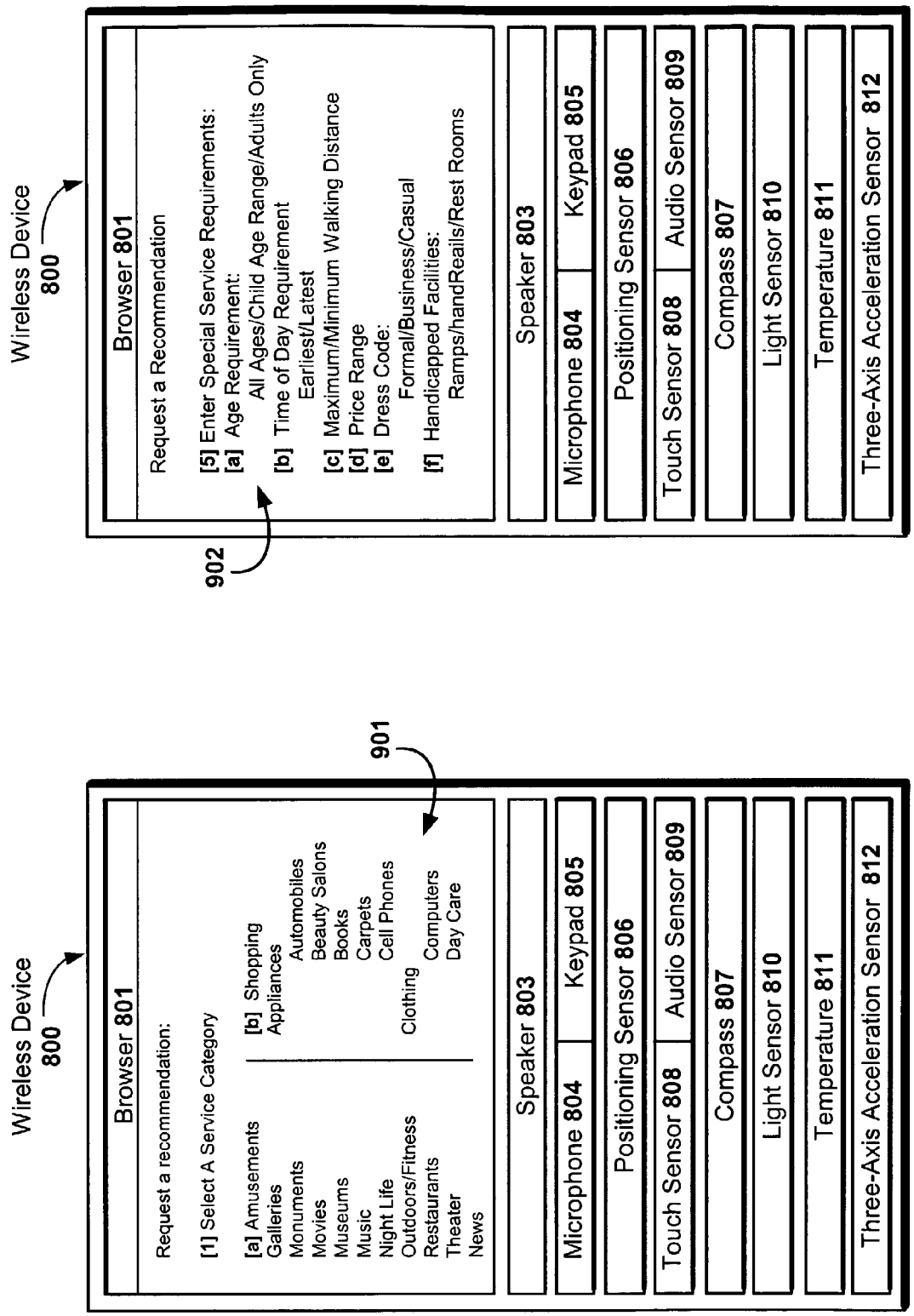

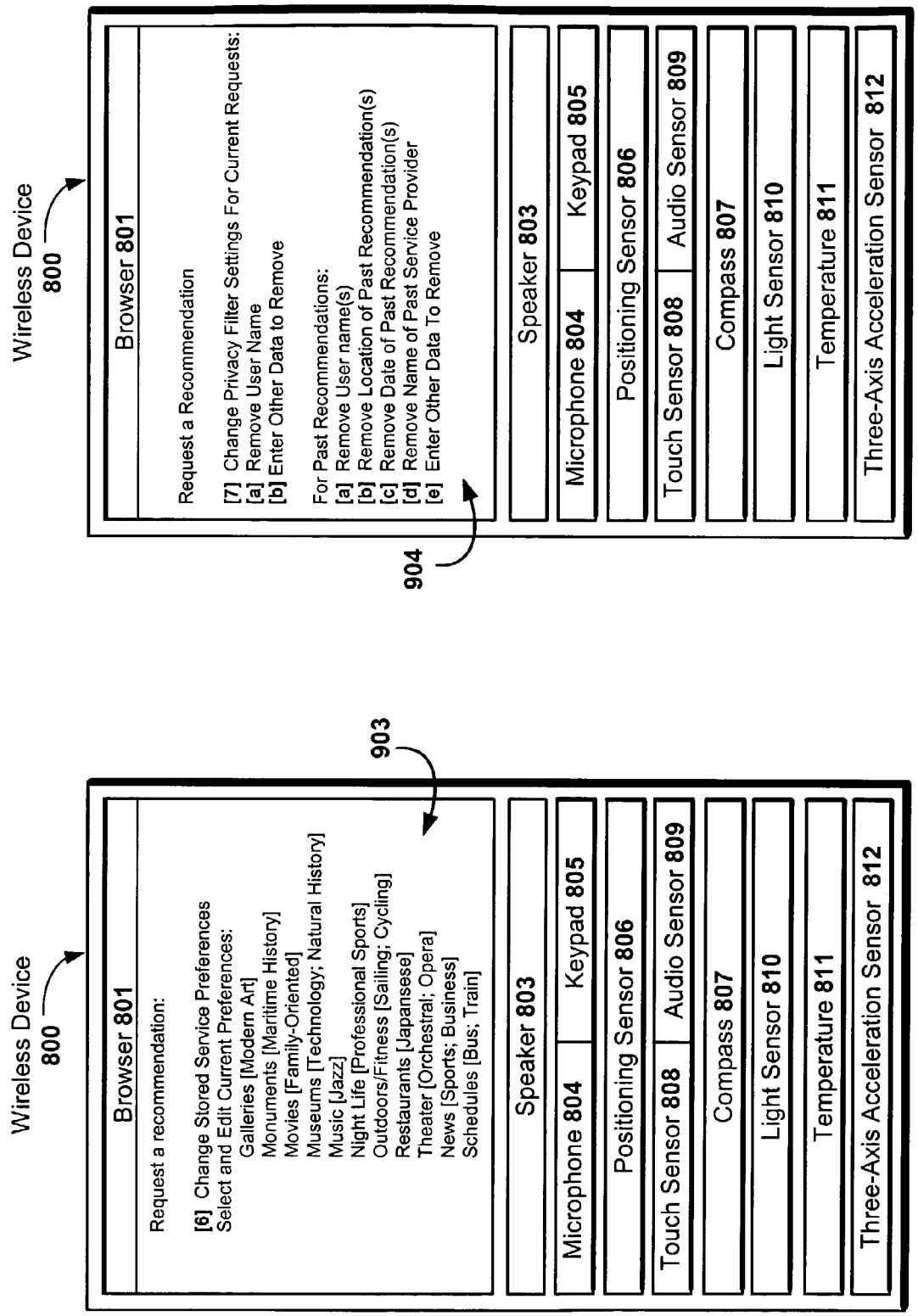

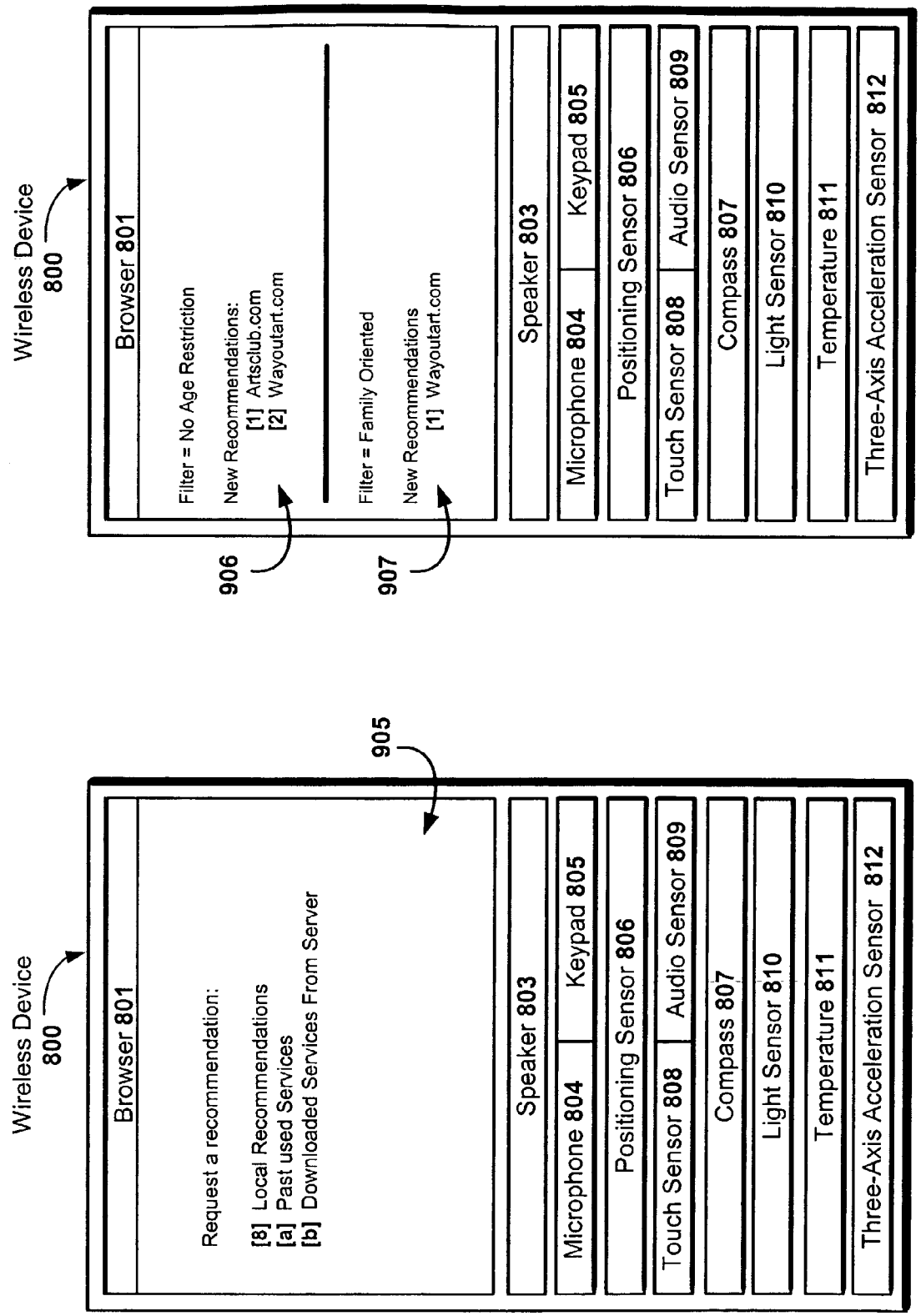

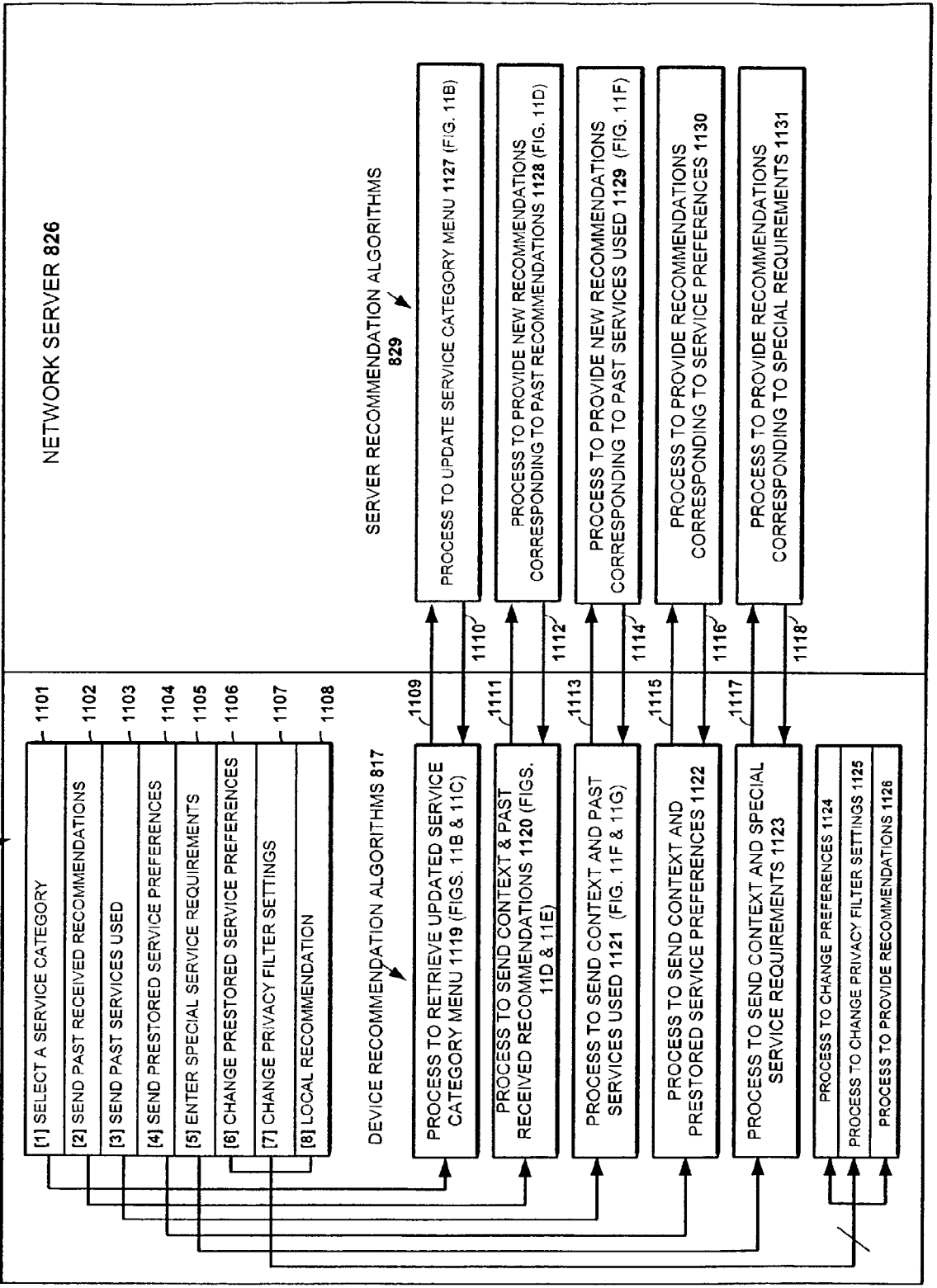
Figure 11A Wireless Device 800

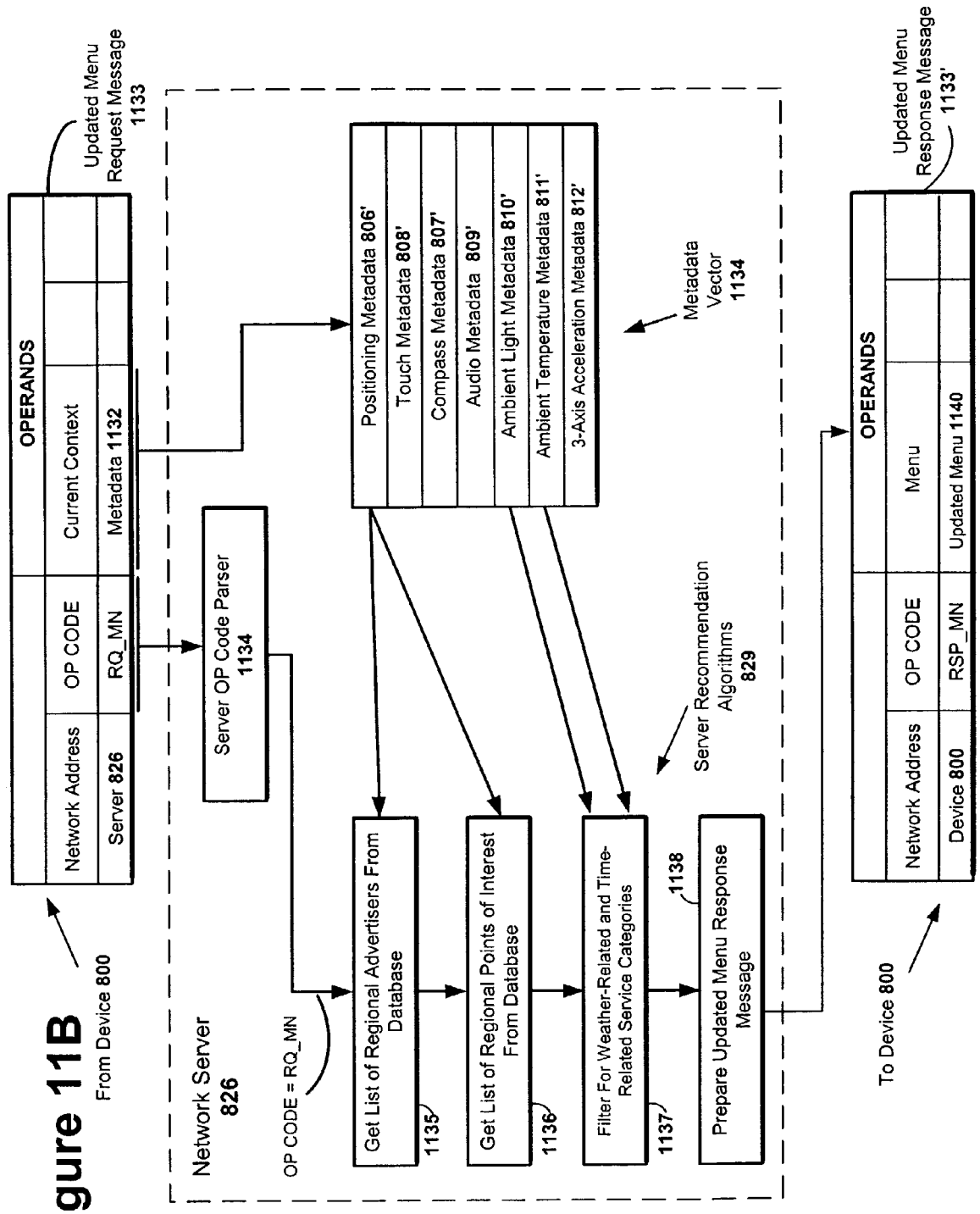

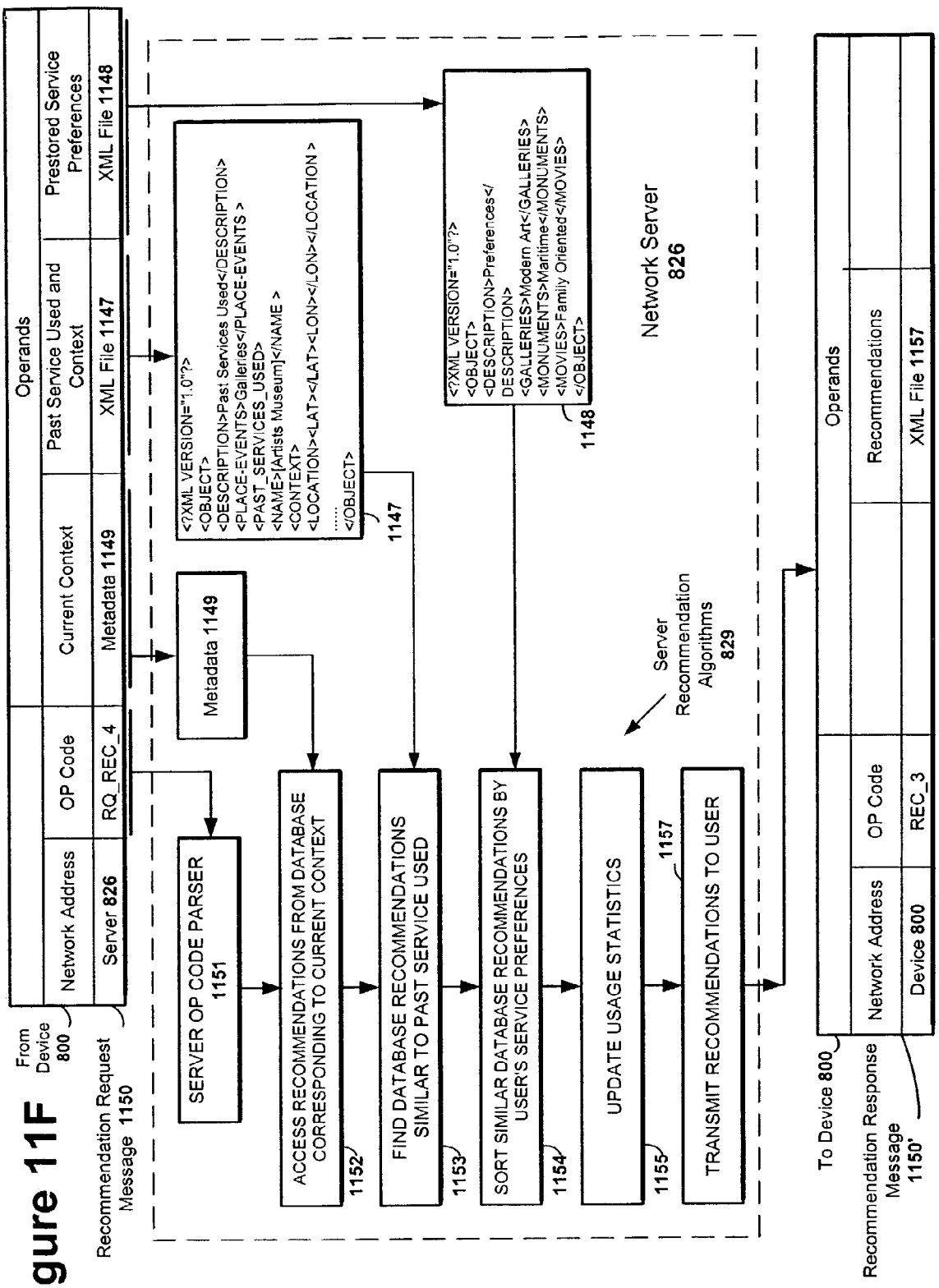

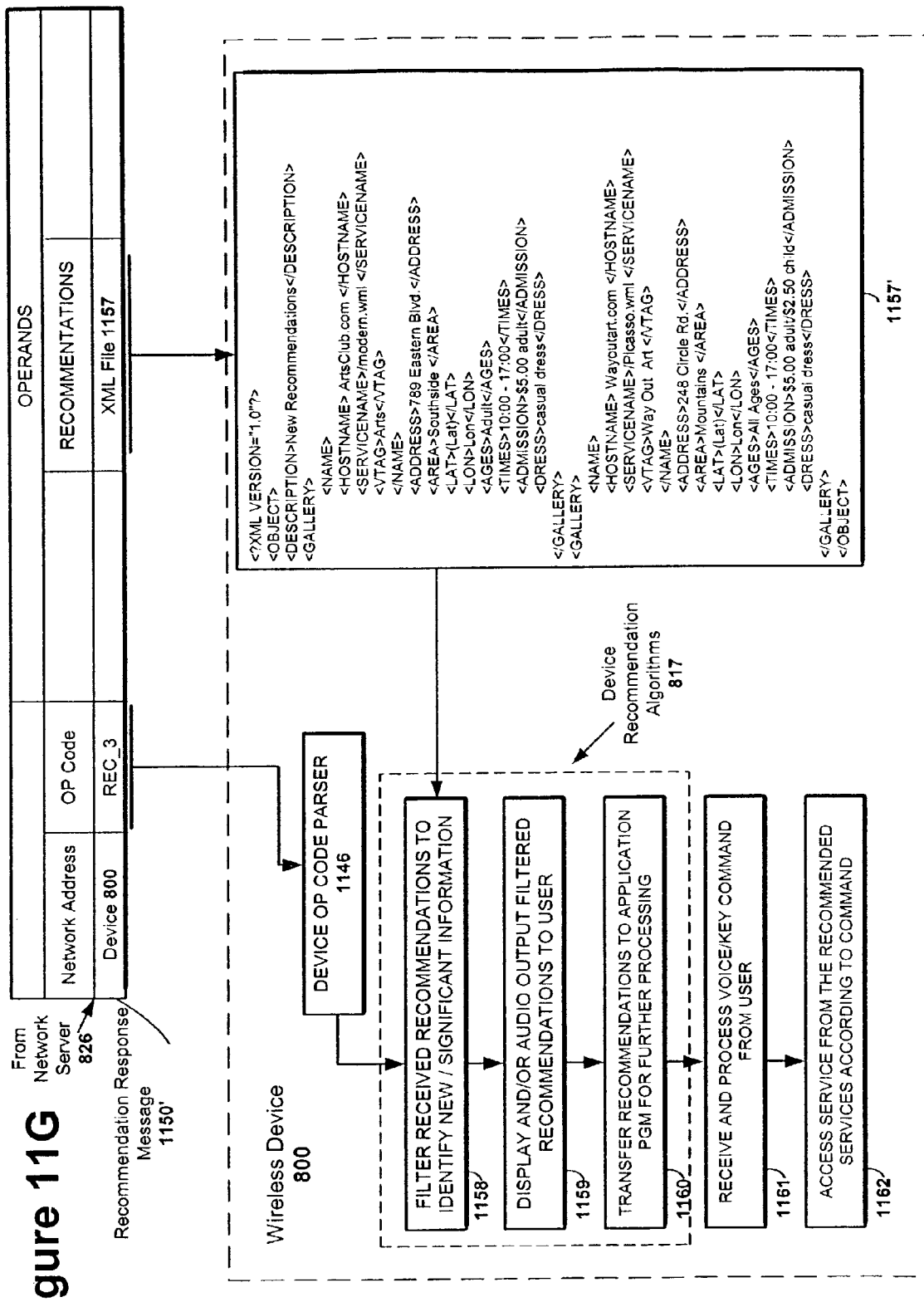

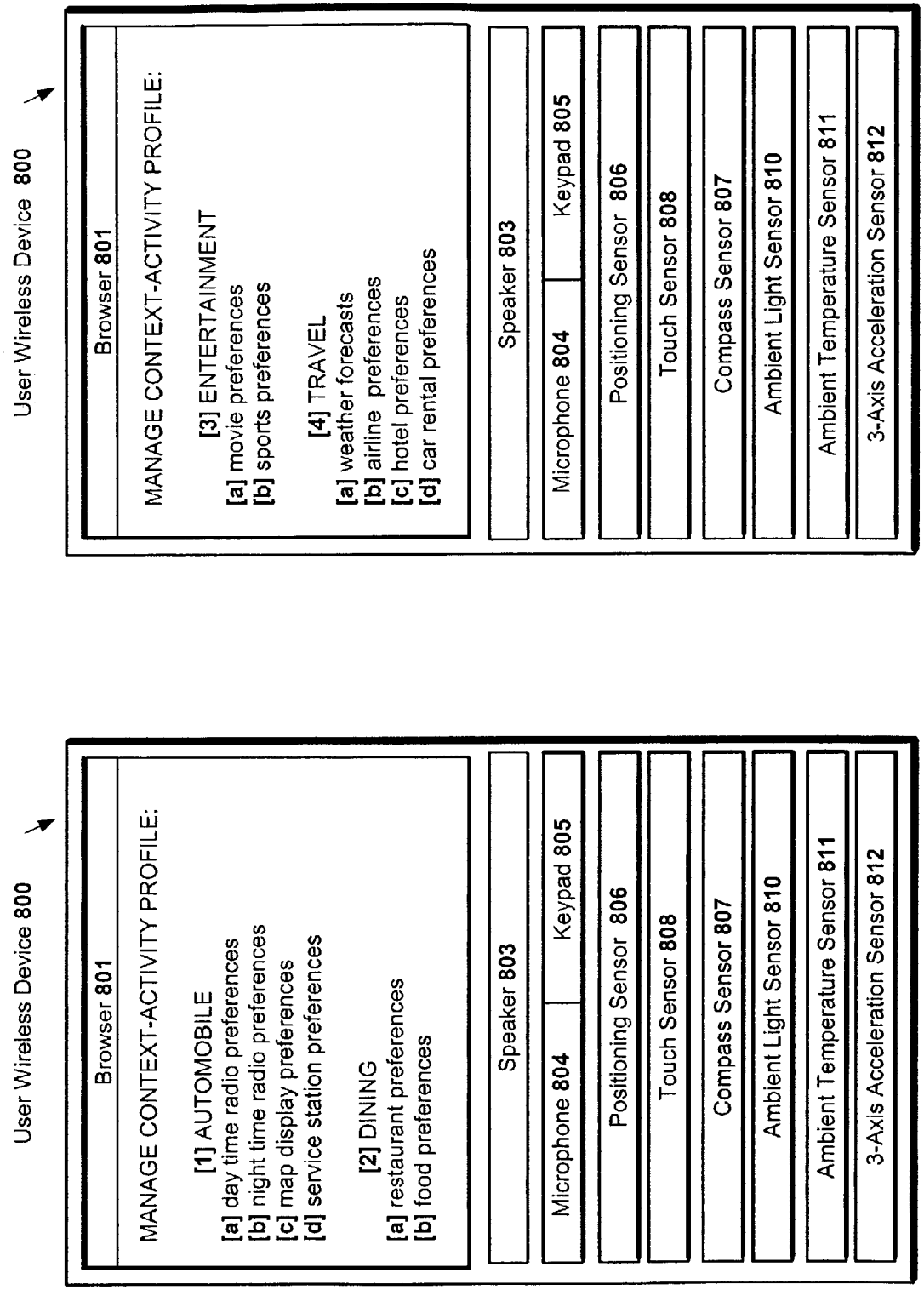

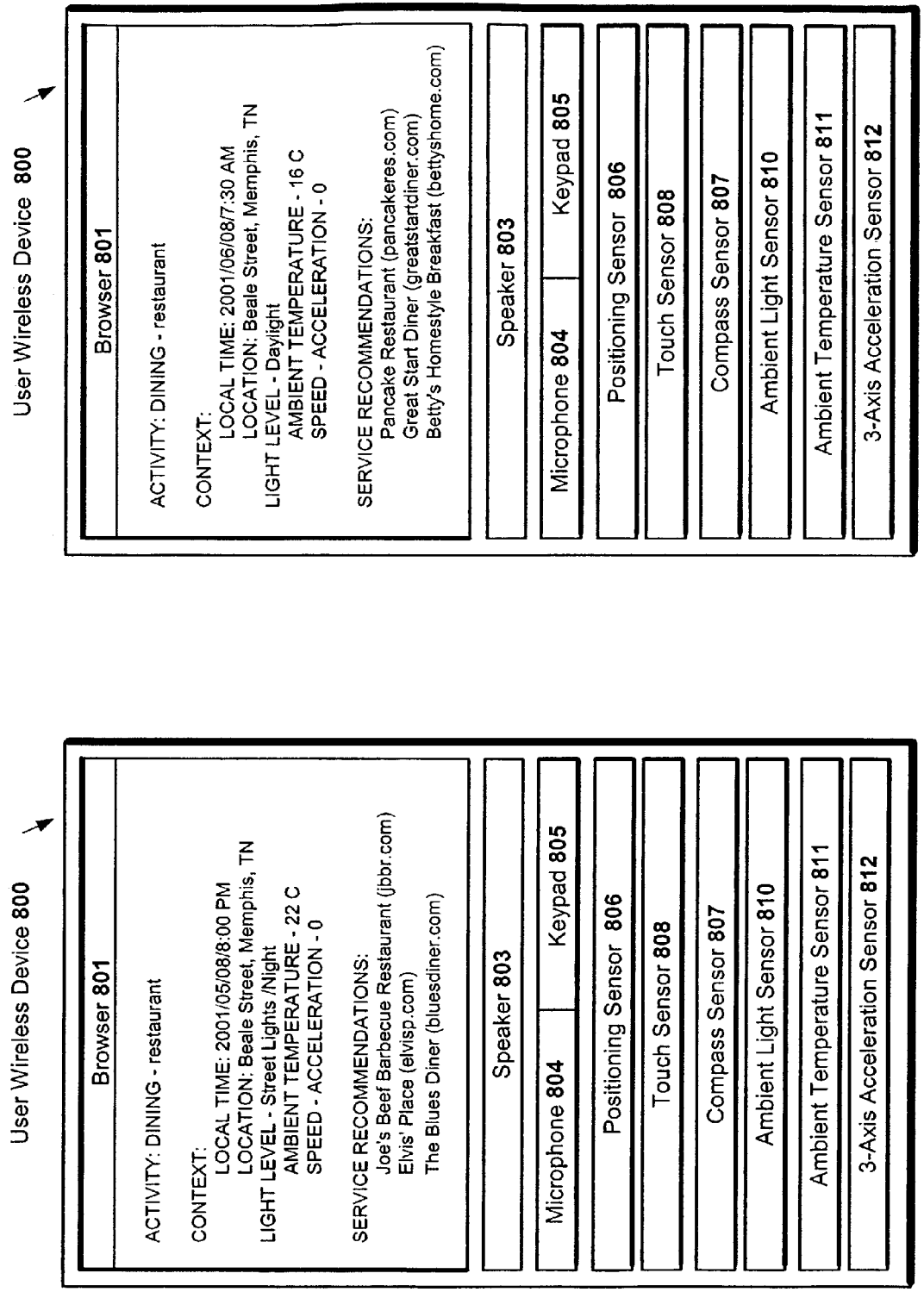

Figure 17A

| Context Activity Pairs and Services Database 830 in Server 826 | | |
|---|---|---|
| Context-Activity Pairs | Service Recommendations | # Recommended |
| ACTIVITY:<br>  DINING - restaurant<br>CONTEXT:<br>  LOCAL TIME: 6:00 PM - 11:59 PM<br>  LOCATION: Beale St, Memphis TN<br>  LIGHT LEVEL: Night<br>  AMBIENT TEMPERATURE: 15 C - 25 C<br>  SPEED - ACCELERATION: 0 - 50 kph | Joe's Beef Barbecue Restaurant (jbbr.com)<br><br>Elvis' Place (elvisp.com)<br><br>The Blues Diner (bluesdiner.com)<br><br>The Gourmet Restaurant (gourmetres.com)<br><br>Dan's Fast Food Restaurant (dffr.com) | R=20<br><br>R=33<br><br>R=18<br><br>R=25<br><br>R=40 |
| ACTIVITY:<br>  DINING - restaurant<br>CONTEXT:<br>  LOCAL TIME: 5:00 AM - 10:59 AM<br>  LOCATION: Beale St, Memphis TN<br>  LIGHT LEVEL: Daylight<br>  AMBIENT TEMPERATURE: 15 C - 25 C<br>  SPEED - ACCELERATION: 0 - 50 kph | Pancake Restaurant (pancakeres.com)<br><br>Great Start Diner (greatstartdiner.com)<br><br>Betty's Homestyle Breakfast (bettyshome.com)<br><br>Mike's Quick Breakfasts (mikesbreakfast.com)<br><br>Dan's Fast Food Restaurant (dffr.com) | R=120<br><br>R=100<br><br>R=130<br><br>R=150<br><br>R=120 |
| ACTIVITY:<br>  NEWS - local<br>CONTEXT:<br>  LOCAL TIME: 11:00 AM - 2:00 PM<br>  LOCATION: Wall St, New York NY<br>  LIGHT LEVEL: Daylight<br>  AMBIENT TEMPERATURE: 15 C - 25 C<br>  SPEED - ACCELERATION: 0 - 50 kph | YAHOOMOBILE - WORLDNEWS (YAHOOMOBILE.COM /NEWS/WORLD.WML )<br>YAHOOMOBILE - BUSINESS NEWS (YAHOOMOBILE.COM/NEWS/BUSINESS.WML )<br>YAHOOMOBILE - F1 NEWS (YAHOOMOBILE.COM/SPORTS/F1/NEWS.WML )<br>BUSINESS -ONLINE NEWS (BUSINESS.COM/ONLINE.WML)<br>BUSINESS - MAIN NEWS (BUSINESS.COM/INDEX.WML)<br>BUSINESS - STOCK QUOTES: NOKIA (BUSINESS.COM/STOCKS/QUOTES.PL?TICKER = NOK)<br>F1-FORUM - NEWS (F1-FORUM.COM/NEWS.WML )<br>F1-FORUM - RESULTS (F1-FORUM.COM/RESULTS.WML )<br>F1-FORUM - TABLE (F1-FORUM.COM/TABLE.WML )<br>WEATHERONLINE - HELSINKI TOMORROW (WEATHERONLINE.COM/<br>FORECAST.PL?CITY=HELSINKI&DAY=+1) | R=250<br>R=160<br>R=230<br>R=222<br>R=80<br>R=211<br>R=301<br>R=50<br>R=100<br>R=312 |

Figure 17B

| Context-Activity Pairs and Service History Log 815 In Device 800 | | Receive Buffer In Device 1700 | |
|---|---|---|---|
| Context-Activity Pair History | History of Service Used | Recommendations From Server | |
| ACTIVITY:<br>  DINING - restaurant<br>CONTEXT:<br>  LOCAL TIME: 6:00 PM - 11:59 PM<br>  LOCATION: Beale St, Memphis TN<br>  LIGHT LEVEL: Night<br>  AMBIENT TEMPERATURE: 15 C - 25 C<br>  SPEED - ACCELERATION: 0 - 50 kph | The Gourmet Restaurant [USER'S RATING = 8]<br><br>Dan's Fast Food Restaurant [USER'S RATING = 6] | Joe's Beef Barbecue Restaurant<br>Elvis' Place<br>The Blues Diner<br>The Gourmet Restaurant<br>Dan's Fast Food Restaurant | R=20<br>R=33<br>R=18<br>R=25<br>R=40 |
| ACTIVITY:<br>  DINING - restaurant<br>CONTEXT:<br>  LOCAL TIME: 5:00 AM - 10:59 AM<br>  LOCATION: Beale St, Memphis TN<br>  LIGHT LEVEL: Daylight<br>  AMBIENT TEMPERATURE: 15 C - 25 C<br>  SPEED - ACCELERATION: 0 - 50 kph | Mike's Quick Breakfasts [USER'S RATING = 8]<br><br>Dan's Fast Food Restaurant [USER'S RATING = 5] | Pancake Restaurant<br>Great Start Diner<br>Betty's Homestyle Breakfast<br>Mike's Quick Breakfasts<br>Dan's Fast Food Restaurant | R=120<br>R=100<br>R=130<br>R=150<br>R=120 |
| ACTIVITY:<br>  NEWS - local<br>CONTEXT:<br>  LOCAL TIME: 11:00 AM - 2:00 PM<br>  LOCATION: Wall St, New York NY<br>  LIGHT LEVEL: Daylight<br>  AMBIENT TEMPERATURE: 15 C - 25 C<br>  SPEED - ACCELERATION: 0 - 50 kph | YAHOOMOBILE - WORLDNEWS [USER'S RATING = 9]<br>YAHOOMOBILE - BUSINESS NEWS [USER'S RATING = 7]<br>YAHOOMOBILE - F1 NEWS [USER'S RATING = 6]<br>BUSINESS - ONLINE NEWS [USER'S RATING = 9]<br>BUSINESS - MAIN NEWS [USER'S RATING = 8]<br>BUSINESS - STOCK QUOTES: NOKIA [USER'S RATING = 9]<br>F1-FORUM - NEWS [USER'S RATING = 7]<br>F1-FORUM - RESULTS [USER'S RATING = 8]<br>F1-FORUM - TABLE [USER'S RATING = 9]<br>WEATHERONLINE - HELSINKI TOMORROW [USER'S RATING = 9] | YAHOOMOBILE - WORLDNEWS<br>YAHOOMOBILE - BUSINESS NEWS<br>YAHOOMOBILE - F1 NEWS<br>BUSINESS - ONLINE NEWS<br>BUSINESS - MAIN NEWS<br>BUSINESS - STOCK QUOTES: NOKIA<br>F1-FORUM - NEWS<br>F1-FORUM - RESULTS<br>F1-FORUM - TABLE<br>WEATHERONLINE - HELSINKI TOMORROW<br>STUFF - SOURCENEWS | R=250<br>R=160<br>R=230<br>R=222<br>R=80<br>R=211<br>R=301<br>R=50<br>R=100<br>R=312<br>R=90 |

# SYSTEM AND METHOD FOR PROVIDING CONTEXT SENSITIVE RECOMMENDATIONS TO DIGITAL SERVICES

BACKGROUND OF THE INVENTION

1. Field of the Invention

The invention disclosed broadly relates to the field of wireless communication and Internet services. More specifically, the invention revolves around recommending Internet services to mobile terminal users.

2. Background Art

Wireless devices and terminals are widely employed by people to access the growing number of available digital services. Such access typically entails the utilization of a menu structure to enable a wireless user to identify the service of interest to be accessed. However, such configurations are often slow and cumbersome for the user. In current mobile terminals, a service, such as a Wireless markup Language (WML) page, may be accessed by manually typing in a Universal Resource Locator (URL) of the required service or selecting a previously stored bookmark containing the URL of the required service. Another method involves the use of hypertext links to access a directly linked service.

Conventional mobile telecommunications devices such as telephone handsets, have been designed primarily for speech calls and have only a limited capability for handling data. Recommendations have been developed to provide a wireless application protocol (WAP) to promote common standards and specifications for data services that operate over wireless communication networks. WAP enabled telephone handsets have been developed which allow the user to access remote servers. Data content is provided in a mark up language, similar to conventional hyper text mark up language (HTML) known as a wireless mark up language (WML), which is configured to allow a page of WML data to be displayed as a deck of individual cards which are of the size suited for display on the relatively small display screen usually available on a mobile device such as a cellular telephone handset or personal digital assistant (PDA).

The data is supplied by WML servers at individual network addresses, with a homepage which act as an entry point to a particular site together with further pages or decks with individual addresses that can be navigated by the user. To this end, the mobile device is provided with a browser to display the data.

A WML server can be accessed by dialing an individual telephone number associated with a WAP gateway which acts as a proxy server between the WML server itself and the mobile device, which acts as the client.

Newer, faster data services for mobile communication devices have been developed, including I-Mode, GPRS and UMTS which operate in a generally similar way, with the mobile device acting as client to remote servers, and a browser to display the accessed data on the mobile device. The browser that is used for mobile telecommunications devices is conventionally known as a micro-browser, which is controlled by keys on the mobile device. Instead of using a mouse-driven cursor, a focus region is provided, which can be navigated around the display by keys which may include a scrolling key on the mobile device. The keys may be so-called soft keys which can be pre-programmed to perform different functions depending on the display provided by the browser. Conventionally, one of the soft keys allows the user to move backwards through previously visited network addresses. Also, a bookmark list may be stored so that individual network addresses can be readily accessed One of the many problems of current systems is that all the services required by a user cannot be accessed via hyperlinks. Furthermore, user interfaces of many terminals are small, and have limited keyboard capabilities. Thus, the entry of URL's is thus slow and cumbersome, since the majority of URL's are long and unintuitive. Furthermore, current recommendation systems and algorithms cannot supply context-based recommendations, wherein bookmarks are organized and presented to the user according to customized protocols.

SUMMARY OF THE INVENTION

According to an embodiment of the present invention, a wireless device, such as a phone, PDA, etc. is enabled to compile multiple lists of bookmarks, wherein lists may be organized on the basis of user access. Under the embodiment, a mobile telecommunications device is provided, which includes a browser to permit a user to navigate between different pages and display information therefrom. The device further comprises a processor to compile various lists of bookmarks. The lists may contain entries selected by the user or may comprise bookmarks downloaded to the device, for example by a network operator. The lists may also comprise the bookmarked addresses accessed most recently or most frequently by the user. The lists may further comprise entries corresponding to addresses previously accessed by the user manually typing the address into the handset. The lists may be restricted to a limited amount of entries, or may contain all the entries in the bookmark list or manually entered, in order of frequency of access by the user.

An embodiment of the invention further provides a method of having wireless device bookmarks be automatically organized and presented to the user. An embodiment of the system provides access to network addresses, allowing navigation between different addresses and displaying of information therefrom. Also, context-related information, such as location, time of day, etc. can be used to supplement bookmarked recommendations to automatically organize and present links to users. Thus, in accordance with the invention, a user of a mobile device can readily navigate to the most useful network addresses without needing to scroll through large numbers of entries, or be susceptible to outside influences for recommendations.

DESCRIPTION OF THE FIGURES

In order that the invention may be more fully understood an embodiment thereof will now be described by way of example with reference to the accompanying drawings in which:

FIG. 11A is an exemplary network process diagram showing the interaction of a user's device and a network server;

FIG. 11B is a flow diagram of an exemplary process in a network server to respond to an updated menu request message from the wireless device, by compiling an updated menu which is returned to the wireless device;

FIG. 11F is a flow diagram of an exemplary process in the network server to respond to the recommendation request message from the device, by accessing recommendations from the database corresponding to the current context, finding recommendations among those accessed from the database that are similar to the past services used provided in the recommendation request message, sorting the found recommendations in accordance with the user's service preferences also provided in the recommendation request message, and returning the resultant recommendations to the device in a recommendation response message;

FIG. 11G is a flow diagram of an exemplary process in a wireless device to filter the recommendations received in the recommendation response message and output the filtered recommendations on the device's browser;

FIGS. 16C and 16D show an alternate embodiment of an example of the user's wireless device with the MANAGE CONTEXT-ACTIVITY PROFILE sub-menu of the Recommendation Web Services menu;

FIGS. 16G and 16H show two examples of the alternate embodiment of the user's wireless device with a requested context-activity pair which is sent to the network server and the resultant service recommendations received back from the server;

FIG. 17A shows an alternate embodiment of an example of the context-pairs and services database 192 in the network server 826;

FIG. 17B shows an alternate embodiment of an example of the context-pairs and service history log 815 in the device 800;

DISCUSSION OF THE INVENTION

Figure 1:
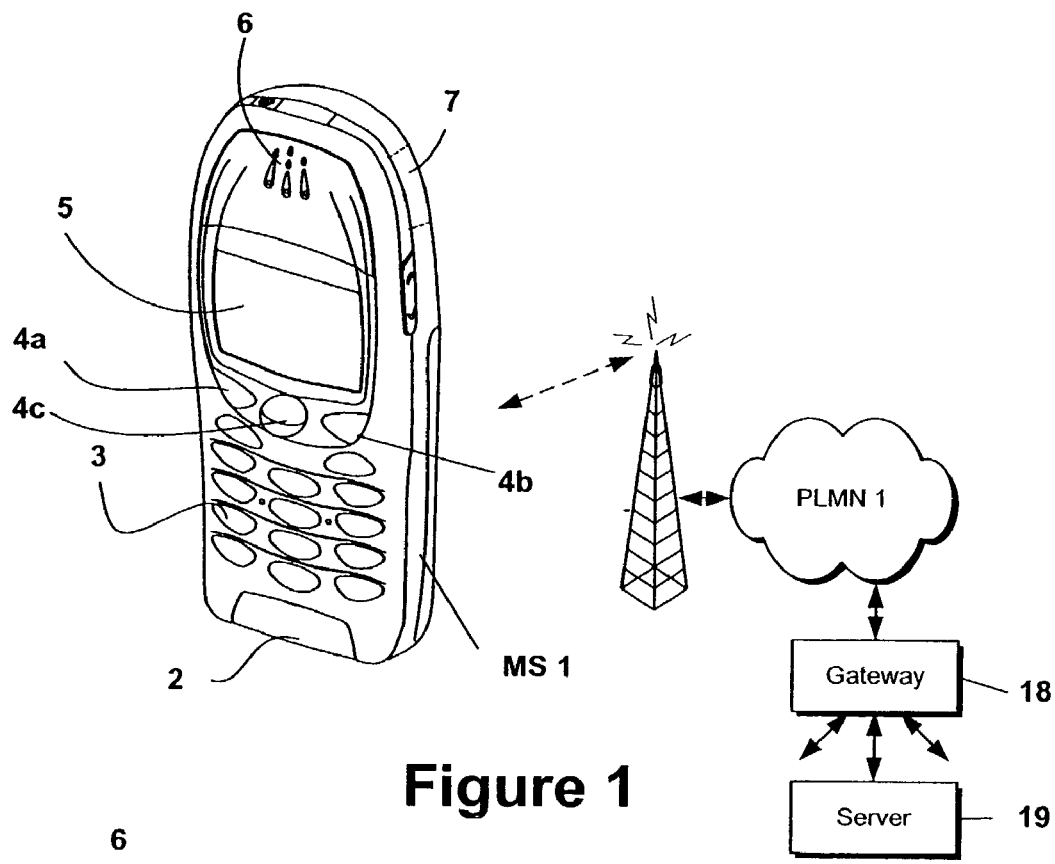
FIG. 1 is a schematic block diagram illustrating a mobile telephone handset which can communicate through a public land mobile network (PLMN) and through a gateway to remote data servers.
Figure 2:
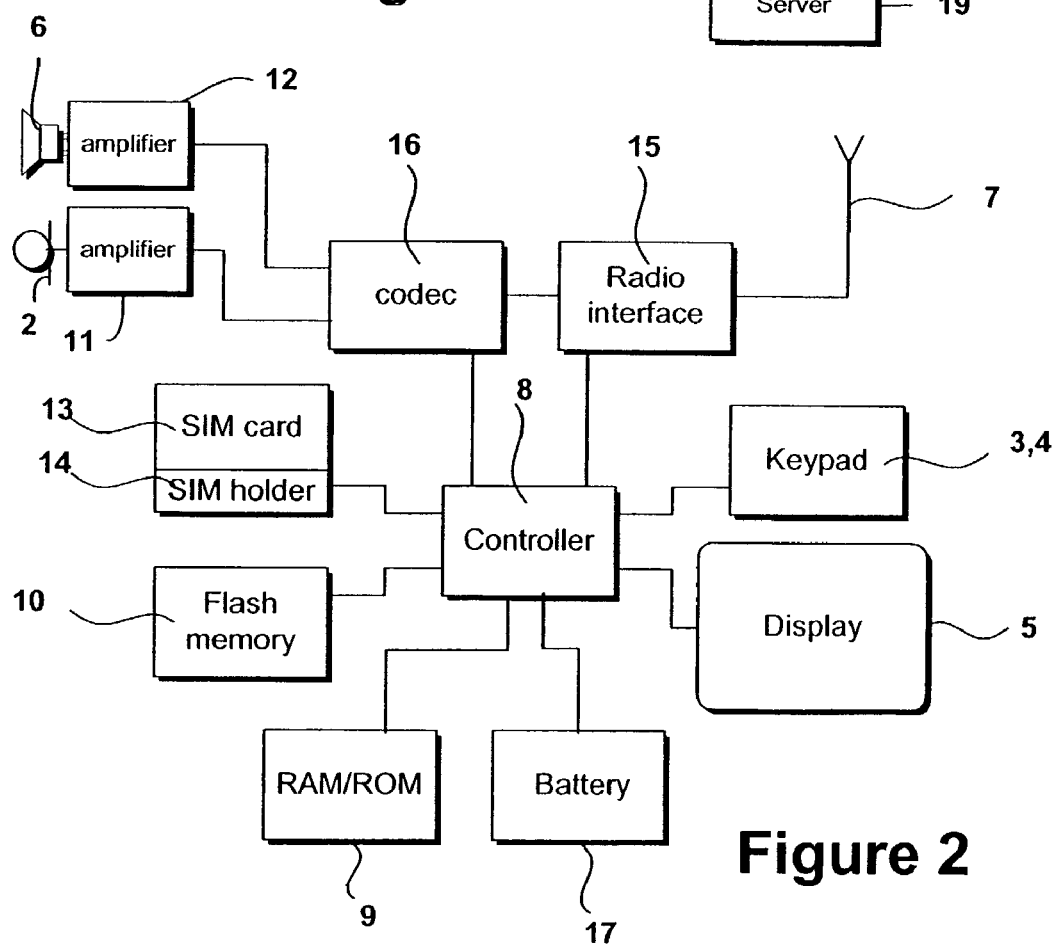
FIG. 2 is a schematic block diagram of the circuitry of the mobile handset shown in FIG. 1.

In FIG. 1, a mobile station, in the form of a battery driven telephone cellular handset MS 1, is shown schematically in radio communication with PLMN 1. Mobile handset MS1, includes a microphone 2, keypad 3, soft keys 4, a liquid crystal display device 5, ear-piece 6 and internal antenna 7. It is understood that the spirit and scope of the present invention applies to numerous other handsets, such as those illustrated in subsequent illustrations, and that the examples shown herein are for illustrative purposes. The circuitry of handset MS 1 is shown in more detail in FIG. 2. Signal processing is carried out under the control of digital micro-controller 8 which has an associated RAM/ROM 9 and flash memory 10. Electrical analog audio signals are produced by microphone 2 and amplified by pre-amplifier 11. Similarly, analog audio signals are fed to the ear-piece 6 through an amplifier 12. The micro-controller receives instruction signals from the keypad and so-called soft keys 4a,b,c, and controls operation of the LCD display 5.

Information concerning the identity of the user is held on a smart card 13 in the form of a GSM SIM card which contains a GSM international mobile subscriber identity and encryption $K_i$ that is used for encoding the radio transmission in a manner well known per se. The SIM card 13 is removably received in a SIM card holder 14. Radio signals are transmitted and received by means of the antenna 7 connected through a RF Interface stage 15 to a codec 16, configured to process signals under the control of a micro-controller 8.

Thus, in use for speech, the codec 16 receives analog signals from the microphone amplifier 11, digitizes them into a form suitable for transmission and feeds them to the RF stage 15 for transmission through antenna element 7 to PLMN 1 shown in FIG. 1. Similarly, signals received from PLMN 1 are fed through the antenna element to be demodulated by the RF interface stage 15 and fed to codec 16 so as to produce analog signals fed to amplifier 12 and ear-piece 6.

The mobile station MS1 is also configured to operate as a client to receive data from remote servers and to communicate through PLMN 1 to a gateway 18 shown in FIG. 1 which acts as a proxy server for connection to remote servers, such as server 19. For example, for a WAP enabled system, access to the gateway 18 is provided by dialing a telephone number associated with the gateway although other communication techniques can be used e.g. for GPRS and UMTS. The server 19 may provide data corresponding to individual sites each with an individual homepage with a specific network address or universal resource locator (URL). The data may be provided in WML through the PLMN 1 to the handset MS1, which acts as a mobile client.

The mobile handset MS1 runs a micro-browser. The software for running the micro-browser may be held in flash memory 10 shown in FIG. 2, so as to be run by the micro-controller 8 and provide an output on display 5.

Figure 3:
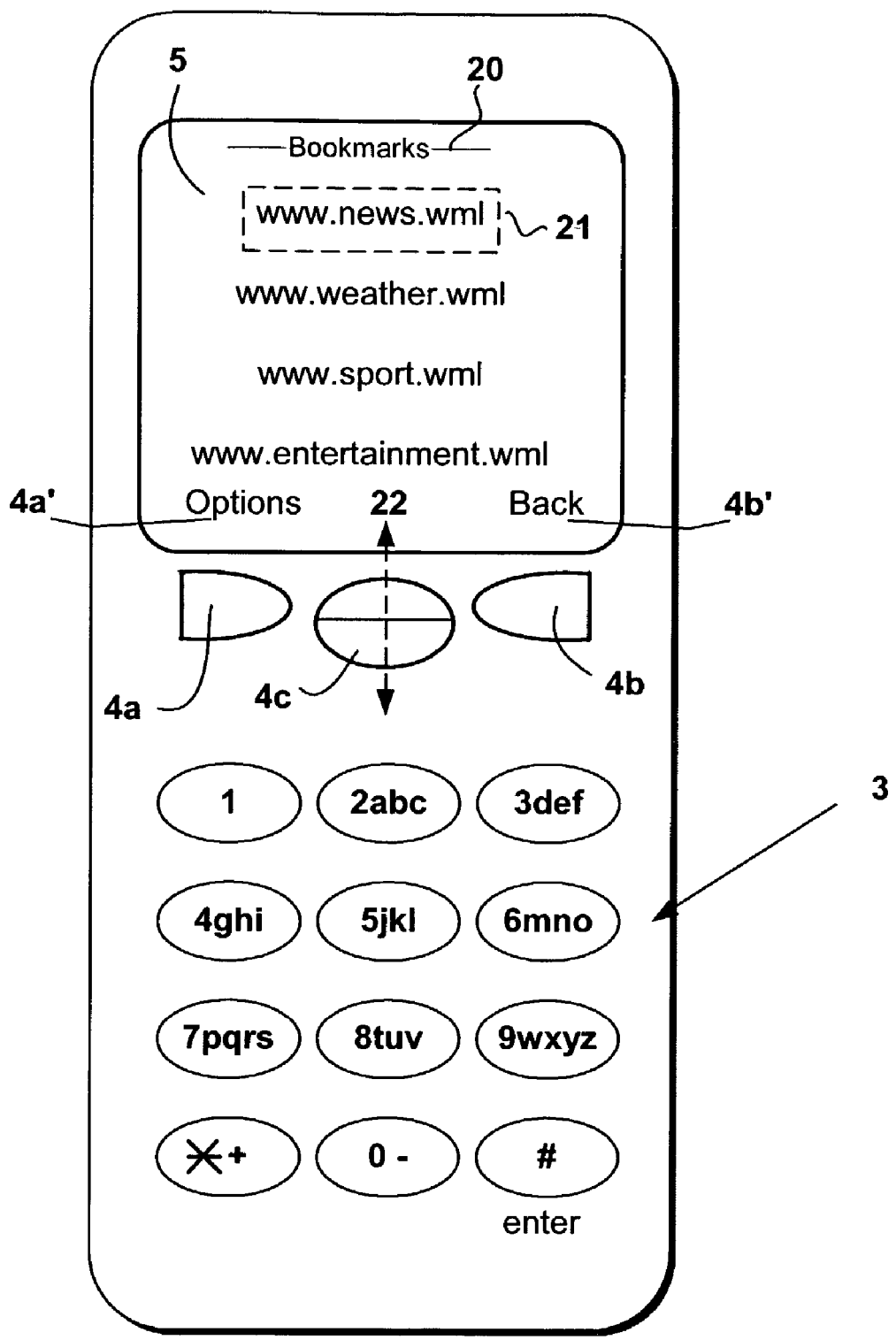
FIG. 3 illustrates schematically the display of the bookmark list on the handset.

An example of the display provided by the micro-browser is shown in more detail in FIG. 3. In this example of the display 5, the user has elected to view the bookmark list, listing network addresses previously selected by the user, as illustrated by information bar 20. The bookmarks include entries in the form of menu options which comprise links to corresponding network addresses. The links may be selected using a so-called focus region 21 which can be scrolled upwardly and downwardly shown in FIG. 3 using key 4c, which can be pushed upwardly and downwardly in the direction of arrow 22 in order to perform a scrolling function. Thus, as shown in FIG. 3, the network address "www.news.wml" falls within the focus region 21. The bookmarks may have been produced by the user in a conventional manner or may have been downloaded to the handset for example by a network operator.

Soft keys 4a and 4b are attributed functions shown on the display 5, which varies from display to display. For the bookmark list shown in FIG. 3, the keys 4a, 4b are attributed functions "options" and "back" respectively and appropriate legends 4a' and 4b' are displayed on the LCD display 5 under the control of software being run by controller 8. If the key 4a is actuated, a list of options e.g. select, re-load, help etc are displayed (not shown) on the display 5. The "select" function may then chosen from the displayed list using the scrolling key 4c, in the event that the user wants to actuate the link to the "www.news.wml" address shown in FIG. 3. At this time, the soft key function attributed to the key 4a is itself "select" so that an operation of the key 4a will cause the link to the news page within the focus region 21 to be actuated and navigation to the "www.news.wml" network address is carried out.

Figure 4:
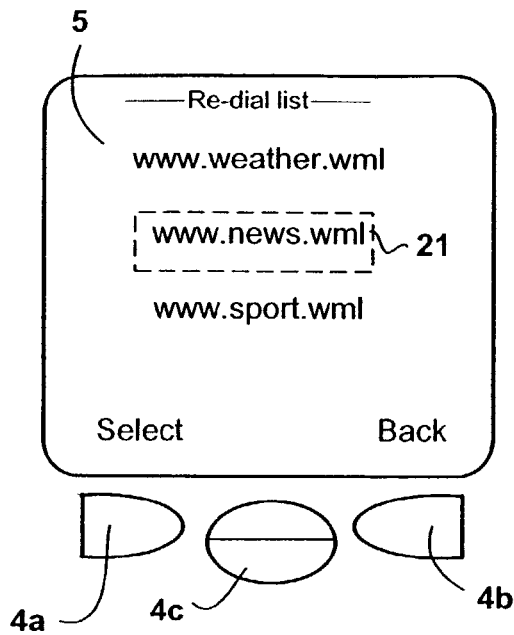
FIG. 4 illustrates the display of a second list of selected bookmarks and addresses.

Alternatively, the user may elect to view a different list of bookmarks, e.g. the "re-dial" list shown in FIG. 4, which lists the bookmarks which are deemed most likely to be re-dialed by the user. The user has recently navigated to network addresses "www.news.wml", "www.sport.wml" and "www-.weather.wml". This other list stores only addresses that were previously bookmarked, or manually entered by the user and, therefore, the individual network addresses associated with pages decks or cards within these sites that were navigated previously are not stored in the second list. The re-dial list of FIG. 4 can only contain a small number of bookmarks compared with the bookmark list of FIG. 3. For example, the bookmark list may have a maximum capacity of 200 bookmarks whereas the re-dial list may have a maximum capacity of 10 bookmarks. The soft key 4a is attributed a "select" function so that the user can scroll using key 4c to select one of network addresses and navigate directly to the relevant page by appropriately moving the focus region 21 and operating the select key 4a.

Figure 5:
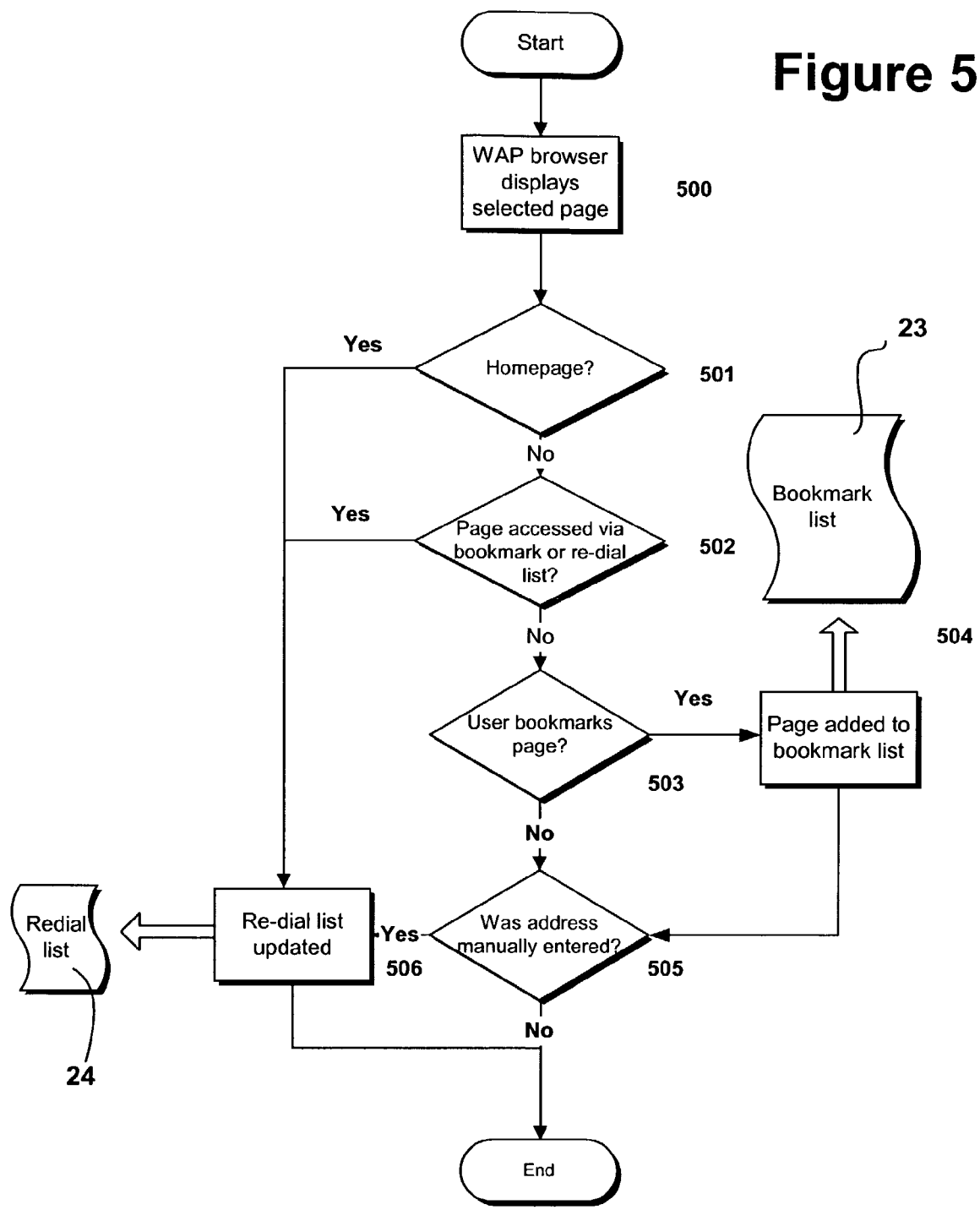
FIG. 5 is a schematic flowchart of a process for compiling the bookmark and selected bookmark lists.

FIG. 5 illustrates bookmark list 23 and re-dial list 24 together with a process for updating bookmarks held in both lists. It is understood that multiple lists of various kinds may be set up under the present invention. The user may navigate to a desired page for example, by one of the following methods: selecting a bookmark from either of the lists shown in FIGS. 3 and 4, manually typing in a network address or URL, or by following a link provided in another page viewed in the browser, as shown at step 500. At step 501, a check is made to determine if the displayed page is a homepage, and if so, the redial list 24 is updated as will be explained hereinafter (506), so as to contain the home page address as a bookmark.

If the displayed page is not a homepage, then at 502, it is determined whether the page displayed at 500 was accessed using bookmark list 23 or redial list 24. In this instance, re-dial list 24 is updated (506), to include a relevant network address. If the page was accessed by other means, the user may choose to bookmark it (503), in which case an entry is made in main bookmark list 23 (504). If the user had typed in the address, determined in step 505, a separate entry is made in re-dial list 24 (506), regardless of whether the user has bookmarked the page. Re-dial list 24 therefore contains entries relating to homepages, pages accessed using bookmark list 23, re-dial list 24, or by entering an address manually. Network addresses accessed by following links are not included, so that the re-dial list 24 is limited the pages that are likely to be currently important to the user. Alternately, network addresses may be included for a complete link history for the user.

Figure 6:
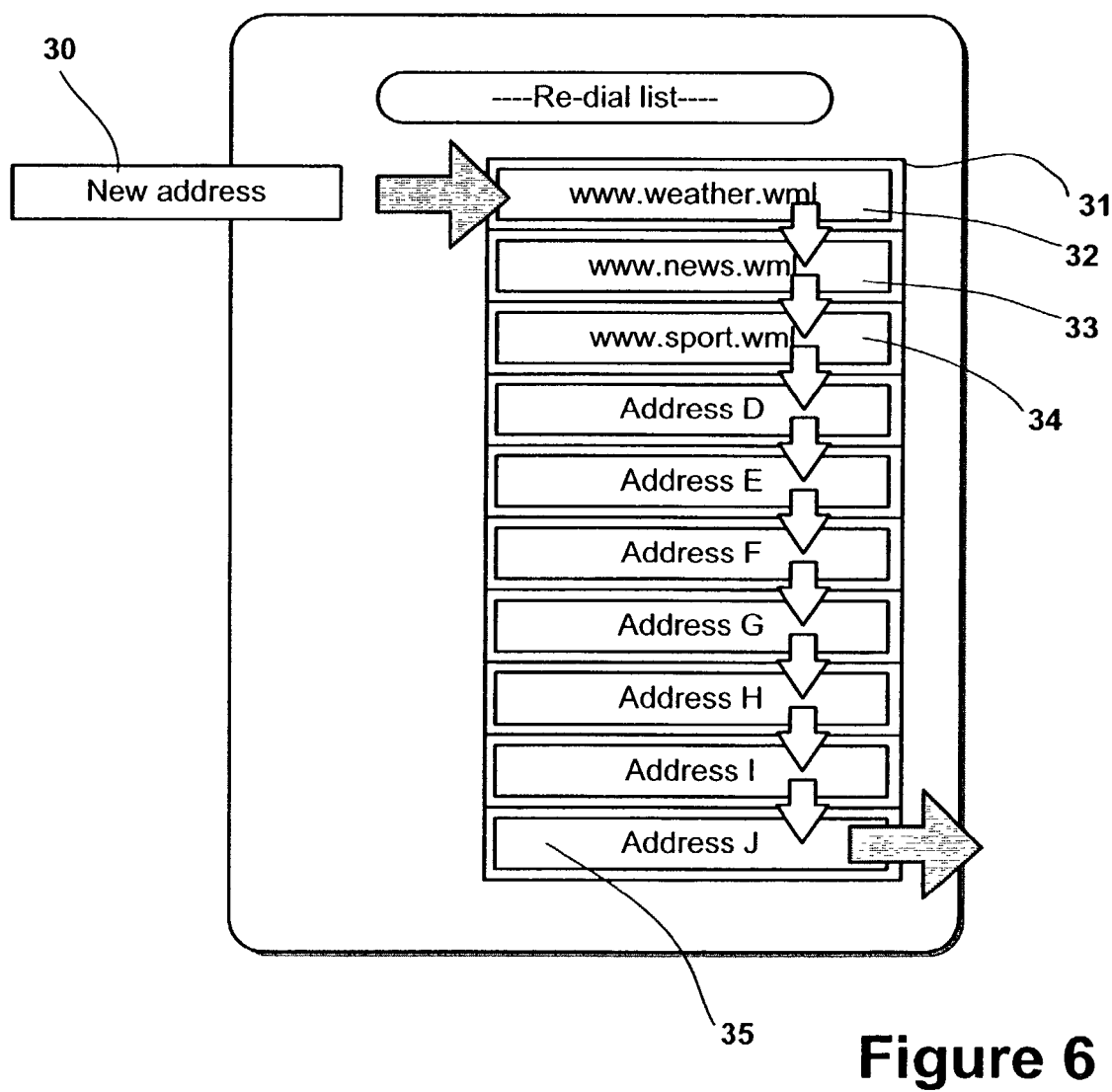
FIGS. 6 and 7 illustrate schematically the process of updating the list of selected bookmarks.
Figure 7:
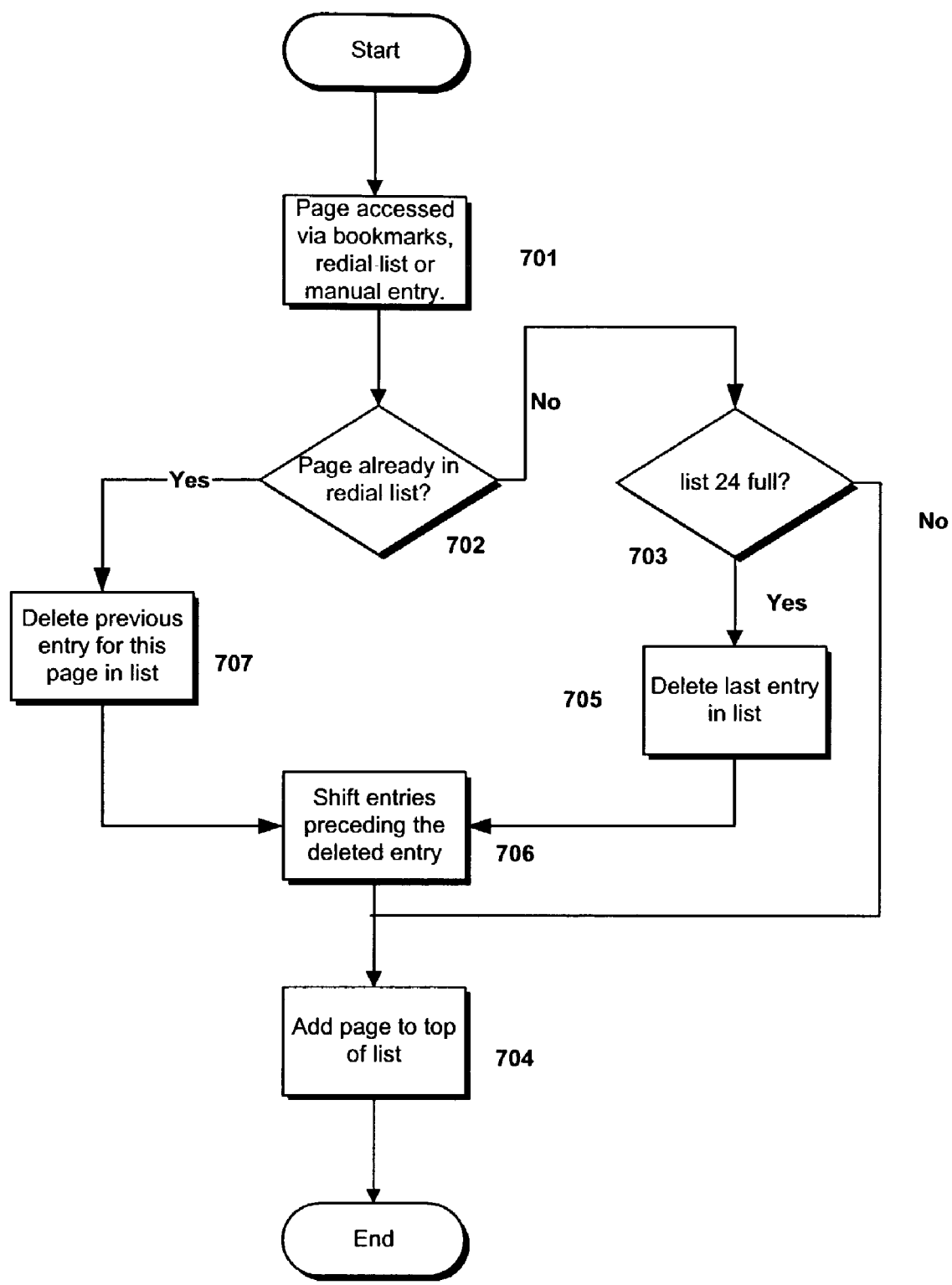

The process of updating the bookmark list is explained with reference to FIGS. 6 and 7. FIG. 6 depicts memory organization of the RAM/ROM 9 shown in FIG. 2. Memory locations corresponding to a selected number of network addresses for the visited pages are cached in a shift register according to how recently they were last accessed. When a page is accessed by a user via the bookmark list 23, re-dial list 24, or manual address entry (701), the controller 8 determines whether the relevant network address is already stored in the re-dial list (702). If this is not the case, a check is made at step 703 to determine if the re-dial list is full of bookmark entries It is not full, the new address may be added to the top of the list shown at step 704. If the list 24 is full the final entry 35 is deleted from the memory location corresponding to the bottom of the list (705) and the entries above it, 32-34 (FIG. 6) and addresses D-I, are shifted (706) so that the new address 30 may be added to the top of the list 31 (704). However, the page already has an entry in the re-dial list, e.g. if the address to be added 30 related to www.sport.wml, the previous entry 34 relating to that page is removed (707), any preceding entries 32, 33 are shifted accordingly (706) and the address stored at the memory location corresponding to the top of the list 31 (704). In this manner, the most frequently used network addresses will tend to remain on the re-dial list, producing a short list of the pages visited most regularly by the user.

The re-dial list comprises the network addresses that are likely to be most frequently accessed by a user and, as it may be much shorter than the main bookmark list, allows the user of a mobile telecommunications device to quickly select and access a favorite network address without the inconvenience of scrolling through large numbers of bookmarks. Many modifications and variations falling within the scope of the invention will be evident to those skilled in the art. For example, whilst the described example relates to the use WAP technology, the invention can be used in any mobile telecommunications system in which mobile devices act as clients for remote servers. Also, whilst the invention has been described in relation to the example of a telephone handset, it can be used in other mobile devices such as PDAs, gaming devices and remote handheld devices for home entertainment systems.

A service recommendation engine or algorithms (used interchangeably herein) are configured to recommend or determine a subset of services from a plurality of services according to user-related filter criteria. Such criteria may be any factor unique or personal to the user or the user's wireless device which can be utilized in ascertaining or inferring possible services preferred by a particular user. Examples of user-related filter criteria may include static or dynamic factors, such as the user's service usage pattern or preference (e.g., when, where, how, a number of times, etc. that a service was used); the user's current context which may inferred from the user's perceived environment through various sensory devices; the user's past and current activities; the user's profile (habits, likes-dislikes, personal characteristics, personal background, etc.); and/or the current environment of the wireless device sensed by one or more sensors (e.g., a location/positioning sensor, a compass, a touch sensor, an audio sensor, a light sensor, and a temperature sensor). Once a set of recommended services are determined, the service may be stored as bookmarks in the wireless device, or at a remote server.

Accordingly, through the above-noted combination, a wireless device may be configured to enable a user to access preferred or desired services by short cuts/bookmarks, user command or other form of user input (e.g., keypad, touch-display, etc.), while reducing or minimizing the processing load and memory and other hardware requirements necessary to implement such functionality or control in a wireless device. Such an arrangement does not require the user to remember the exact service addresses, which are often complex and difficult to remember, to access desired services; reduces privacy concerns for the user in the access of services; provides for service options which may be organized and accessed without requiring substantial effort on the part of the user.

In one exemplary embodiment, such a system and method are implemented through a portable wireless device including a recommendation engine and a database of past services accessed by the user. The recommendation engine recommends or determines a subset of services from a plurality of services to provide recommendations which are personal to and preferred by the user. The recommendation may be based on various user-related filter criteria (e.g., context) and, if desired, limited to the range of past used services of the user. These recommended services may then be visibly or audibly outputted to the user for selection thereof, and such output may include information identifying short-cuts for one or more or each of the recommended services. For example, visual output of enabled services may be displayed in the form of an icon or other visual forms (e.g., URL address) to inform the user of the availability of such short-cuts so as to assist the user in effectively utilizing such short-cuts. This may also be accomplished by other output means, such as audio output. The service may also be enabled to provide URL completion functions of stored addresses or bookmarks, which automatically complete partial entries by a user.

The user may thereafter input a command to select a service to be accessed from the subset of recommended services. When the input is received, a portable wireless device processes input to an appropriate computer readable format (e.g., metadata), compares the processed data to data associated with the recommended services, and identifies the service with short-cut matching the user's command. Thereafter, the portable wireless device, such as through its micro-browser, accesses the selected service automatically or upon a user command.

In another embodiment, such a system and method are implemented through a distributed networked system in which various processing tasks and data maintenance may be distributed between a portable wireless device and one or more network elements, such as a network server, ad hoc network partner, and so forth. The tasks may be distributed in the following manner:

[1] The network server(s) or other network element may be configured to implement both the recommendation and bookmark/short-cut processing. For example, after initiation of the micro-browser by the user or other triggering event, the wireless device receives a bookmark/short-cut command from the user and forwards the command data to the network server and other relevant information, such as user-related filter criteria (e.g., context) and/or information for determining such criteria. The network server determines a subset of recommended services from a plurality of services based on the user-related filter criteria. The network server then, identifies a service therefrom with a short-cut matching the user's command. The network server then returns information corresponding to the identified service, such as the service's address (e.g., URL) or other service access information, to the wireless device for access thereof. Alternatively, the network server may act as an intermediary between the wireless device and the service provider of the identified service and access the identified service for the wireless device.

In another example, after initiation of the micro-browser by the user or other triggering event, the wireless device requests a service recommendation from a network server. The request may include other relevant information, such user-related filter criteria (e.g., context.) or information for determining such criteria. The network server receives the request along with any relevant information and determines a subset of recommended services from a plurality of services based on the user-related filter criteria. These recommendations are then sent to the wireless device which outputs, audibly or visibly, the availability of such recommended services through user input bookmarks/short-cuts.

The wireless device then receives the user's command and passes corresponding command data to the network server. The server then performs processing on the command to identify a service (from the plurality of recommended services) with a short-cut matching the user's command. The network server then returns information corresponding to the identified service, such as the service's address (e.g., URL) or other service access information, to the wireless device for access thereof. Alternatively, the network server may act as an intermediary between the wireless device and the service provider of the identified service and access the identified service for the wireless device.

[2] The network server(s) may be configured to implement the recommendation processing within the wireless device. For example, after initiation of the micro-browser by the user or other triggering event, the wireless device requests recommendations from a network server. The request may include other relevant information, such as user-related filter criteria or associated information in determining such criteria. The network server receives the request and relevant information and determines a subset of recommended services from a plurality of services based on the user-related filter criteria. These selections are then sent to the wireless device, and the device outputs, audibly or visibly, the availability of such recommended services through user input short-cuts.

The wireless device then receives the user's short-cut command and performs processing of the command to identify a service (from the plurality of recommended services) with a short-cut matching the user's command. Thereafter, the wireless device, via its micro-browser or other platform, accesses the selected service automatically or upon the user command.

[3] The network server(s) or other network element may be configured to implement the short-cut processing. For example, after the recommended services are transmitted to the user, the wireless device receives a command from the user and forwards the command data to the network server and possibly other relevant information, such as the recommended services information and/or other short-cuts (e.g., XML tags) for such services. The network server identifies a service (from the plurality of recommended services) with a short-cut matching the user's command. The network server then returns information concerning the identified service, such as the service's address (e.g., URL) or other service access information, to the wireless device for access thereof. Alternatively, the network server may act as an intermediary between the wireless device and the provider of the identified service and access the identified service for the wireless device.

In further embodiments, the maintenance and generation of short-cuts(s) for a particular digital service may be accomplished in various ways, for example, as follows:

[A] Address attributes, such as host name and service name, or other portions of the address attributes may be utilized as a short-cut of a digital service when performing bookmark/shortcut processing.

[B] Bookmarks/short-cuts may be generated from metadata associated with a particular service site. Metadata is often employed by search engines, service sites and/or other network entities to characterize or classify the content on a particular service site to facilitate user searches. Accordingly, one or more short-cuts may be generated for association with a particular service according to the metadata associated with that service, such as by identifying and selecting one or more words or terms from the metadata which aptly characterizes the service. This may be accomplished by manually examining the metadata associated with a service site, or through probability analysis in which the words or terms showing up a significant number of times or the greatest number of times is used as the short-cut.

[C] A bookmark/short-cut registry or the like may be maintained by a network element, such as a server, which maintains a relational database of service addresses and their associated bookmark/short-cut tag. The registry may be similar to domain name registry, in which bookmark/short-cut tags may be uniquely defined for a particular service using a standard format, such as in XML. Through a central registry, a uniform standard may be achieved for bookmark/short-cut tags or the like and their usage in enabling access to associated services. A wireless device may request bookmark/short-cut tags from the registry for the subset of recommended services prior to performing processing. Alternatively, whenever a service site is accessed, the site may deliver the bookmark/short-cut tag to the accessing device which can store the bookmark/short-cut tag for future use.

Along similar lines, a service provider may predefine bookmark/short-cut tags for its service addresses and provide such information to the wireless device or other network elements in communication with the wireless device to facilitate bookmark/short-cut based access to such service(s). For example, the service provider may embed bookmark/short-cut tags in an XML message sent to the user's wireless device.

[D] A user may define, change or delete bookmark/short-cuts for a particular service which are stored locally on the user's wireless device or at a remote location accessible by the wireless device.

[E] The wireless device generally may download predefined or generated short-cuts associated with services from a remote location, via a network. Such download may be performed when a new service is accessed by the user, at periodic intervals, upon a user request, or upon some other predetermined triggering event.

[F] Short-cut(s) may also be a "temporary" short-cut assigned to a recommended service, such as according to hierarchy or priority of the recommendations. For example, the short-cut "bookmark one" or "bookmark 1" can be temporarily assigned to a first recommended service of the subset, the short-cut "bookmark two" or "bookmark 2" can be temporarily assigned to a second recommended service of the subset, and so forth. Alternatively, the short-cut "A" can be temporarily assigned in an outline form to a first recommended service of the subset, the short-cut "B" can be temporarily assigned to a second recommended service of the subset, and so forth. Temporary short-cuts may be employed together with a selection menu, whether displayed or audibly outputted, for enabling short-cut to recommended services.

[H] To specify a short-cut, bookmark/short-cut tags may be used to categorize the bookmark/short-cut short-cut for a particular service. For example, a bookmark/short-cut may be tagged for a particular service in XML format ("bookmark XML tag"), e.g., <BOOKMARK TAG>[short cut]</BOOKMARK TAG> to facilitate access in a digital service environment, such as with Internet service, etc.

Figure 8:
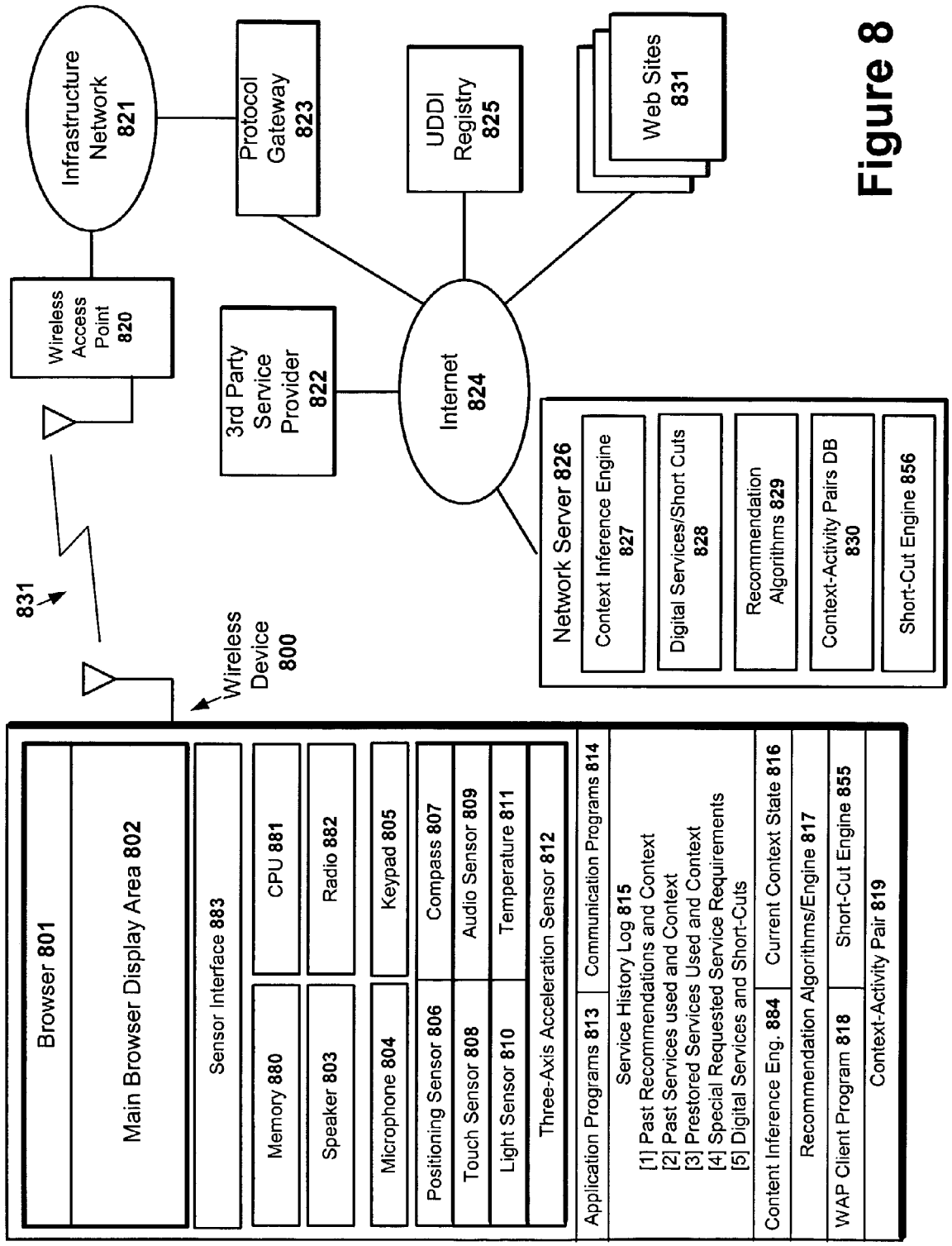
FIG. 8 is a network diagram, showing an example relationship between the user's portable wireless device, the protocol gateway to the Internet, the network server, a third party service provider, the Universal Description, Discovery and Integration (UDDI) registry, and a plurality of web sites.

These and other exemplary embodiments will now be discussed in further detail below with reference to the Figures. Turning to FIG. 8, an exemplary network environment is provided in which a user, operating a portable wireless device 800, is able to employ multi-modal input forms, along with other user input forms, to access preferred digital services through device 800. This is accomplished through combination of a service recommendation engine and a short-cut engine, each of which may be implemented locally at the portable wireless device or at a remote location, such as at a network server 826, to provide short-cuts to the user's preferred services.

A recommendation engine may be employed to determine a subset of recommended services from a plurality of services based on user-related filter criteria (e.g., context, etc.). Commands by the user may be further processed to compare and match the commands to short-cuts associated with the recommended services to enable user selection and access of a service from the recommended services by short-cut.

As shown, a network diagram illustrates an example of a relationship between the user's portable wireless device 800, a wireless access point 820, an infrastructure network 821, a network server 826, and a third party service provider 822 interconnected over the Internet 824. The user's wireless device 800 communicates over a radio link with the wireless access point 820, which is connected to a wireless network 821, which is connected to a protocol gateway 823. The gateway 823 is connected over the Internet 824 to the server 826.

The network 831 formed by the wireless device 800, wireless access point 820, and infrastructure network 821 can be implemented as a digital wireless wide area network (WAN), based on architectures such as Global System for Mobile Communication (GSM), IS-136 TDMA-based Digital Advanced Mobile Phone Service (DAMPS), Personal Digital Cellular (PDC), IS-95 CDMA-based cdmaOne System, General Packet Radio Service (GPRS) and broadband wireless architectures such as W-CDMA and Broadband GPRS. For more information on these digital wireless, wide area network architectures, see the book by Yi-Bing Lin, et al. entitled *Wireless and Mobile Network Architectures*, John Wiley & Sons, 2001. Network 831 can also be a short-range wireless system connected to a wide area landline infrastructure network such as the Internet 824. Short-range wireless systems include both wireless personal area network ("PAN") and wireless local area network ("LAN"). Both of these networks have the common feature of operating in unlicensed portions of the radio spectrum, usually either in the 2.4 GHz Industrial, Scientific, and Medical (ISM) band or the 5 GHz Unlicensed-National Information Infrastructure ("U-NII") band. Wireless personal area networks use low cost, low power wireless devices that have a typical range of ten meters. The best-known example of wireless personal area network technology is the Bluetooth Standard, which operates in the 2.4 GHz ISM band. It provides a peak air link speed of one Mbps and a power consumption low enough for use in personal, portable electronics such as PDAs and mobile phones. The Bluetooth Special Interest Group, *Specification Of The Bluetooth System*, Version 1.0B, Volumes 1 and 2, December 1999, describes the principles of Bluetooth device operation and communication protocols. Wireless local area networks generally operate at higher peak speeds of from 10 to 800 Mbps and have a longer range, which requires greater power consumption. Wireless local area networks are typically used as wireless links from portable laptop computers to a wired LAN, via an access point (AP). Examples of wireless local area network technology include the IEEE 802.11 Wireless LAN Standard and the HIPERLAN Standard, which operates in the 5 GHz U-NII band. For more information on wireless LANs, see the book by Jim Geier entitled *Wireless LANs*, Macmillan Technical Publishing, 1999. The network 831 formed by the wireless device 800, wireless access point 820, and infrastructure network 821 can use a wireless communications protocol, such as the Wireless Application Protocol (WAP), the I-Mode protocol, or the mobile IPv6 protocol.

Portable wireless device 800 may take the form of a processor-based wireless communication-enabled device, such as a wireless mobile telephone (see FIG. 1, MS1), pager, two-way radio, smartphone, personal communicator, laptop or notebook computer, wireless personal digital assistant (PDA) or the like. Typically, wireless device 800 has a resident memory 880, CPU 881, radio 882, speaker 803, and sensor interface 883. Portable wireless device 800 includes a plurality of output subsystems, such as a displayed browser 801 and speaker 803, to provide for supplemental multi-modal output functionality and a plurality of user input subsystems, such as microphone 804, keypad 805, a touch-display and so forth, to provide for multi-modal input functionality. Browser 802 may be partitioned, as desired, to have a main display area, along with other display or touch-screen areas, such as in the form of an icon or other visual representation to notify the user of the availability of short-cuts to recommended services.

The portable wireless device 800 further includes various programs and databases, including the user's personal programs and databases, programs and databases associated with the conventional operation of the wireless device, and programs and databases to implement short-cut service access processes discussed herein. These programs and databases may include, for example, application programs 813, communication programs 814, service history log 815, current context state 816, recommendation algorithms or engine 817 to enable local and/or network-based service recommendations. These programs may alternately include a voice response unit (VRU) (not shown) for converting data, such as text, to speech which can be outputted to the user via speaker 803.

As further shown in FIG. 8, the portable wireless device 800 may also include a plurality of sensors for sensing the mobile user's ambient conditions. The sensors shown include Positioning Sensor 806, Touch Sensor 808, Audio Sensor 809, Compass Sensor 807, Ambient light Sensor 810, Ambient Temperature Sensor 811, and Three-Axis Acceleration Sensor 812. Audio sensor 809 can be a microphone, for example, which can detect speech or other environmental sounds. The positioning sensor 806 can be, for example, a GPS receiver integrated in the device. The positioning sensor can also be, for example, a radio beacon triangulation sensor that determines the location of the wireless device by means of a network of radio beacons, base stations, or access points, as is described for example, in Nokia European patent EP 0 767 594 A2, entitled "Mobile Station Positioning System". These sensors provide inputs which are sampled by the wireless device 800 to sense the user's environment and to infer a current context which may be used to provide recommendations to the user based on the user's environment. The portable wireless device 800 may perform context inference techniques locally, or may offload to the network server 826 some of the computationally intensive computing involved in context inference techniques.

For example, in one or more embodiments discussed herein, as the user carries about the wireless device 800, its sensors may automatically and continuously measure the geographic location and context of the device. The wireless device may periodically transmit the current context in a message over the wireless network to the network server 826. There are several types of messages, each of which is distinguished by its own unique op code. When the wireless device sends a message containing the current context, the network server 826 parses the op code and responds with information corresponding to the op code, the information being related to the current context.

Figure 10:
FIG. 10 illustrates and example of the service history log, with past recommendation and context files and with past service used and context files.

If the op code indicates that the message is a spontaneous message which is automatically transmitted by the device 800, then the network server 826 may respond with information such as a service category menu, or information such as recommended services (along with associated short-cuts) based on the current context, or prepaid advertising of local services related to the current context. As shown in FIG. 8, the user's portable wireless device 800 further includes a service history log 815. The activities stored in the service history log 815 may be divided into two major categories: past recommendations made by the wireless device 800 and/or network server 816, and services including short-cuts. Under one embodiment, the category of services may be broken into four sub-categories: (1) Past Services used, (2) Prestored Service Preferences, (3) Special requested service requirements, and (4) Digital Services and Associated Short-Cuts. The term "activities", as used herein, may refer to any of these categories and sub-categories. The service history log 815 may store five component databases: [1] Past Recommendations and Context, [2] Past Services Used and Context, [3] Prestored Service Preferences, [4] Special Requested Service Requirements, and [5] Digital Services and Short-Cuts. An example is shown in FIG. 10 of the two component databases: [1] past recommendations and context 1000 and [2] past services used and context 1001.

When implementing distributed processing with the network server 826, the wireless device 800 can automatically send messages with a unique op code designating that the message is an automatically transmitted message containing the device's past recommendations and context or past services used and context, in addition to the current context or other information for use in enabling short-cut access to recommended services. In one or more embodiments, the network server 826 may parse the op code and uses the device's past recommendations and context or past services used and context to find similar service recommendations in its database. The network server 826 then responds with information customized to the user's perceived interests, the information being related to the current context. While the above discusses one approach to recommending services, any user-related filter criteria may be employed to determine recommendations personal to the user.

The user of the wireless device 800 can also manually enter requests for menus and recommendations related to the current context. In any event, the wireless device 800 may then determine the service recommendations locally based on the current context and enable short-cut access to such recommended services. Alternatively, the wireless device 800 may send messages with a unique op code designating that the message is a manual request by the user containing the device's past recommendations and context or past services used and context, in addition to the current context or other information for use in enabling short-cut access to recommended services. The network server parses the op code and uses the device's past recommendations and context or past services used and context to find similar recommendations in its database consistent with the user's manual request. The network server 826 then responds with information customized to the user's expressed interests, the information being related to the current context. While the above discusses one approach to recommending services, any user-related filter criteria may be employed to determine customized or personalized recommendations to the user.

Under one embodiment, the service history log 815 can accumulate data on past services used by the user of the device 800 in several ways. The service history log 815 can be programmed to capture on-line transactions and activities, such as ticket purchase information for services, access of a service, and so forth. The service history log 815 can also be programmed to monitor the dwell-time of the device at scheduled events and to draw the inference that the user is in fact engaged in such an event. The event and the current context are then stored in the database "[2] past services used and context", in the service history log 815.

While the portable wireless device 800 may be configured to perform the context, recommendation and short-cut processing alone, one or more or all of these processes can be offloaded to one or more other network elements, such as the network server 826. Accordingly, depending on which processes are offloaded, the network server 826 may include context inference engine 827, digital service and short-cuts database 828, recommendation algorithms or engine 829, and context-activity pairs database 830.

In one distributed system embodiment, the wireless device 800 provides recommendations to its user that are appropriate to the device's current environment by selecting an activity (e.g., a category or sub-category), pairing it with the current context result, and sending the context-activity pair to the network server 826. The network server 826 searches its database of recommendations using the context-activity pair, and returns recommendations to the user. While the portable wireless device 800 and the network server 826 may employ context-activity pairs to determine recommended services, other user-related criteria and processes may be employed to ascertain preferred services desired to be accessed by the user.

Portable wireless device 800, in combination with context inference engine 884, are configured to determine a current context based on the user's current context which, in turn, may be inferred through sensory information from sensors of the device (e.g., location sensor, speed sensor, light sensor, sound sensor, etc.), clock, user's activities, and so forth. The portable wireless device 800, in combination with the recommendation engine 817, determine and recommend a subset of services from a plurality of services based on user-related filter criteria, such as the current context or other personal factors (e.g., service usage history—those services utilized the most by the user, etc.). To reduce the workload of the wireless device, the searchable range of services may be limited to past used services.

Once determined, recommended services may then be visibly (or audibly) outputted to the user for selection thereof by user input, and such output may include information identifying the short-cut(s) for one or more or each of the recommended services. For example, visual output of short-cut enabled services may be displayed in the form of an icon or other visual forms (e.g., URL address) to inform the user of the availability of such short-cuts so as to assist the user in effectively utilizing such short-cuts. This may also be accomplished as well by other output means, such as audio output. The user may thereafter enter a command to select a service to be accessed from the subset of recommended services.

In operation, after initiation of the micro-browser 801 by the user or upon some other triggering event, the portable wireless device 801 requests recommendations from the network server 826. The request may include other relevant information, such as user-related filter criteria or associated information in determining such criteria. The network server 826 receives the request and any relevant information and determines a subset of recommended services from a plurality of services based on the user-related filter criteria. These selections are then sent back to the wireless device 800, and the device outputs, audibly or visibly, an indication of the availability of such recommended services through user input short-cut. The short-cuts for the recommended services may be forwarded by the network server 826 or may be already stored locally for lookup on the portable wireless device 800.

In one operational example, after initiation of the microbrowser 801 by the user or upon some other triggering event, the portable wireless device 801 may request service recommendations from the network server 826. The request may include other relevant information, such user-related filter criteria or information for determining such criteria. The network server 826 receives the request and any relevant information, and determines a subset of recommended services from a plurality of services based on the user-related filter criteria. These selections are then sent back to the wireless device 800, and the device outputs, an indication of the availability of such recommended services through user input short-cuts.

The portable wireless device 800 then receives the user's input command and passes corresponding command data to the network server 826 which performs processing of the command to identify a service (from the subset of recommended services). The network server 826 then returns information on the identified service, such as the service address (e.g., URL) of the service site operated by service provider 822 or other service access information, to the wireless device 800, 815 for access thereof. Alternatively, the network server 826 may act as an intermediary between portable wireless device 800 and service provider 822 of the identified service and access the identified service for wireless device 800.

In an alternative example, after initiation of the microbrowser 801 by the user or upon some other triggering event, the portable wireless device 800 receives a command from the user and forwards the command data to the network server 826, along with other relevant information, such as user-related filter criteria (e.g., context) and/or information for determining such criteria. The network server 826 determines a subset of recommended services from a plurality of services based on the user-related filter criteria. Thereafter, server 826 identifies a service from the subset of recommended services. Network server 826 then returns information on the identified service, which may include the service address (e.g., URL) of the service site operated by service provider 822, to wireless device 800 for access thereof. Alternatively, network server 826 may act as an intermediary between the portable wireless device 800 and service provider 822 of the identified service and access the identified service for the wireless device.

To facilitate ease of use as well as to explain various functions enabled on the portable wireless device 800, a Recommendation Web Services Menu may be provided and displayed on browser 801 of the device. An example of such a menu as well as other screen shots of recommended services will be discussed below with reference to FIGS. 9A through 9J.

Figure 9A:
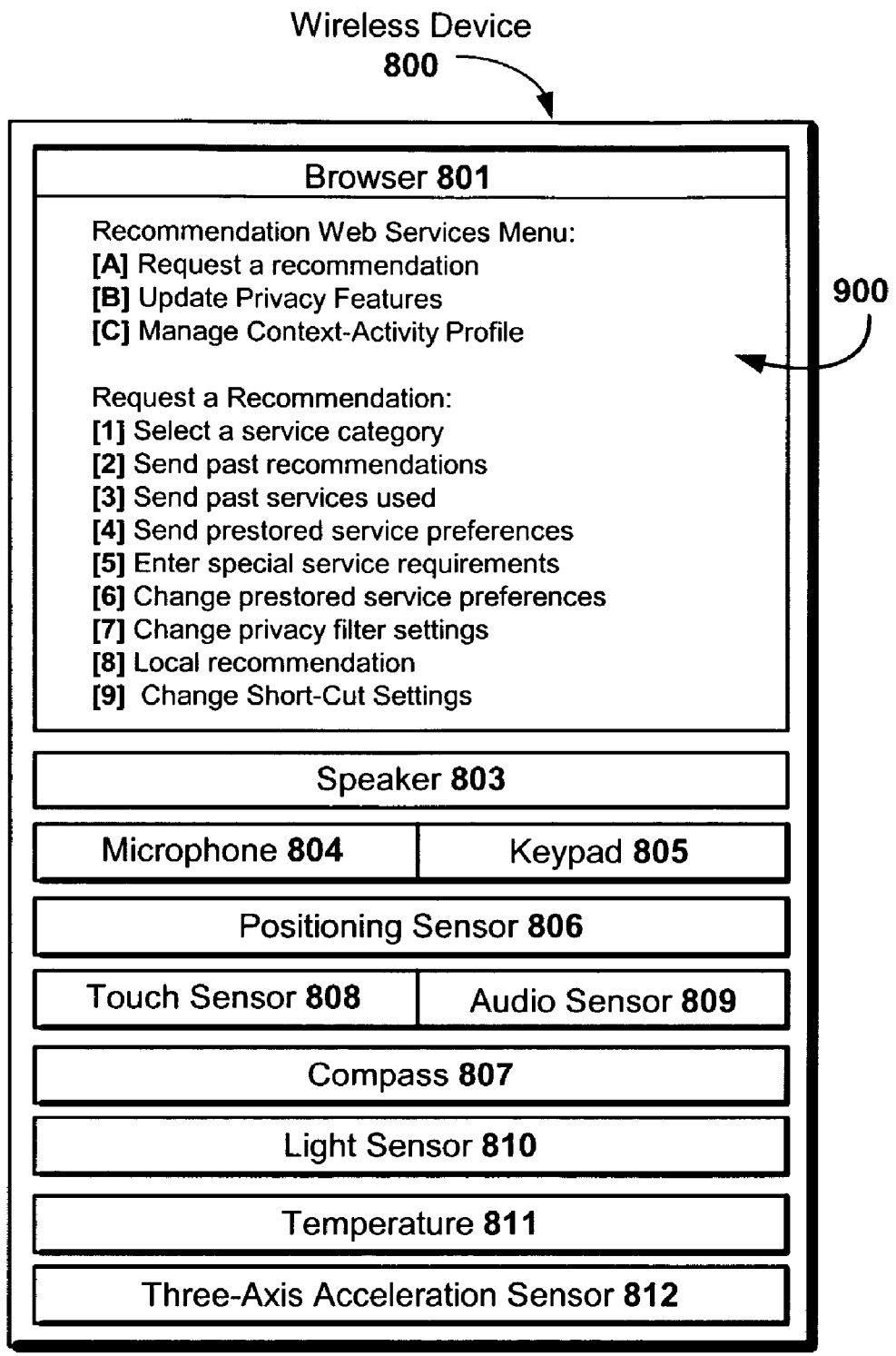
FIG. 9A illustrates an example of the user's wireless device displaying a RECOMMENDATION WEB SERVICES MENU.

In FIG. 9A, the user's portable wireless device 800 includes the browser 801 which displays the Recommendation Web Services menu 900, to enable the user to navigate through the cards or pages being displayed and to select options that are programmed by the application programs 813. Recommendation Web Services Menu 900 may provide the user with the following options to select:

[A] Request a Recommendation,
[B] Update Privacy Features and
[C] Manage Context-Activity Profile.

The Request A Recommendation menu may display the following options:
 [1] Select A Service Category
 [2] Send past recommendations
 [3] Send Past services Used
 [4] Send Prestored Service Preferences
 [5] Enter Special Service Requirements
 [6] Change Prestored Service Preferences
 [7] Change Privacy Filter Settings
 [8] Local Recommendation
 [9] Change Short-Cut Settings Reference to FIG. 11A illustrate how processes to be implemented at the wireless device 800 or the network server 826 may be invoked through the menu selection of FIG. 9A. One or more of the processes to be discussed below, particularly the recommendation related processes, may alternatively be invoked upon initiation of browser 801 or some other triggering event.

Figure 11C:
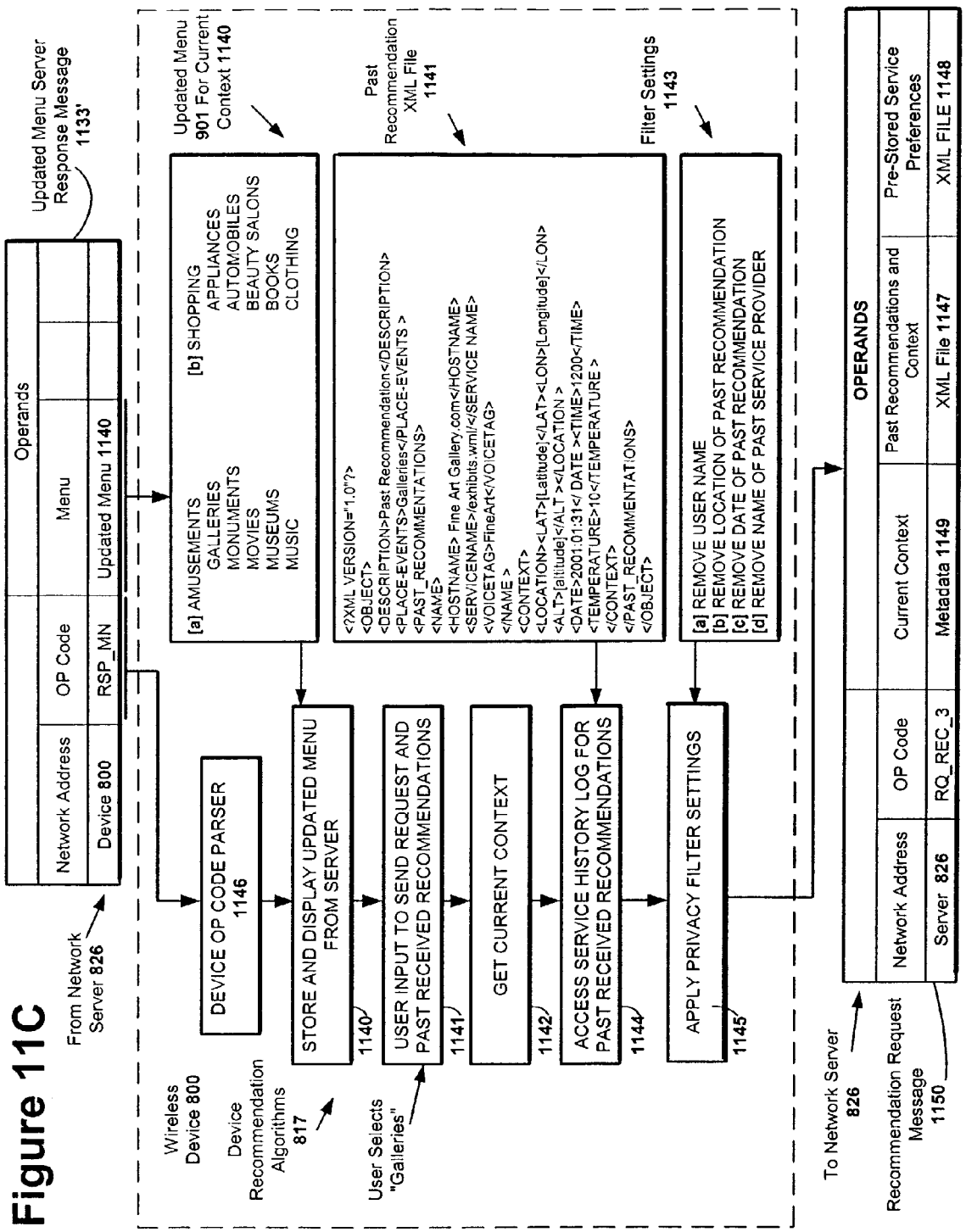
FIG. 11C is a flow diagram of an exemplary process in a wireless device to display the updated menu on the device's browser and process the user's request for a recommendation by gathering past received recommendations from the service history log and pairing them with the current context of the device, and sending the context-activity pair in a recommendation request message to a network server.

As shown in FIG. 11A, the option 1101 to [1] SELECT A SERVICE CATEGORY invokes process 1119 in the user's device 800, to RETRIEVE UPDATED SERVICE CATEGORY MENU, as shown further in FIGS. 11B and 11C. Process 1119 of FIG. 11A sends updated menu request message 1133 to process 1127 in the network server 826, to UPDATE SERVICE CATEGORY MENU, as shown in FIG. 11B. The updated menu 901 (FIG. 9B) is returned in updated menu response message 1815, as shown in FIGS. 11B and 11C. The updated menu 901 is displayed in the device's browser 801 in FIG. 9B. This same sequence of steps is automatically performed by the wireless device 800 and the network server 826 in response to wireless device 800 automatically transmitting messages with a unique op code designating that the message is an automatically transmitted message.

Figure 11D:
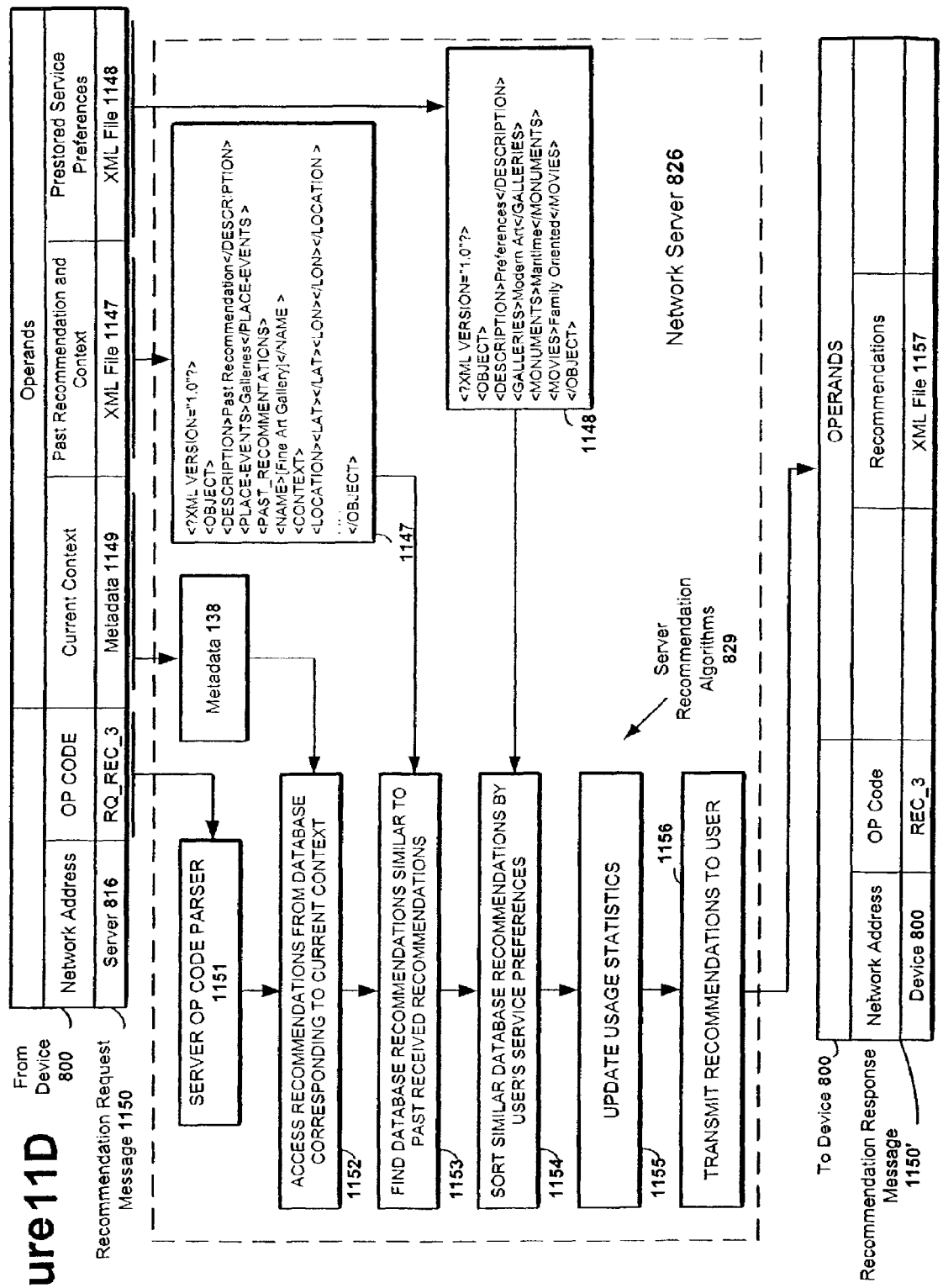
FIG. 11D is a flow diagram of an exemplary process in the network server to respond to the recommendation request message from the device, by accessing recommendations from the database corresponding to the current context, finding recommendations among those accessed from the database that are similar to the past received recommendations provided in the recommendation request message, sorting the found recommendations in accordance with the user's service preferences also provided in the recommendation request message, and returning the resultant recommendations to the device in a recommendation response message.
Figure 11E:
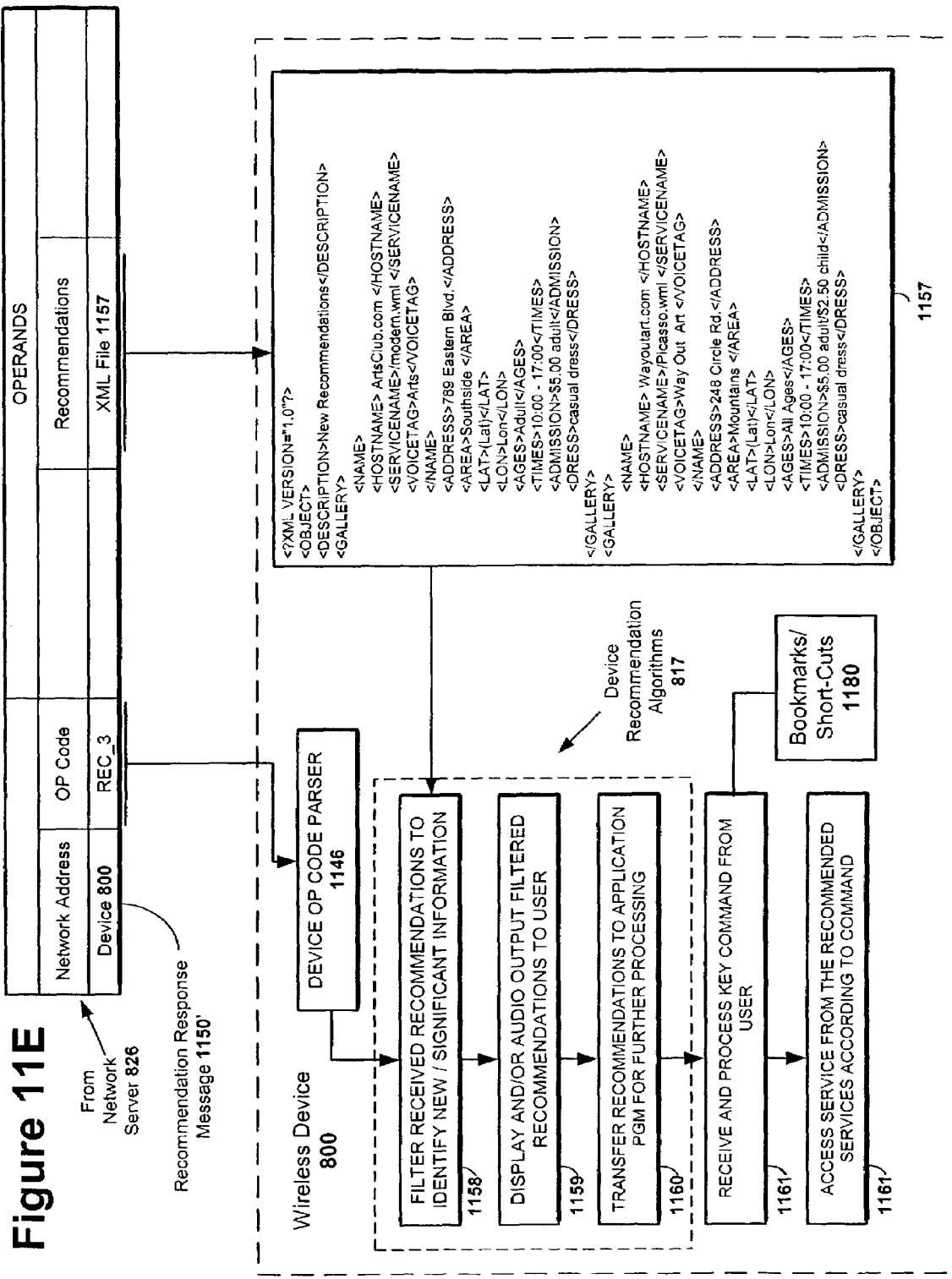
FIG. 11E is a flow diagram of an exemplary process in the wireless device to filter the recommendations received in the recommendation response message and output the filtered recommendations on the device's browser.

The option 1102 to [2] SEND PAST RECEIVED RECOMMENDATIONS invokes process 1120 in the user's device 800, to SEND CONTEXT & PAST RECEIVED RECOMMENDATIONS, as shown in FIGS. 11D and 11E. Process 1120 sends recommendation request message 1111 to process 1128 in the network server 826, to PROVIDE NEW RECOMMENDATIONS CORRESPONDING TO PAST RECOMMENDATIONS as shown in FIG. 11D. The recommendations 1157 (FIG. 11E) are returned in recommendation response message 1112. The recommendations 1157 are displayed 908 in the device's browser 801 in FIG. 9H. This same sequence of steps is automatically performed by the wireless device 800 and the network server 826 in response to the wireless device 800 automatically transmitting messages with a unique op code designating that the message is an automatically transmitted message.

The option 1103 to [3] SEND PAST SERVICES USED invokes process 1121 in user's device 800, to SEND CONTEXT AND PAST SERVICES USED, as shown in FIGS. 11F & G. Process 1121 sends recommendation request message 1113 to process 1129 in network server 826, to PROVIDE NEW RECOMMENDATIONS CORRESPONDING TO PAST SERVICES USED, as shown in FIG. 11F. The recommendations 1157 are returned in recommendation response message 1820, as shown in FIG. 11G. Recommendations 1157 are displayed in the device's browser 801 in FIG. 11H. This same sequence of steps is automatically performed by wireless device 800 and network server 826 in response to wireless device 800 automatically transmitting messages with a unique op code designating that the message is an automatically transmitted message.

The option 1104 to [4] SEND PRESTORED SERVICE PREFERENCES invokes process 1122 in the user's device 800, to SEND CONTEXT AND PRESTORED SERVICE PREFERENCES in the pre-stored service preferences file 1122, as shown in FIGS. 11D & F. An example of pre-stored service preferences is shown displayed 903 in the browser 801 of FIG. 9D. Process 1122 sends message 1115 to process 1824 in network server 826, to PROVIDE RECOMMENDATIONS CORRESPONDING TO SERVICE PREFERENCES. The recommendations 908 are returned in message 1821.

Option 1105 to [5] ENTER SPECIAL SERVICE REQUIREMENTS invokes process 1123 in user's device 800, to SEND CONTEXT AND SPECIAL SERVICE REQUIREMENTS. An example of special service requirements is shown displayed 902 in the browser 801 of FIG. 9C. Process 1123 sends message 1117 to process 1131 in network server 826, to PROVIDE RECOMMENDATIONS CORRESPONDING TO SPECIAL REQUIREMENTS. The recommendations 908 are returned in message 1118.

The option 1106 to [6] CHANGE PRESTORED SERVICE PREFERENCES invokes process 1124 in user's device 800, to CHANGE PRESTORED SERVICE PREFERENCES. An example of a menu to change pre-stored service preferences is shown displayed 903 in the browser 801 of FIG. 9D.

The option 1107 to [7] CHANGE PRIVACY FILTER SETTINGS invokes process 1125 in user's device 800, to CHANGE PRIVACY FILTER SETTINGS. An example of a menu to change privacy filter settings is shown displayed 904 in the browser 801 of FIG. 9E.

The option 1108 to [8] LOCAL RECOMMENDATION invokes process 1125 in the user's device, to initiate LOCAL RECOMMENDATION, e.g., to determine service recommendations locally at the user's device. An example of a menu to initiate local recommendation is shown displayed 905 in the browser 801 of FIG. 9F. The local recommendations may be determined from a database of [a] past used services or [b] downloaded services from a network server, such as server 826. An example of service recommendations displayed on the browser 801 is shown in FIGS. 9H through 9L. Additional options, such as ones to change short-cut setting may also be utilized to initiate associated processes.

As the user carries about wireless device 800, sensors 806-812 continuously measure the geographic location and context of the device, which are compiled into a metadata vector 1134 representing the current context (FIG. 11B). Wireless device 800 periodically transmits the current context in an updated menu request message 1133, shown in FIG. 11B, over the wireless network 831 to the network server 826. The updated menu request message 1133 includes the network address of the server 826, an op code value RQ_MN that designates the message as an updated menu request message, and an operand portion containing the current context. The network server 826 of FIG. 11B includes a server op code parser 1134 that interprets the op code value RQ_MN as indicating that the message is an updated menu request message 1133. In response, the server op code parser 1134 invokes step 1135 of the server recommendation algorithms 829. Step 1135 gets from a database a list of services provided by regional advertisers corresponding to the current context of the device 800. Step 1135 flows to step 1136, which gets from a database a list of services provided by regional points of interest, such as galleries, monuments, museums, and the like, corresponding to the current context of the device 800.

Step 1136 flows to step 1137, where the list of services provided by regional advertisers and the list of services provided by regional points of interest are filtered for weather related and time related service categories, eliminating those services that cannot be used by the user in the current context. For example, night_baseball is eliminated, if the current context is "daytime". Hiking_nature_trail is eliminated if the current context is "bad weather". Likewise, in a digital service scenario, electronic_stock_trading may be eliminated, if the current context is "nighttime". Step 1137 flows to step 11134, where the updated menu message 1133' is prepared. The updated menu message 1133' includes the network address of the device 800, op code RSP_MN that designates the message as an updated menu server response message, and operands. The operands include the updated menu 1133 (FIG. 11C). The updated menu 1133 is returned to the device 800 in the updated menu response message 1133', as shown in FIGS. 11B and 11C. This same sequence of steps is automatically performed by the wireless device 800 and the network server 826 in response to the wireless device 800 automatically transmitting messages with a unique op code designating that the message is an automatically transmitted message.

The device op code parser 1134 in FIG. 11C interprets the op code value "RSP_MN" as indicating that the message is an updated menu server response 1133'. In response, the device op code parser 8206 invokes step 1120 of the device recommendation algorithms 817. Step 1120 stores and displays the updated menu 1120 in the device's browser 801 in FIG. 9B.

The user can initialize the device 800 by entering special service requirements as shown in the browser 801 of FIG. 9C. Examples of special service requirements that can be stored in the service history log 815 of device 800 are:
  [a] AGE REQUIREMENT:
    ALL AGES/CHILD AGE RANGE/ADULTS ONLY
  [b] TIME OF DAY REQUIREMENT:
    EARLIEST/LATEST
  [c] MAX WALKING DISTANCE
  [d] PRICE RANGE
  [e] PREFERRED DRESS:
    CASUAL/DRESSY/FORMAL
  [f] HANDICAPPED FACILITIES:
    RAMPS/HAND RAILS/REST ROOMS.

The user can initialize the device 800 by entering stored service preferences, as shown in the browser 801 of FIG. 9D. Examples of stored service preferences that can be stored in the service history log 815 of device 800 are:
  GALLERIES [modern art]
  MONUMENTS [maritime history]
  MOVIES [family oriented]
  MUSEUMS [technology; natural history]
  MUSIC [jazz]
  NIGHT LIFE [professional sports]
  OUTDOORS/FITNESS [sailing; cycling]
  RESTAURANTS [casual]
  THEATER [orchestral]
  NEWS [sports]

The user can initialize the device 800 by entering privacy filter settings, as shown in the browser 801 of FIG. 9E. Privacy filter settings are used to remove the user's private information from the messages sent by the device 800 to the network server 826. Examples of privacy filter settings that can be stored in the device 800 are:
  FOR CURRENT REQUESTS:
  [a] REMOVE USER NAME
  [b] ENTER OTHER DATA TO REMOVE
  FOR PAST RECOMMENDATIONS:
  [a] REMOVE USER NAME

[b] REMOVE LOCATION OF PAST RECOMMENDATION
[c] REMOVE DATE OF PAST RECOMMENDATION
[d] REMOVE NAME OF PAST SERVICE PROVIDER
[e] ENTER OTHER DATA TO REMOVE

The service history log 815 in the user's device 800 may store activities in five component databases: [1] past recommendations and context, [2] past services used and context, [3] pre-stored service preferences, [4] special requested service requirements, and [5] services and short-cuts. An example is shown in FIG. 10 of the two component databases: [1] past recommendations and context 1000 and [2] past services used and context 1001. The embodiment of the database shown in FIG. 10 uses extensible markup language (XML) files to provide a coherent view of the wide variety of data that can be used to characterize a contexts, services, and recommendations.

To specify the current context, XML tags are used to categorize each type of context data that characterizes the current context. Each unit context data is delineated by a beginning tag and an ending tag, forming an element. For example, the element "<TEMPERATURE>10 degrees Celsius</TEMPERATURE>"

defines the category as temperature, and specifies the data as "10 degrees Celsius". As another example, the element "<LAT>38 degrees, 48 minutes North</LAT>"

defines the category as geographic latitude, and specifies the data as "38 degrees, 48 minutes North". Another feature of XML is its ability to specify a hierarchy in the categories of data. For example, geographic location is normally specified as both a latitude and a longitude. The categories of data for latitude and longitude can be thought of as "child" categories within the category for geographic location. XML expresses this hierarchy as follows:

```
<LOCATION>
  <LAT>38 degrees, 48 minutes North</LAT>
  <LON>76 degrees, 38 minutes West</LON>
</LOCATION>
```

A typical specification of the context for an activity stored in the service history log 815 would be, for example:

```
<CONTEXT>
<LOCATION>
  <LAT>38 degrees, 48 minutes North</LAT>
  <LON>76 degrees, 38 minutes West</LON>
  <ALT>400 meters</ALT>
/LOCATION>
<DATE>2001:01:31</ DATE>
<TIME>1100</TIME>
<TEMPERATURE>10 degrees Celsius </TEMPERATURE>
</CONTEXT>
```

A typical specification of the short-cut for service stored in the service history log 815 may be, for example:

```
<NAME>
  <HOSTNAME> HistoryMuseum.com</HOSTNAME>
  <SERVICENAME>/exhibits.wml/</SERVICE NAME>
  <BOOKMARK>History</BOOKMARK>
</NAME>
```

By expressing the context in the service history log 815 in XML, the stored expression is both human and machine readable, it defines the content, and it defines the hierarchical structure of the content. XML also separates the appearance of the content from the structure of the content, so that the content can be displayed in any format by using customized style sheets in each different type of display device. Extensible Stylesheet Language (XSL) can provide flexible document presentation, enabling the content of an XML file to be displayed on the large display screen of a personal computer, as well as in the browser 801. Messages exchanged between the wireless device 800 and the network server 826 can include XML files carried in the Simple Object Access Protocol (SOAP) messaging protocol or the SyncML synchronization protocol. For additional background on XML, see the book by Heather Williamson, *XML: The Complete Reference*, Osborne/McGraw-Hill, 2001.

Both the wireless device 800 and the network server 826 may be configured to interpret the tags of the XML elements in the XML file in the same way. This can be accomplished by incorporating the same XML tag parser in both the device recommendation algorithms 817 of the wireless device 800 and in the server recommendation algorithms 829 of the network server 826. In its simplest form, the XML tag parser can be a simple string comparison function that searches the XML file for XML tag strings, such as the beginning tag "<LOCATION>" and the ending tag "</LOCATION>". When it finds the a particular beginning tag, it gets the data located between the beginning tag and the ending tag and passes the data as "location data" to program subroutines that operate on location data. Such program subroutines include the database search routine in the server recommendation algorithms 829 in the server 826, that forms a query from the latitude and longitude data to search for recommendations for services in the database 830 having similar or related to the latitude and longitude values.

Another way for both the wireless device 800 and the network server 826 to interpret the tags of the XML elements in the XML file in the same way, is by means of a standard XML parser. The two principal, standard XML parsers are the Simple API for XML (SAX) event-based parser and the Document Object Model (DOM) tree-based parser. The principal difference between them is in the way the XML data is made available to the client application, such as the device recommendation algorithms 817. SAX is an event driven model, wherein the client application is continuously notified as the XML document features are recognized by the parser. As the SAX parser reads an XML file, it sends to the application program 817 information from the XML file in real time. Each time the parser sees a beginning tag, an ending tag, character data, or a processing instruction, it reports it to the client application. The entire XML file does not have to be read before acting on the data at the beginning of the file. The entire document does not have to reside in memory, which can be an advantage for the wireless device 800.

The Document Object Model (DOM) model parser is object based, on the other hand, wherein the entire XML document is parsed and stored as a hierarchical tree of objects that the client application can then randomly access. A document type definition (DTD) is available to both the wireless device 800 and in the network server 826, either being stored locally or at a server they can reference. A DTD is a set of declarations that specify the allowed order, structure, and meaning of the tags for a particular XML file. The XML file references the DTD that governs its order, structure, and meaning, at a specified location, such as the directory of the local filesystem, and its filename as a handle. Standard XML parsers are part of many operating systems now available. A DOM tree-based parser reads in the DTD and the XML file and converts the XML file into programming constructs accessible to the application logic. A document type declaration element must appear in the XML file to indicate the DTD to which the XML file complies and where to find it. It starts with "<DOCTYPE" and ends with ">". The example given below is <DOCTYPE OBJECT "xml_directory\object.dtd">.

Each XML file begins with a processing instruction that gives information to an XML processor in both the wireless device 800 and the network server 826. It starts with "<?" and ends with ">". The example given below is

<?XML VERSION="1.0"?>.

An example of a complete XML file specifying a past recommendation received by the device 800 and the context in which it was received, is shown in the following TABLE A, which is the XML file 1141 taken from the service history log 815 of FIG. 10.

TABLE A

Example of an XML File Specifying a Past Recommendation

```
<?XML VERSION="1.0"?>
<DOCTYPE PAST_RECOMMENDATIONS_OBJECT
"xml_directory\object.dtd">.
    <PAST_RECOMMENDATIONS_OBJECT>
    <DESCRIPTION>Past Recommendation</DESCRIPTION>
    <PLACE-EVENTS>Museums</PLACE-EVENTS>
    <PAST_RECOMMENDATIONS>
        <NAME>
    <HOSTNAME>HistoryMuseum.com</HOSTNAME>
    <SERVICENAME>/exhibits.wml/</SERVICE NAME>
    <BOOKMARK>History</BOOKMARK>
    </NAME>
    <CONTEXT>
      <LOCATION>
      <LAT>38 degrees, 48 minutes North</LAT>
      <LON>76 degrees, 38 minutes West</LON>
      <ALT>400 meters</ALT>
    </LOCATION>
    <DATE>2001:01:31</DATE>
    <TIME>1100</TIME>
    <TEMPERATURE>10</TEMPERATURE>
    <METAVECTOR>FF12AB34CD</METAVECTOR>
    </CONTEXT>
        </PAST_RECOMMENDATIONS>
        </PAST_RECOMMENDATIONS_OBJECT>
```

An abbreviated example of a corresponding document type definition (DTD) that specifies the allowed order, structure, and meaning of the tags for a past recommendation XML file, is shown in the following TABLE B. This example may be part of a file named "object.dtd" stored in the local filesystem directory named "xml_directory" in both the wireless device 800 and the network server 826. It illustrates, for example, that the PAST_RECOMMENDATIONS element must include the NAME of the past recommended service, and the CONTEXT in which it was recommended. The NAME element should include the HOSTNAME, the SERVICENAME, and the BOOKMARK. The CONTEXT element must include the LOCATION, the DATE, the TIME, the TEMPERATURE, and the METAVECTOR containing the metadata vector 1134 characterizing the context of device. The LOCATION element must include latitude LAT, the longitude LON, and the altitude ALT of the device.

TABLE B

Abbreviated Example of a Document Type Definition (DTD)

```
<!ELEMENT PAST_RECOMMENDATIONS_OBJECT
(DESCRIPTION, PLACE-EVENTS, PAST_RECOMMENDATIONS)>
<!ELEMENT PAST_RECOMMENDATIONS (NAME,
SERVICE, CONTEXT)>
<!ELEMENT NAME (HOSTNAME, SERVICENAME)>
<!ELEMENT CONTEXT (LOCATION, DATE, TIME,
TEMPERATURE, METAVECTOR)>
<!ELEMENT LOCATION (LAT, LON, ALT)>
```

In a complete DTD for the XML file of TABLE A, the data elements, such as

"<LAT>38 degrees, 48 minutes North</LAT>"

would be specified in the DTD as

"<!ELEMENT LAT (#PCDATA)>"

to indicate that these elements are present and contain only data, and do not contain other elements.

Great flexibility is provided by the use of XML to define the data to be included in the files of the five component databases of the service history log 815: [1] past recommendations and context, [2] past services used and context, [3] pre-stored service preferences, [4] special requested service requirements and [5] services and short-cuts (e.g., tags). These XML files can be readily identified, accessed, and their elements parsed to obtain the relevant data pertaining to each category. The meaning of the data is assured by its location in a known element type. The XML files, themselves, can be included in the messages exchanged between the wireless device 800 and the network server 826. This can be seen in the following discussion of the process 1120 in the wireless device 800 of FIG. 11A, to process the user's request for a recommendation by gathering XML files 1141 of past received recommendations from the service history log 815 and pairing them with the current context of the device. The context-activity pair is then sent in a recommendation request message 1111 to the network server 826.

In FIG. 9A, the user selects the option [2] SEND PAST RECEIVED RECOMMENDATIONS. Then, in FIG. 9B, the user selects the service category of "GALLERIES" from the service category menu 901, 1120. Then in FIG. 11C, step 1141, the wireless device 800 receives the user's input and flows to step 1142 to get the current context. The process then flows to step 1144 to access the service history log 815 for XML files 1141 of past received recommendations. The process then flows to step 1144 to apply privacy filter settings 1142 to the data in the XML files 1141. For example, step 1144 can remove any occurrence of the user's name, the location of past recommendations, the date of past recommendations, the name of past service providers, and the like. Then, the recommendation request message 1150 is assembled. The recommendation request message 1150 includes the network address of the server 826, an op code "RQ_REC_3" that designates the message as a recommendation request message, and the operands. The operands include the current context expressed in a separate field as the metadata vector 1134, the past recommendation and context XML file 1147, and the pre-stored service preferences XML file 1148. The wireless device 800 then sends recommendation request message 1150 to the network server 826, as shown in FIG. 11D.

FIG. 11D is a flow diagram of the process in the network server 826 to respond to the recommendation request message 1150 from the device 800. The network server 826 of FIG. 11D includes the server op code parser 1151 that interprets the op code value "RQ_REC_3" as indicating that the message is a recommendation request message 1150. In response, the server op code parser 1151 invokes step 1152 of the server recommendation algorithms 829. Step 1152 receives the metadata vector 1134 from the message 1150 and accesses recommendations from the database 830 corresponding to the current context. The process then flows to step 1153 which searches through the accessed recommendations obtained from the database to find those similar to the past received recommendations 1147 input from the message 1150. The process then flows to step 1154 which sorts the similar recommendations in accordance with the user's preferences 1148, also received in the message 1150. The user's preferences 1148 is shown as the example XML file of TABLE C, as follows:

TABLE C

Example of an XML File Specifying User Preferences

<?XML VERSION="1.0"?>
<PREFERENCES_OBJECT>
<DESCRIPTION>Preferences</DESCRIPTION>
<GALLERIES>Modern Art</GALLERIES>
<MONUMENTS>Maritime</MONUMENTS>
<MOVIES>Family Oriented</MOVIES>
</PREFERENCES_OBJECT>

The process then flows to step 1155 which updates usage statistics and stores them in a database. The process then flows to step 1156 which assembles the recommendation response message 1150' and transmits it back to the wireless device 800. The recommendation response message 1150' includes the network address of the wireless device 800, the op code "REC_3" that designates the message as a recommendation response message, and the operands. The operands include the recommendations XML file 1157.

FIG. 11E is a flow diagram of a process in the wireless device 800 to filter the recommendations received in the recommendation response message and display the filtered recommendations on the device's browser. The device op code parser 1146 in FIG. 11E interprets the op code value "REC_3" as indicating that the message is a recommendation response message 1150'. In response, the device op code parser 1146 invokes step 1158 of the device recommendation algorithms 817. Step 1158 filters the recommendations XML file 1157 received in message 1150'. The filtering identifies new or significant information in the recommendations XML file 1157. This can be accomplished by comparing the recommendations XML file 1157 with the past recommendations XML files 1141 in the service history log 815. The process then flows to step 1159 which displays the filtered recommendations to the user on the browser 801 shown in FIG. 9G. An XSL Stylesheet can be used to display the desired content of the recommendations XML file 1157 in the browser 801. FIG. 9G shows the result of a first filtering criterion of "FILTER=NO AGE RESTRICTION". The one of the two recommendations displayed in FIG. 9G has the characterization "Ages: Adult". Alternately, if the filtering criterion were "FILTER=FAMILY ORIENTED" as provided in FIG. 9G, then only one of two potential recommendations is displayed, the displayed recommendation having the characterization "Ages: All Ages". The process then flows to step 1160 which optionally transfers the recommendations 1157 to the application programs 813 for further processing. This same sequence of steps is automatically performed by the wireless device 800 and the network server 826 in response to the wireless device 800 automatically transmitting messages with a unique op code designating that the message is an automatically transmitted message.

The process then continues to step 1161 in which the wireless device receives the user's command and identifies the service (from the recommended services) with a user shortcut 1180. At step 1161, the wireless device accesses the identified service. For example, the user may input command "Arts" or any equivalent thereof to initiate access to the service "Artsclub.com". As shown in FIG. 11E, the short for the recommended services may be received from the server 826 as tags in an XML file.

The recommendations XML file 1157 providing two digital service recommendations for galleries, is shown as the example XML file of TABLE D, as follows:

TABLE D

Example of an XML File Specifying New Recommendations

<?XML VERSION="1.0"?>
<DOCTYPE RECOMMENDATIONS_OBJECT
"xml_directory\object.dtd">.
<RECOMMENDATIONS_OBJECT>
 <DESCRIPTION>New Recommendations</DESCRIPTION>
 <RECOMMENDATION>
  <NAME>
   <HOSTNAME>Artsclub.com</HOSTNAME>
    <SERVICENAME>[service name or extension]
    </SERVICENAME>
    <BOOKMARK>Arts</BOOKMARK>
  </NAME>
   <LOCATION>
    <ADDRESS>789 Eastern Blvd.</ADDRESS>
    <AREA>Southside</AREA>
    <LAT>(Lat)</LAT>
    <LON>Lon</LON>
   </LOCATION>
   <AGES>Adult</AGES>
   <TIMES>10:00-17:00</TIMES>
   <ADMISSION>$5.00 adult</ADMISSION>
   <DRESS>casual dress</DRESS>
 </RECOMMENDATION>
 <RECOMMENDATION>
  <NAME>
   <HOSTNAME>Wayoutart.com</HOSTNAME>
    <SERVICENAME>[service name or extension]
    </SERVICENAME>
    <BOOKMARK>Way Out</BOOKMARK>
  </NAME>
   <LOCATION>
    <ADDRESS>248 Circle Rd.</ADDRESS>
    <AREA>Mountains </AREA>
    <LAT>(Lat)</LAT>
    <LON>Lon</LON>
   </LOCATION>
   <AGES>All Ages</AGES>
   <TIMES>10:00-17:00</TIMES>
   <ADMISSION>$5.00 adult/$2.50 child</ADMISSION>
   <DRESS>casual dress</DRESS>
 </RECOMMENDATION>
</RECOMMENDATIONS_OBJECT>

An abbreviated example of a corresponding document type definition (DTD) that specifies the allowed order, structure, and meaning of the tags for a new recommendation XML file 1157, is shown in the following TABLE E. This DTD is part of a file named "object.dtd" stored in the local filesystem directory named "xml_directory" in both the wireless device 800 and the network server 826. It illustrates, for example, that new RECOMMENDATIONS sent to the wireless device 800 should include NAME and LOCATION of the service, but it does not include the complete CONTEXT. The NAME should include HOSTNAME, SERVICENAME, BOOK-MARK; and the LOCATION should include ADDRESS, AREA, LAT, LON. The DTD can provide for optional data in the XML file, as well, by including other elements, such as "<ADMISSION>" and designating them with an asterisk "*" so that they are not necessarily required in each XML file. The same XML tag parser in both the device recommendation algorithms 817 of the wireless device 800 and in the server recommendation algorithms 829 of the network server 826, can search the XML file for optional XML tag strings, such as the beginning tag "<ADMISSION>" and the ending tag "</ADMISSION>", and if they are found, the XML tag parser gets the data located between the tags and passes it as "admission data" to program subroutines that operate on admission data.

TABLE E

Abbreviated Example of a DTD for New Recommendations

<!ELEMENT RECOMMENDATIONS_OBJECT (DESCRIPTION, RECOMMENDATION)>
<!ELEMENT RECOMMENDATION (NAME, LOCATION, ADMISSION*)>
<!ELEMENT NAME (HOSTNAME, SERVICENAME, TAG)>
<!ELEMENT LOCATION (ADDRESS, AREA, LAT, LON)>
<!ELEMENT ADMISSION (#PCDATA)>

To enable the wireless device 800 to read the XML recommendations file 1157 of TABLE D, a DOM tree-based parser in the device 800 reads in the DTD of TABLE E and the XML file 1157 received from the network server 826. The DOM tree-based parser converts the XML file 1157 into a hierarchical tree data structure enabling the data for each element to be accessible to the application programs 813 and recommendation algorithms 817.

This process also works in reverse in the network server 826 and enables the network server to construct the XML recommendations file 1157. The DOM tree-based parser can read in the DTD of TABLE E and create the hierarchical tree data structure that serves as a template for the recommendation algorithm 829 in server 826. The recommendation algorithm 829 can then fill the nodes of the tree with recommendation data, such as ADDRESS data, AREA data, LAT data, and LON data. The DOM tree-based parser uses this newly created tree of data to create a corresponding XML recommendations file 1157 of TABLE D, that conforms to the DTD of TABLE E. The recommendation algorithm 829 and the DOM tree-based parser, in effect, work together as a document generator. The Document Object Model (DOM) defines the characteristics of the XML file hierarchical tree data structure and an application programming interface (API) for manipulating it. A description of DOM is provided on the web site http://www.w3.org/TR/DOM-Level-2-Core/. For additional information on the Document Object Model and the XML file hierarchical tree data structure, see the book by Elliotte Harold, et al, entitled *XML In A Nutshell*, O'Reilly & Associates, 2001.

In an alternate embodiment, the wireless device uses the SAX event-driven parser and the network server 826 uses the DOM tree-based parser. This arrangement confers the advantage of requiring a smaller memory allocation for the SAX parser in the wireless device 800 and yet it provides the capability of the DOM parser to construct the XML recommendations files 1157 in the network server 826.

In another alternate embodiment, Extensible Hypertext Markup Language (XHTML) can be used to display in the wireless device 800 the recommendations 1157 in step 1159 which are received from the network server 826. XHTML is a hybrid between HTML and XML specifically designed for network device displays. A subset of XHTML is XHTML Basic, which defines a document type that is rich enough to be used for content authoring and precise document layout, yet can be shared with wireless mobile devices 800 with small screens, such as PDAs and cell phones. XHTML Basic is the mobile adaptation of XHTML, and includes everything in XHTML except those capabilities, such as frames, that are not appropriate for devices with small screens. XHTML Basic is an XML-based standard, which allows the automatic parsing and transcoding of content through the use of Extensible Stylesheet Language Transformations (XSLT), part of the XSL style sheet language for XML. XSLT provides a language for transforming XML documents into other XML documents. Using XSLT, a system can automatically transform the same XML content into multiple markup languages depending on the browser 801. Through such transformations, content can be created for one type device and automatically transformed to appear on another type device. For example, the network server 826 can create its recommendations once in XML and use XSLT to dynamically convert it to XHTML Basic and HTML for presentation on mobile wireless devices 800.

XHTML Basic can used with cascading style sheets (CSS) to describe how documents are presented on screen in the browser 801. Through the use of CSS, document authors can control the presentation of documents without sacrificing device independence. The use of well-known standard HTML tags avoids storing multiple versions of content. The network server 826 does not need to provide for extra overhead for transcoding required to prepare content for an array of different markup languages. CSS enables a document author to specify the presentation of an application once for each type of device, by means of a corresponding style sheet. If the presentation needs to be changed at any time, the change is made once in the style sheet and the modification is dynamically reflected throughout all the pages in the network server 826. CSS separates the content of the document from the presentation. This allows creating browser-specific versions of the same content simply by creating a corresponding style sheet for each browser type. Then, when a user requests a page at the wireless device 800, the network server 826 server identifies the requesting device and returns the content with a link to the appropriate style sheet. The style sheet is downloaded once and cached by the browser 801 for use with subsequent pages, which speeds the rendering of all pages received from the network server 826. CSS enables every aspect of the appearance of the document, such as positioning, fonts, text attributes, borders, margin alignment, and flow, to be defined in the style sheet. A change to any aspect of the document's appearance needs to be made only once. CSS also gives carriers greater control over the look and feel of the services they provide through their wireless portal. The operator can use XHTML Basic to define a default style sheet for all devices it supports, which will ensure a basic look and feel consistent for all devices 800.

FIG. 11F is a flow diagram of the process in the network server 826 to respond to the recommendation request message 1150 from the device 800. FIG. 11F differs from FIG. 11D by showing how to find database recommendations that are similar to the past services used by the wireless device 800, instead of being similar to the past recommendations received by the device. The network server 826 of FIG. 11F includes the server op code parser 1151 that interprets the op code value "RQ_REC_4" as indicating that the message is a recommendation request message 1150. In response, the server op code parser 1151 invokes step 240 of the server recommendation algorithms 829. Step 1152 receives the metadata vector 1134 from the message 1150 and accesses recommendations from the database 830 corresponding to the current context. The process then flows to step 1153 which searches through the accessed recommendations obtained from the database to find those similar to the past services used XML file 1147 input from the message 1150. The process then flows to step 1154 which sorts the similar recommendations in accordance with the user's preferences 1148, also received in the message 1150. The process then flows to step 1155 which updates usage statistics and stores them in a database. The process then flows to step 1157 which assembles the recommendation response message 1150' and transmits it back to the wireless device 800. The recommendation response message 1150' includes the network address of the wireless device 800, the op code "REC_3" that designates the message as a recommendation response message, and the operands. The operands include the recommendations XML file 1157, which preferably include the service address of the recommended services (e.g., host name, service name) and one or more associated tags.

FIG. 11G is similar to the flow diagram of FIG. 11E, of the process in the wireless device 800 to filter the recommendations received in the recommendation response message and output, audibly or visually, the filtered recommendations on the device's browser. The process displays the filtered recommendations to the user on the browser 801. This same sequence of steps is automatically performed by the wireless device 800 and the network server 826 in response to the wireless device 800 automatically transmitting messages with a unique op code designating that the message is an automatically transmitted message.

Another example is when the user requests a location-based recommendation with the device 800. As discussed above, FIG. 10 shows the service history log 815 has accumulated data on past services used by the user of the device 800 and the contexts of those past services. The recommendation algorithms 817 automatically filters the service history log 815 and selects past services used by the user of the device 800 and the contexts of those past services, treating them as context-activity pairs. It is not necessary that these pairs of selected past services used and past contexts be related to the current context of the device 800. Two examples of these past pairs of selected past services used and past contexts are numbered [10] and [11] as follows:

[10] "location=xyz1; service=www.newsservice.com/ . . . / news.wml", and

[11] "location=xyz2; service=www.stockquotes.com/ . . . / quotes.wml".

The device 800 then sends these two automatically selected past pairs to the network server 826. The recommendation algorithms 817 filter out any reference to the user's ID before sending the pairs to the server. Then, device 800 then sends the current context "location=xyz3" to the network server 826. The current context "xyz3" can represent the airport, for example. When the network server 826 receives the two example past pairs of selected past services used and past contexts, it stores them in its database 830. Past pairs such as these can be accumulated from many users as recommendation resource in the database 830 for use by many other users. Examples of nine other past pairs previously accumulated in database 830 from other users are:

[1] "location=xyz3; service=www.airlines1.com/ . . . / timetables.wml",

[2] "location=xyz3; service=www.airlines2.com/ . . . / timetables.wml",

[3] "location=xyz3; service=www.airlines3.com/ . . . / timetables.wml",

[4] "location=xyz3; service=www.weatheronline.com/. . ./ weather.wml",

[5] "location=xyz4; service=www.horoscope1.com/ . . . / stars.wml",

[6] "location=xyz4; service=www.horoscope2.com/ . . . / stars.wml",

[7] "location=xyz5; service=www.emailservice1.com/. . ./ mail.wml",

[8] "location=xyz5; service=www.emailservice2.com/. . ./ mail.wml", and

[9] "location=xyz5; service=www.emailservice3.com/. . ./ mail.wml",

The network server 826 compares the current context "location=xyz3" the past contexts of past pairs previously accumulated in database 830. There are four matches:

[1] "location=xyz3; service=www.airlines1.com/ . . . / timetables.wml",

[2] "location=xyz3; service=www.airlines2.com/ . . . / timetables.wml",

[3] "location=xyz3; service=www.airlines.3com/ . . . / timetables.wml", and

[4] "location=xyz3; service= www.weatheronline.com/ . . . / weather.wml".

The network server 826 sends a list of the four past services used (by others) taken from the list of the four matches, as four recommendations to the user's device 800. The four recommendations are:

[1] service=www.airlines1.com/ . . . /timetables.wml",

[2] service=www.airlines2.com/ . . . /timetables.wml",

[3] service=www.airlines.3com/ . . . /timetables.wml", and

[4] service=www.weatheronline.com/ . . . /weather.wml".

The recommendation algorithms 817 in the user's device can filter these four recommendations received from the server, if desired. The filtered recommendations are then output, audibly or visually, to the user and one or more of these recommendations can be selected by user command or other input mechanism. The user's selected recommendations and the current context "location=xyz3" are then stored in the service history log 815. For example, if the user selects:

[2] service=www.airlines2.com/ . . . /timetables.wml", then this recommendation and the current context "location=xyz3" are stored in the service history log 815.

Figure 11H:
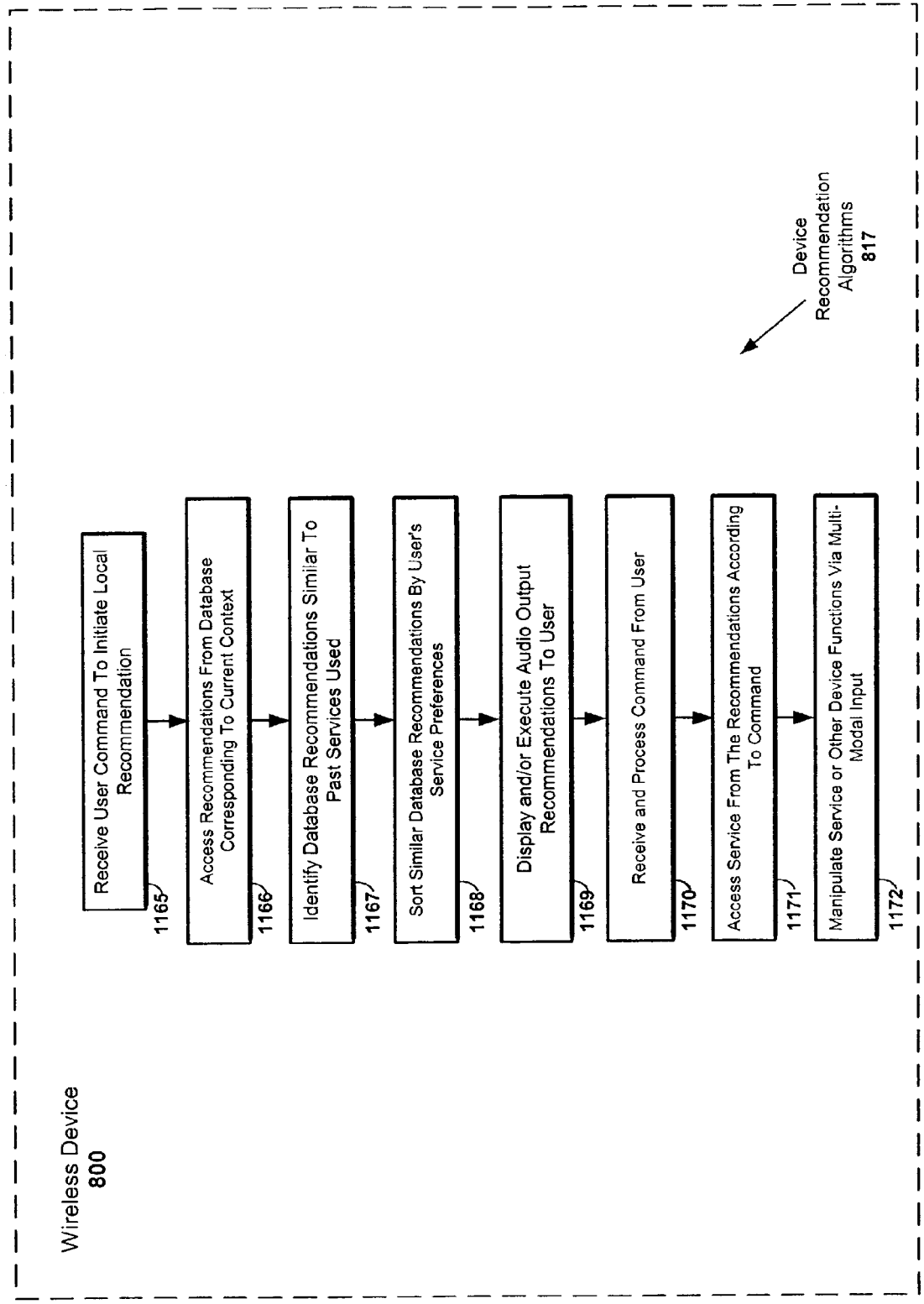
FIG. 11H is a flow diagram of an exemplary process in a wireless device 800 to determine recommended services and to enable access to such services via short cut.

FIG. 11H is a flow diagram of an exemplary process in the wireless device 800 to determine recommended services, via recommendation algorithms 817, and to enable access to such services via short-cut. The process commences at step 1165 in which a user command is received to initiate local recommendation process, such as menu item [8] LOCAL RECOMMENDATION of FIG. 9A. The wireless device 800 then accesses recommendations from database corresponding to a current context at step 1166, and identifies database recommendations similar to past service used at step 1167. At step 1168, the wireless device 800 sorts similar database recommendations by user's service preferences. Thereafter, at step 1169, the wireless device 800 visibly (or audibly) outputs the service recommendations to the user. The process continues at step 1170 with the wireless device 800 receiving a command (or other user input command), and performing any required processing for identifying services. At step 1171, the wireless device 800 accesses the identified service. Further browsing of the service or control of the device via multimodal user input can be processed at step 1172.

Figure 12:
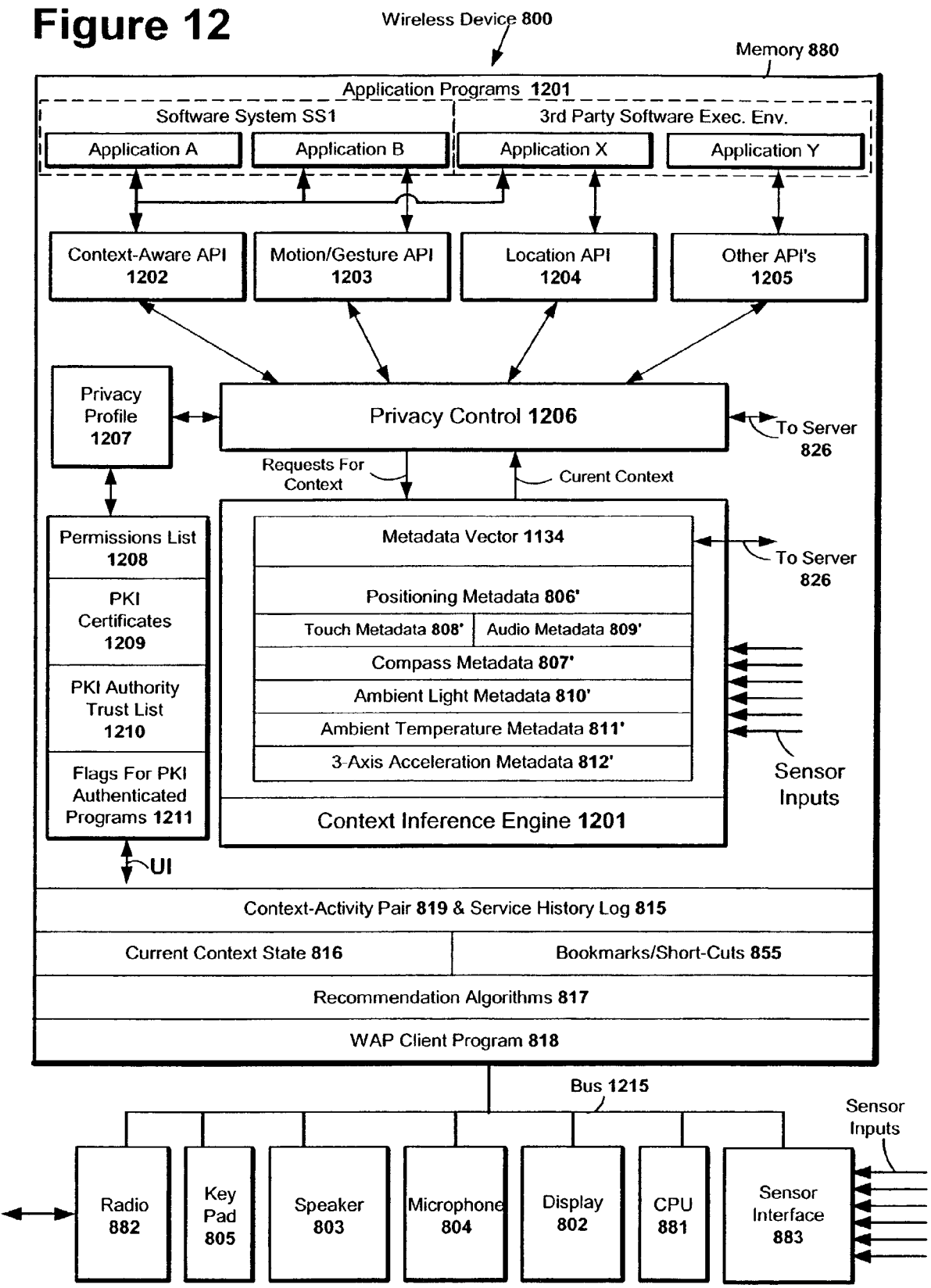
FIG. 12 is a functional block diagram of an example of a wireless device, showing its various components and programs.

Turning now to FIG. 12, a functional block diagram is shown of the wireless device 800, with its various components and programs. The memory 880 of the wireless device 800 is connected by means of the bus 1215 to radio 882, keypad 805, speaker 803, microphone 804, Display 802, which displays the browser 801, CPU 881, and Sensor Interface 883. Memory 880 stores the context-activity pair and service history log 815, which is shown in greater detail in a first example in FIG. 10 and in a second example in FIG. 17B. The memory 880 also stores the current context state 816 which includes a description of the environment of the wireless device 800 at the present time. As will be discussed further below, the characterization of the environment of the wireless device 800, may include generation of the metadata vector 1134 which includes information relating to the sensor signals input from the sensors at the current time. Also included in the memory 880 are recommendation algorithms 817 and WAP client program 818.

Figure 13:
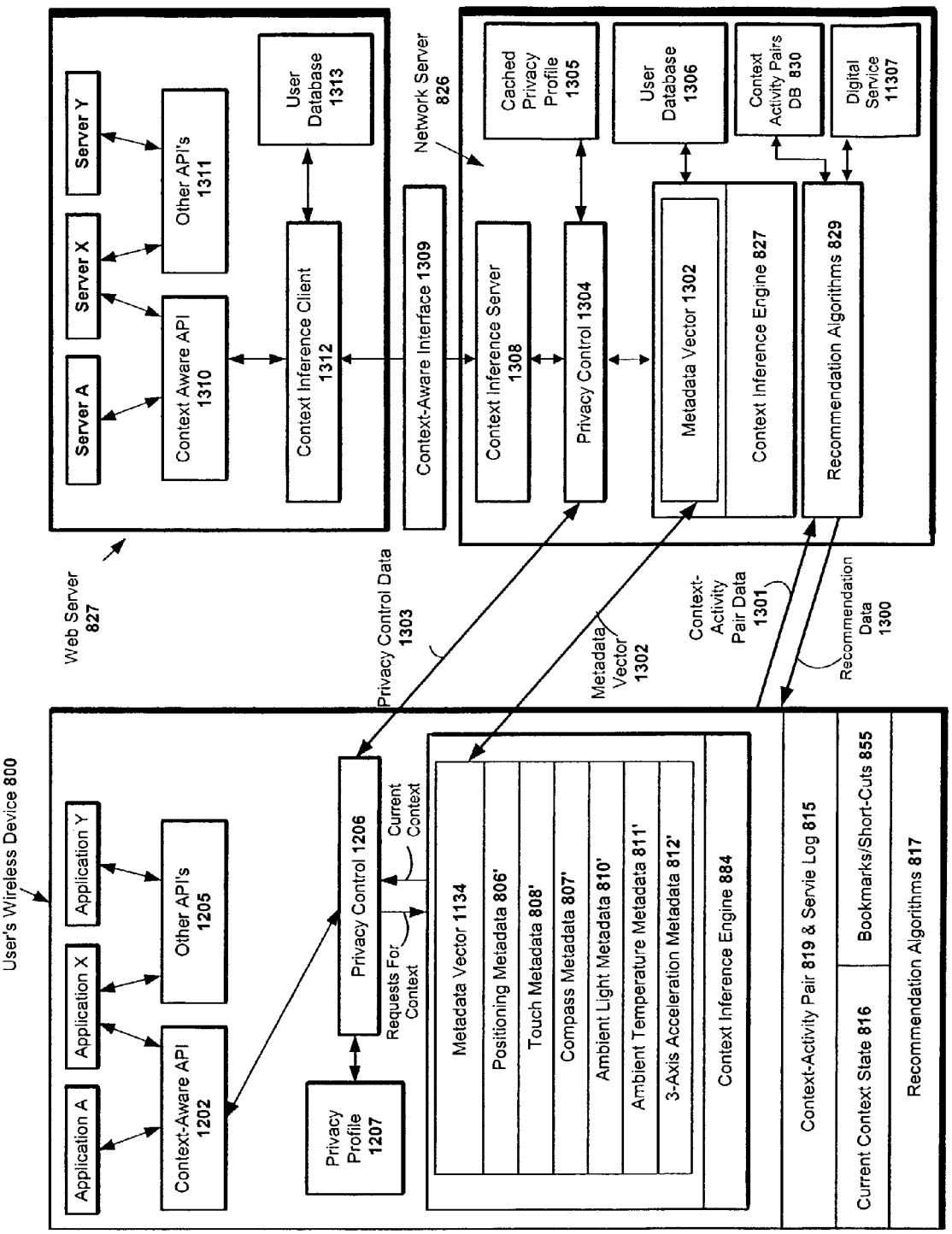
FIG. 13 is a functional block diagram of an example of a wireless device, a server, and a web server, and their interaction when exchanging a metadata vector and privacy control data and when exchanging a context-activity pair and associated recommendations.

FIG. 13 is a functional block diagram of the wireless device 800, the server 826 and the webserver 827 and their interaction when exchanging a metadata vector 1302 (see also 1134, FIG. 11B) and privacy control data 1303 and when exchanging a context-activity pair 1301 and associated recommendations 1300. FIG. 13 will be discussed in greater detail below in conjunction with the network process flow diagram of FIG. 14A which shows the interaction of the wireless device 800 with the network server 826 and the web server 831 when carrying out the determination of the current context of the wireless device 800.

Figure 14A:
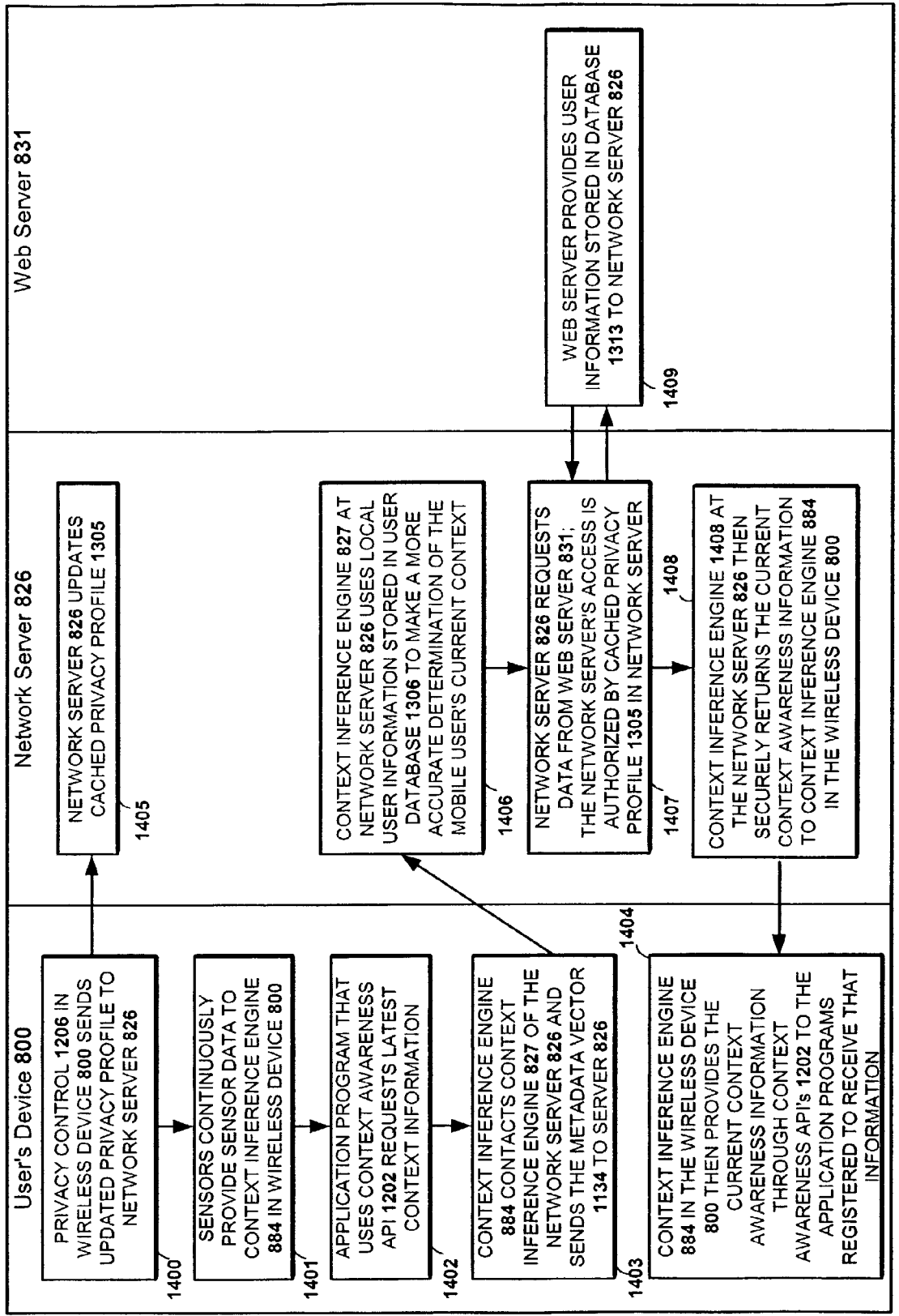
FIG. 14A is an exemplary network process flow diagram of the interaction of the wireless device, network server, and web server when carrying out the determination of the current context of the wireless device.

Turning now to FIG. 14A, a network process flow diagram is shown of the interaction of the wireless device 800 and the network server 826 when the user's wireless device sends a current context-activity pair to the network server 826 and the resultant service recommendations received back from the server 826. There are two ways that the user's device 800 can initiate sending the current context-activity pair to the server 826. The first way is shown in step 1410 of FIG. 14B, where the user's device 800 is programmed to automatically get the current context state 816 from the context inference engine 1201, and to select an appropriate activity from the history log 815, and to send the current context-activity pair to the server 826. The activities can be past recommendations made by the network server 826, past services used, pre-stored service preferences, special requested service requirements, or any combination of these. The second way that the device 800 can send a context-activity pair is shown in step 1411, where the user inputs a selection of an activity onto the request a recommendation sub menu shown in FIG. 16E or 16F. In response, the device 800 then gets the current context state 816 from the context inference engine 1201. The device 800 then sends the current context-activity pair to the server 826.

Figure 14B:
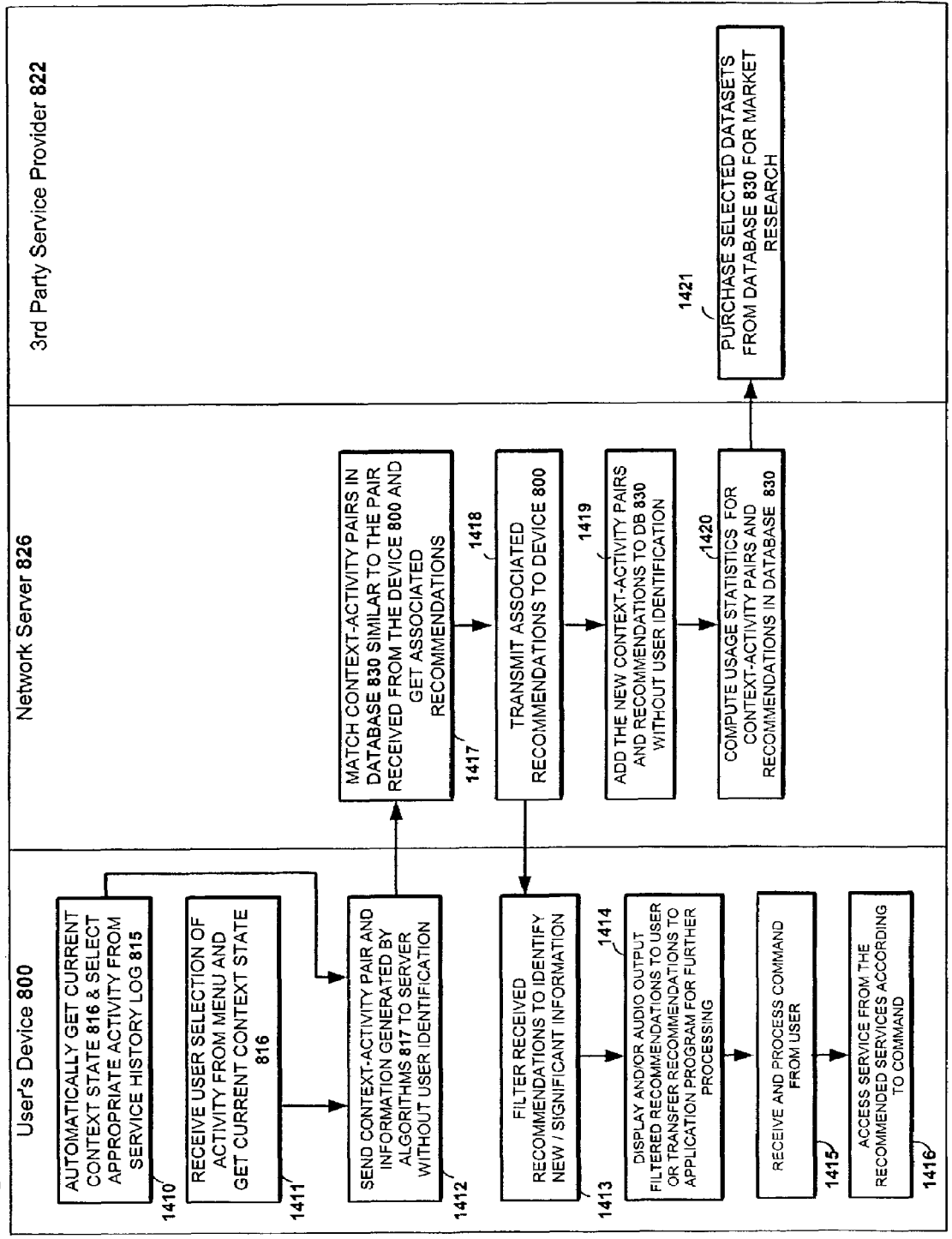
FIG. 14B is an exemplary network process flow diagram of the interaction of the wireless device and network server when the user's wireless device sends a requested context-activity pair to the network server and receives back the resultant service recommendations from the server.

Step 1412 of FIG. 14B shows that the context-activity pair can be processed by the recommendation algorithms 817 in the wireless device 800, before transmission to the server 826. One important feature is that the information transmitted to the network server 826 can be without any direct user identification, in order to preserve the privacy of the user's information. Often instead of single context-activity pair 819 a sample filtered by recommendation algorithm 817 of representative context-activity pairs and related service history items from log 815 is transmitted to recommendation algorithm 829. That is, message 1301 is often a set of context-activity pairs and related service history items. In an alternate embodiment shown in FIG. 14D, step 1412' sends to recommendation algorithm 829 in server 826, a sample of representative context-activity pairs filtered by algorithm 817 and related service history items from log 815 as a set of context-activity pairs and related service history items.

In step 1417 of FIG. 14B, the network server 826 receives the context-activity pair 1301 from the device 800, and processes the context-activity pair with the recommendation algorithms 829. The recommendation algorithms 829 match the context-activity pairs stored in the database 830 which are similar to the context-activity pair which was received from the device 800, and it accesses the associated recommendations for the matched context-activity pairs from the database 830. This can be seen to better advantage in FIG. 17A which shows an example of the context-activity pairs and associated services database 830 in the server 826.

Referring for a moment to FIG. 16G, the user has selected at the wireless device 800, the activity of "dining-restaurant". The current context is a particular local time and location, a particular light level, ambient temperature, speed and acceleration. This current context information, values sent from the recommendation algorithms 816 in the device 800, past recommendations 1141 or past services used 1147, and optionally the corresponding metadata vector 1134, are sent as the context-activity pair information 1301 to the network server 826.

Referring now to FIG. 17A showing an example of the contents of the database 830, the first row in the context-activity pairs column gives a range of times, a range of locations, a range of temperatures and a range of speed and accelerations for context-activity pairs which are to be matched with the current context-activity pair being transmitted from the wireless device 800. The corresponding associated service recommendations are shown in the middle column. For each respective service recommendation in the middle column, there is a corresponding number of times that that particular recommendation has been made to other users in the past, as shown in the right-hand column of FIG. 17A. The current context is 8:00 PM at night and therefore the service recommendations seen to be different from the service recommendations that would be made from the second row of the database 830 in FIG. 17A. In the second row it can be seen that the context-activity pairs deal with a morning timeframe at the same location. There, it can be seen that in the middle column for the second row, the recommendations are not the same as they were for the nighttime recommendations for the first row. Similar to the previous description, the right-hand column of FIG. 17A gives the number of times that each respective service recommendation has been made to prior users. The recommendation algorithms 829 in the network server 826 perform the matching operation and identify the first row in FIG. 17A as a match for context-activity pairs. Accordingly, the recommendation algorithms 829 in the network server 826 return the recommendations 1300 to the user's wireless device 800. Those recommendations are the service recommendations shown in the upper row middle column of FIG. 17A. The number of times each recommendation has been made can also be transmitted in the recommendations 1300. This is performed in the step 1431 of the process diagram of FIG. 14C. The "number of times recommended" is only one of the measures which can be used to generate new recommendations. Other measures include parameters based on feedback.

Figure 14C:
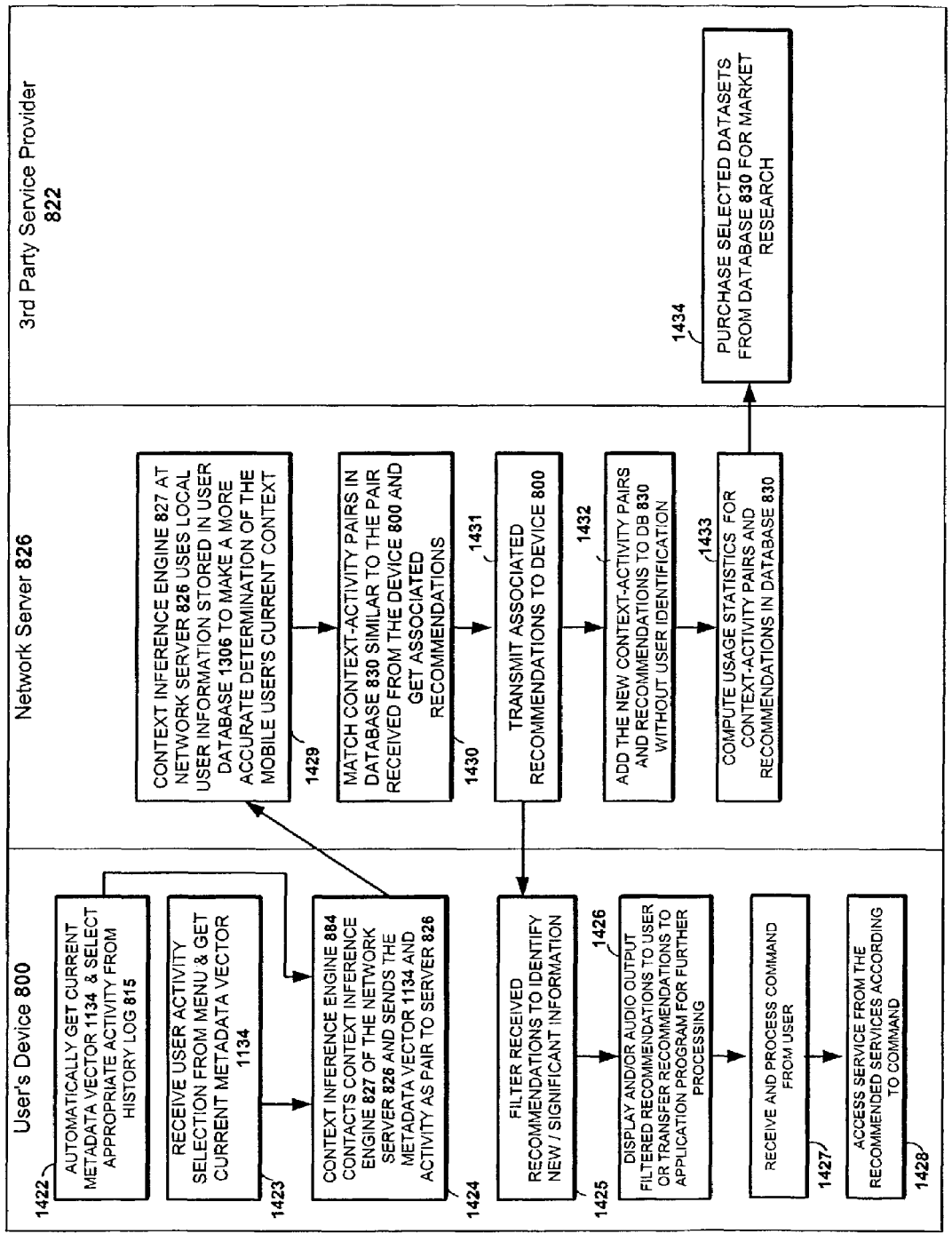
FIG. 14C is an exemplary network process flow diagram of an alternate embodiment, in which the context-activity pair information sent by the wireless device to the network server, includes the metadata vector, where the network server can then assist the wireless device in determining the mobile device's current context, as well as the server sending the resultant service recommendations back to the wireless device.
Figure 14D:
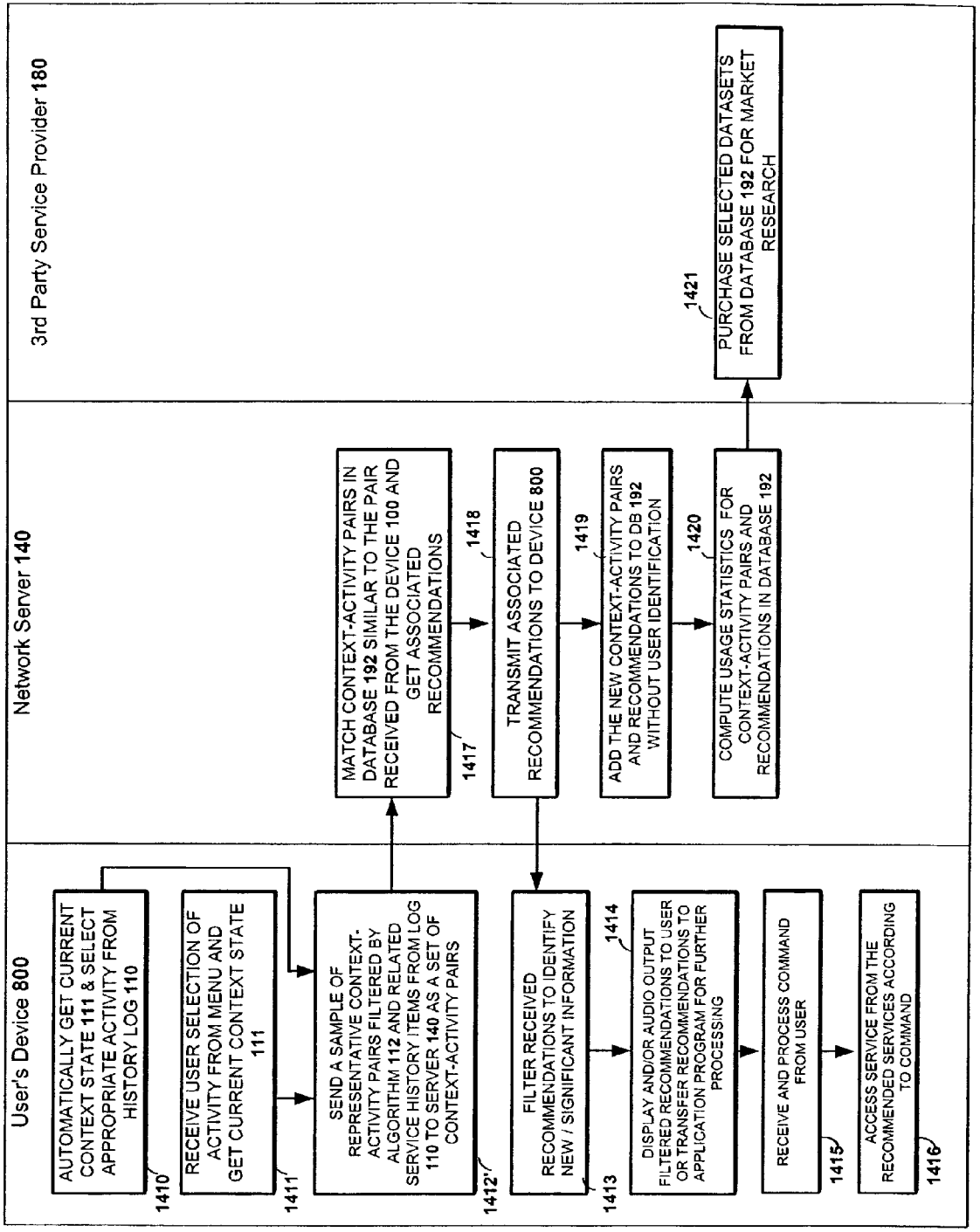
FIG. 14D is an exemplary network process flow diagram of an alternate embodiment, in which Step 326' sends to recommendation algorithm 829 in a server 826, a sample of representative context-activity pairs filtered by algorithm 817 and related service history items from the log 815 as a set of context-activity pairs and related service history items.

Step 1425 of FIG. 14C receives the recommendations 1300 at the wireless device 800, and the recommendation algorithms 817 apply a filtering operation to the received recommendations to identify any new or significant information. New information can be determined by reference to the context-activity pairs and service history log 815 in device 800, which is shown in greater detail in FIG. 10 and in FIG. 17B. There it can be seen that in the past, this particular wireless device 800 has received old recommendations for two entries which are also part of the set of recommendations 1300 now being received from the server 826. The recommendation algorithm 817 removes the two old recommendations shown in the top row middle column of FIG. 17B so that only the new recommendations received in the recommendations 1300 from the network server 826 are to be displayed to the user in the wireless device 800. The recommendations algorithms 817 can make other determinations, for example it can examine the user's rating of the respective old recommendations as shown in FIG. 17B and can take the user's rating into consideration in the display of current recommendations to the user. The recommendation algorithms 817 in the wireless device 800 can also take into consideration the number of times that each respective recommendation has been previously recommended to other users, that information having been transmitted in recommendations 1300 to the wireless device 800.

Then in step 1414 of FIG. 14B, the wireless device displays and/or audio outputs the filtered recommendations to the user. Alternately, the wireless device can transfer the filtered recommendations to an application program for further processing. In some embodiments the wireless device 800 provides feedback to the server 826 after step 1414. The feedback is used to enhance the quality of later matching operations in step 1417. Then in step 1415, the wireless device 800 receives the user's command which may take the form of a user command or any other user input form, and accesses the service from the recommended service corresponding to the user command or other user input in step 1416.

At the network server 826, as shown in FIG. 14B, step 1418 transitions to step 1419 in which the new context-activity pairs and recommendations are added to the database 830. A unique feature of this method and system herein is that there is no user identification which is included in the database 830, if such is not desired. Then step 1420 of FIG. 14B computes usage statistics for the context-activity pairs in the database 830 and associates the usage statistics with the respective recommendations stored in the database 830. This information can have economic value to third party service providers such as the service provider 822. As is seen in FIG. 14B, step 1421 shows the third party service provider 822 purchasing selected data sets from the database 830 to be used for market research.

An alternate embodiment is shown in FIG. 14C. In the alternate embodiment, the context-activity pair information 1301 sent by the wireless device 800 in FIG. 12 to the network server 826, includes the metadata vector 1134. Where the processing power or memory capacity of the wireless device 800 may be limited, the network server 826 can make a more accurate determination of the mobile user's current context by assisting in the further processing of the metadata vector 1134. The metadata vector 1134, which is discussed in greater detail below, represents the current sensor signals and characterizes the current state of the wireless device 800. A context inference engine 827 in the network server 826 of FIG. 13 is embodied as programmed instructions executed within the server 826. The resultant current context computed by the server 826 and the activity information received from the wireless device 800 in the context-activity pair 1301, constitute the current context-activity pair. The context-activity pair database 830 maintained by the server 826 associates a current context-activity pair with appropriate recommendations made in the past to many users. As the system makes new recommendations to users in response to context-activity pairs submitted by their wireless devices, the server 826 gathers the new recommendations and adds them to its context-activity pair database 830. No user personal data is included, as desired, in the context-activity pair database 830. In this manner, the variety, quality and pertinence of the recommendations in the database 830 grows as the recommendation system is used. As an added benefit, the server 826 compiles statistical usage information about the recommendations and stores this in the context-activity pair database 830.

The network process flow diagram of an alternate embodiment shown in FIG. 14C begins with either step 1422 or step 1423 in the user's wireless device 800. In step 1422, the user's device 800 is programmed to automatically obtain the current metadata vector 1134 from the context inference engine 1201, and to select an appropriate activity from the history log 815. In alternate step 1423, the user can make an activity selection from the request a recommendation sub menu shown in FIG. 16E or 16F. Both steps 1422 and 1423 flow into step 1424 in the user's wireless device 800. In step 1424, the context inference engine 1201 contacts the context inference engine 827 of the network server 826 shown in FIG. 13, and sends the metadata vector 1134 and activity as the context-activity pair 8241 to server 826. The process then flows to step 1429 in the network server 826. The context inference engine 827 at network server 826 uses user information stored in the server in the user database 1306 to make a more accurate determination of the wireless device's current context. Step 1429 then flows to step 1430, and the rest of the steps in the flow diagram of FIG. 14C are substantially the same as those described above for FIG. 14B. In this manner, the network server 826 can then assist the wireless device 800 in determining the wireless device's current context, as well as the server 826 sending the resultant service recommendations back to the wireless device 800 to enable short-cut requests to the recommended services.

Context Sensitive Web Services

The context sensitive web services feature enables a mobile phone or wireless PDA to use context inference techniques to sense the user's environment and in response, to provide recommendations to the user that is appropriate to the user's environment and that can be accessed by the user's command or other form of user input. In the distributed network embodiment, the feature offloads some of the computationally intensive computing necessary in context inference techniques, recommendation techniques from the mobile user's wireless device to a server and to web sites on the Internet.

The context sensitive web services feature may also maintain a personal profile of the mobile user's personal preferences in an online server or web site. The mobile user is provided with the ability to control access by application programs in the wireless device, to the user's private data. The context sensitive web services feature provide the mobile user with the ability to control any access to the user's profile by the online server or web site, particularly where processing is offloaded from the wireless device to other network elements.

The mobile user's wireless device is equipped with a context inference engine for providing an awareness of the mobile user's context to application programs, including third party applications. Since the processing power and storage capacity is limited in typical wireless devices, the computational load and storage requirements of the context inference engine are distributed to a context inference server capable of processing the context data. This equally holds true in various embodiments in which other processing tasks, such as service recommendation, are offloaded to network elements.

The feature also enables the mobile user to control which application programs in the wireless device are granted access to the user's private context information. A privacy control block in the wireless device grants or revokes access by application programs to the private context information, based on the mobile user's preferences stored in a privacy profile. The same privacy control and privacy profile is extended to the context inference server, thereby enabling the extension of the user's privacy control to any web server connected to the context inference server. The feature thus enables building an infrastructure for context sensitive applications and services within the wireless device and the server, while providing to the mobile user control over the privacy user's context information.

The Recommendation Web Services menu displayed by the browser 801 in FIG. 9A is rendered by the WAP client program under the control of the application programs 813, which are shown in FIGS. 12 and 13. If the [C] UPDATE PRIVACY FEATURES session type is selected by the user, the Recommendation Web Services menu of FIG. 9A then presents to the user the UPDATE PRIVACY FEATURES sub-menu, shown in FIGS. 16A and 16B, from which the user can select the following options:

[A] UPDATE PRIVACY FEATURES:
 [1] UPDATE YOUR PRIVACY PROFILE
 [2] UPDATE YOUR PERSONAL DATA
 [3] AUTHENTICATE A PROGRAM

Figure 16B:
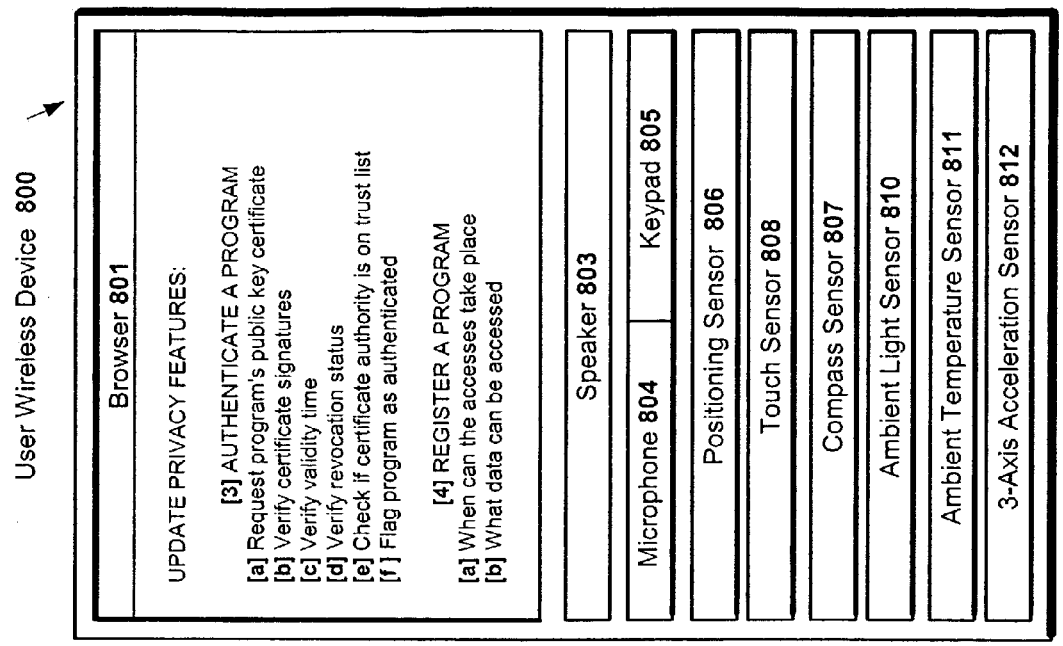
FIGS. 16A and 16B show an alternate embodiment of an example of the user's wireless device with the UPDATE PRIVACY FEATURES: sub-menu of the Recommendation Web Services menu.
Figure 16A:
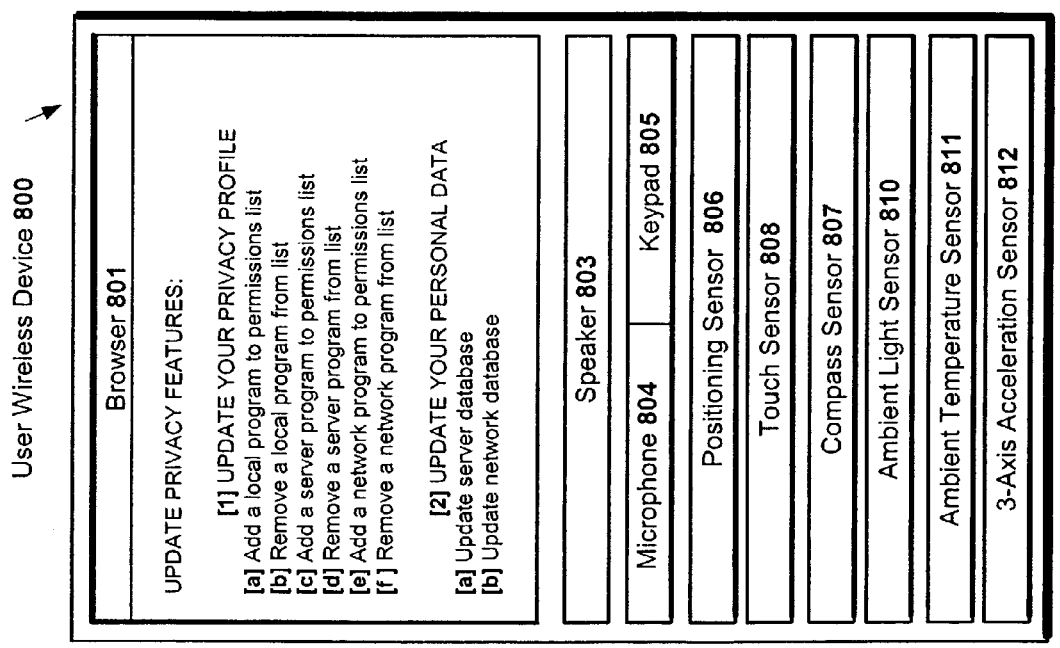

Option [1] of UPDATE YOUR PRIVACY PROFILE, leads to a second sub-menu shown in FIG. 16A, which has the following options:

[1] UPDATE YOUR PRIVACY PROFILE
 [a] Add a local program to permissions list
 [b] Remove a local program from list
 [c] Add a server program to permissions list
 [d] Remove a server program from list
 [e] Add a network program to permissions list
 [f] Remove a network program from list.

Option [2] of UPDATE YOUR PERSONAL DATA, leads to a another sub-menu shown in FIG. 16A, which has the following options:

[2] UPDATE YOUR PERSONAL DATA
 [a] Update server database
 [b] Update network database.

Option [3] of AUTHENTICATE A PROGRAM, leads to a another sub-menu shown in FIG. 16B, which has the following options:

[3] AUTHENTICATE A PROGRAM
 [a] Request program's public key certificate
 [b] Verify certificate signatures
 [c] Verify validity time
 [d] Verify revocation status
 [e] Check if certificate authority on trust list
 [f] Flag program as authenticated.

The AUTHENTICATE A PROGRAM option calls the privacy control 1134 of the wireless device 800 in FIG. 12. If an application program A, B, X, or Y has been verified for its acceptability by a trusted authority, then the trusted authority will have issued a digital certificate on a message authentication code (MAC) it has computed for the application program, which can be checked by the privacy control 1206. As long as the privacy control 1206 trusts the trusted authority issuing the digital certificate, authentication of the application program is straight forward.

Once the mobile user has verified the program's digital certificate and is satisfied that the application program will not subvert the integrity or security of the user's private data, the user can register the program. Registration is the granting by the user of access permission to the program, to access the current context of the user's wireless device and/or to access other portions of the user's private data. There are several levels of permission that can be granted by the user in two categories, [a] when can the accesses take place and [b] what data can be accessed.

Option [4] of REGISTER A PROGRAM, leads to another sub-menu shown in FIG. 16B, which has the following options:

[4] REGISTER A PROGRAM
 [a] When can the accesses take place
 [b] What data can be accessed For the first category of [a] when can the accesses take place, the highest level of permission in this category is that access can occur anytime and without notice. The lowest level of permission in this category is that access can only occur at specified times or under specified conditions, and only after notice to the user and specific authorization by the user. For the second category of [b] what data can be accessed, the highest level of permission in this category is to access unlimited datasets in the user's private data, including current context information, personal data entered by the user, the user's Internet usage history data, the user's Internet cookie data, and the user's application program usage data. The lowest level of permission in this category is that access of any data can only occur after notice to the user and specific authorization by the user. The user can configure any levels of permission in between the highest and lowest and make that the basis for the registration. The user can include the terms of registration in a digital certificate signed by the user and appended to the application program. This registration certificate can be presented by the program to the privacy control 1206 prior to a proposed access event, the privacy control 1206 to automatically verify the registration status of the program. The registration certificate can be constructed as follows.

The privacy control 1206 can compute a message authentication code (MAC) and its own digital signature and append it as a certificate to an acceptable application program A, B, X, or Y. The privacy control 1206 can include the terms of registration in the digital certificate. Then when the program requests access to the user's private data, the privacy control 1206 can automatically check the MAC and its own digital signature to verify that the program has not been changed and the privacy control 1206 can also automatically verify the registration status of the program. This is achieved by the privacy control 1206 computing a hash value for the entire application program A, B, X, or Y (or some portion of it) and the terms of registration, and then forming a message authentication code (MAC) from the hash value. The privacy control 1206 then uses its PKI private key to digitally sign the message authentication code (MAC). The terms of the registration, the MAC and the privacy control's digital signature are appended to the application program A, B, X, or Y as a registration certificate.

Then, whenever the application program A, B, X, or Y requests access to the user's context data or private data, the privacy control 1206 will require the application program to present the registration certificate so that the privacy control 1206 can check that the presented MAC compares with a computed MAC and that the presented digital signature is genuine. The privacy control 1206 can then automatically grant access permission to the application program, in accordance with the terms of the registration.

Methods to generate and evaluate message authentication codes to insure the integrity of data are described in the book by Stephen Thomas entitled *SSL and TLS*, published by John Wiley and Sons, 2000. Two example algorithms for message authentication are RSA's Message Digest (MD5) and the Secure Hash Algorithm (SHA), both of which are described in the book by Stephen Thomas. Another reference that goes into greater detail in its discussion of data integrity methods is the book by Bruce Schneier entitled *Applied Cryptography—2nd Edition* published by John Wiley and Sons, 1996. Methods to generate and evaluate digital signatures to insure the source of the digital program are described in the book by Richard E. Smith entitled *Internet Cryptography*, published by Addison Wesley, 1997.

What has been described here for the privacy control 1206 in the wireless device 800, is equally applicable to the privacy control 164 in the network server 826 of FIG. 9A. The privacy control 1304 in the network server 826 can compute the message authentication code (MAC) and its own digital signature and append it, with the terms of the registration, as a registration certificate to an acceptable application program in the web server 827. Privacy control 1304 has a cached copy 1305 of the Privacy Profile 1207 of the wireless device 800. This enables automatically processing the privacy check in the network Server 826 for access requests from web server 827. When the application program in the web server 827 requests access to the user's private data in the network server 826 or in the wireless device 800, the privacy control 1304 in the network server 826 will require the application program in the web server 827 to present the registration certificate so that it can check the MAC and its own digital signature to verify that the application program has not been changed. The privacy control 1304 can then automatically grant access permission to the application program in the web server 827, in accordance with the terms of the registration.

FIG. 12 is a functional block diagram of the wireless device 800, showing its various components and programs. The wireless device 800 has context sensitive applications A, B, X, and Y, either downloaded, or in firmware. The wireless device 800 does not need to utilize external functionality in the network for the initial sampling and digitization of the sensor inputs. The sampled and digitized values of the sensor inputs are: Positioning Metadata 806', Touch Metadata 808' Audio metadata 809', Compass Metadata 807', Abbient Light Metadata 810', Ambient Temperature Metadata 811', and 3-Axis Acceleration Metadata 812'. The sampled and digitized values of the sensor inputs are loaded into a metadata vector 1134.

FIG. 12 shows the memory 880 of the wireless device 800, connected by bus 1215 to keypad 805, radio 882, speaker 803, microphone 804, sensor interface 883, central processor (CPU) 881, and display 802. Memory 880 stores programs which are sequences of executable instructions which, when executed by processor 881, carry out the methods of the features discussed herein. The memory 880 stores the WAP client program 818, the context inference engine 1201, the privacy control 1206, the privacy profile 1207, the context aware API 1202, the motion/gesture API 1203, the location API 1204, and other APIs 1205. The context inference engine 1201 processes the metadata vector 1134 to produce the current context. Application programs 813 stored in the memory 880 include the application programs A and B which are part of the software system SS1, and the application programs X and Y which are contained in the execution environment "Exec. Env."

If sufficient computational power and storage capacity are available in the wireless device 800, further processing of the metadata vector 1134 can take place in the context inference engine 1201, toward the objective of producing the result of an inferred current context. However, if at some point in the computation, the context inference engine 1201 needs the processing power or storage capacity available at the network server 826, the metadata vector 1134 is sent from the wireless device 800 to the context inference engine 827 in the network server 826 of FIG. 13. The context inference engine 827 in the network server 826 an inferred current context can perform the required processing on the metadata vector 1134 and then return it to the context inference engine 1201 in the wireless device 800 for completion of the an inferred current context result. Alternately, the context inference engine 827 in the network server 826 can complete the required processing and then return the resultant inferred current context to the wireless device 800.

FIG. 12 shows the architecture of a wireless device with support for context awareness. The context awareness is built on top of sensory information received from various types of sensors physically located in the handset shown in FIG. 8. The sensors shown include Positioning Sensor 806, Compass Sensor 807, Touch Sensor 808, Audio Sensor 809, Ambient Light Sensor 810, Ambient Temperature Sensor 811 and 3-Axis Acceleration Sensor 812. The sensors can also be located in accessory-like phone covers or in a wireless accessory such as a Bluetooth enabled device. The sensors may also be located in the environment such as in the user's rooms or vehicles. Also, the time duration of use of a phone and other available information can be used along with sensor data in context awareness services.

FIG. 12 shows sensor data received from sensors 806-812 is processed by Context Inference Engine 1201 which then feeds the data through various APIs 1202-1205, to application programs A, B, X, and Y. The application programs may register themselves at the Application Programming Interface 1202 to receive current context or changes in the context. This enables context sensitivity in the application programs.

FIG. 12 also shows "native" application programs A and B which are executed in a first software system SS1 of the wireless device 800. The term "Software System" is used here for any environment with execution capability. This first software system may be proprietary or based on a commercially available real-time operating system, such as NOS, ISA, EPOC, JAVA, or WAP. Third party application programs X and are executed within an execution environment. This execution environment may limit the system capabilities available for the application programs, such as access to APIs (fixed, not dynamic behavior).

FIG. 12 shows the mobile user's privacy control feature. The privacy control feature enables the user to designate which application programs are granted access to the context awareness APIs 1202 to utilize the current context information produced by the context inference engine 1201. All requests or registrations by application programs A, B, X, and Y to have access to the Context Inference Engine 1201, must first go through the Privacy Control block 1206. Privacy Control block 1206 uses the user's security data check stored in the Privacy Profile 1207 to grant access rights to the requesting application programs. The user controls the granting of access rights by means of the user's security data input by the user through the user interface. The user's security data includes permissions list 1208, Public Key Infrastructure (PKI) certificates 1209, PKI trusted authority trust list 1210, and flags set by the user for those application programs that have been authenticated by the PKI procedures, data set 1211. The user can update the user's security data with the UPDATE PRIVACY FEATURES menu displayed by the wireless device 800 shown in FIGS. 13 and 14A. Access might be granted to an application program based on its digital signature, which is a part of the system applications, or other means known in the art. It is also possible to provide a separate system-wide Privacy User Interface to the privacy control 1206, which can be employed by the mobile user to set the privacy policies and to alert the mobile user that an application program is attempting to register to receive the user's private context awareness information. The privacy control 1206 and Privacy Profile 1207 enable the mobile user to grant, deny, or revoke access, to grant access for a limited time, or to require an application program to always request registration before the user grants access.

In FIG. 12, the Context Inference Engine 1201 in the wireless device 800 makes inferences from all the sensor inputs based on where the wireless device is located by the mobile user. For instance the inferred current context of the device 800 may be "IN THE USER'S POCKET", when a certain set of sensors input a specific combination of signals having a specific value range. As an example, the resulting inference of the current context by the Context Interference Engine 1201 could be expressed in XML language format as follows:

```
<Context Inference Engine in Device>
    <device placement> pocket </ device placement>
    <User Interface state> sleep mode </User Interface state>
    <device location> in elevator 5 building 1 floor 2</ device location>
    <API active actions> meeting starting on floor 3 room 322
    </API active actions>
</Context Inference Engine in Device >
```

The Context Inference Engine 1201 in the wireless device 800 can perform the context inference process with any of several methods. Different input information from the sensors can be weighted according to their relative value of importance appropriate for each environment condition or situation to be analyzed. Each sensor has it's own weight value. Alternatively, the weight values for each sensor for each environment condition can be learned from training sessions using, for example artificial neural networks (ANNs), self-organizing maps (SOMs), decision trees, fuzzy rule-based systems, or model-based systems such as Hidden Markov Modeling (HMM). Combinations of two or more of the alternate methods can be used, depending on the application.

The Context Inference Engine 1201 can continuously adapt its weights through adaptive and continuous learning methods, where the user teaches the wireless device 800 new environment conditions and names them. Hidden Markov Modeling (HMM) can be used, for example, to implement an adaptive and continuous learning method for the Context Inference Engine 1201. Alternately, the wireless device 800 can be programmed to spontaneously recognize a changed scene by comparing it with known scenes. The user can teach the wireless device new environmental conditions and name them, using the adaptive and automatic learning capability of neural networks. Adaptive and continuous learning methods are computationally intensive and are appropriate candidates to place on the network server 826, which assists the wireless device 800, as discussed below.

The field of context inference has applied the principles of automated pattern recognition to processing diverse types sensor inputs. Speech recognition has been applied to processing speech signals and handwriting recognition has been applied to processing hand force and accelerometer signals. In the field of robotics, image recognition has been applied to processing digitized still and motion images, mechanical location recognition has been applied to processing laser and sonar range finder signals, and mechanical motion recognition to has been applied to processing inertial, acceleration, and heading signals. In the field of prosthetic devices, touch recognition has been applied to processing tactile sensor signals. In the field of medicine, automated diagnostic programs recognize various pathologies by processing bioelectric field signals, as well as the more traditional pulse, respiration rate, and body temperature signals. These diverse sensor signal recognition processes have the common feature that an initial training stage is conducted where sampled signals are equated with a statistical model for those signals.

The principles of automated pattern recognition for these diverse sensor inputs are exemplified by the techniques for recognizing speech patterns. A common technique used in recognition models is Hidden Markov Modeling (HMM). The term "Hidden" refers to the probabilistic and not directly observable events which underlie a speech signal. HMM speech recognition systems typically use realizations of phonemes which are statistical models of phonetic segments having parameters that are estimated from a set of training examples. Models of words are made by chaining or linking appropriate statistical models of phonetic segments. The statistical models serve as standards which are to be matched with the unknown voice signals to be recognized. Some useful references discussing the principles of Hidden Markov Models are:

Rabiner, L. R., "A tutorial on hidden Markov models and selected applications in speech recognition", *Proceedings of the IEEE*, volume 77, number 2, 1989, pages 257-286.

Rabiner, L. R. and Juang, B. H., "An introduction to hidden Markov models", *IEEE ASSP Magazine*, January 1986, pages 4-15.

Fraser, Andrew M. and Dimitriadis, Alexis, "Forecasting Probability Densities by Using Hidden Markov Models with Mixed States", *Time Series Prediction: Forecasting the Future and Understanding the Past*, Addison-Wesley, editor Weigend, Andreas S. and Gershenfeld, Neil A., 1994.

Charniak, Eugene, *Statistical Language Learning*, MIT Press, Cambridge, Mass., 1993.

To illustrate how Hidden Markov Modeling (HMM) can be extended beyond speech recognition, an example is given here for touch recognition. In the training stage for touch recognition, tactile sensor signals are input from touching a tactile transducer to a rough texture, such as for example sandpaper. The tactile sensor signals are transformed into a statistical model of the input signal. The statistical model is stored as a standard in a computer memory under the handle "rough_texture". To expand the range of sensor signals that are included in the model for "rough_texture", several training sessions can be conducted, each with a different direction or pressure for touching the sandpaper, resulting in several different samples of the statistical model. The set of samples of the statistical model are stored as a standard under the handle "rough_texture". Other training sessions are conducted with a smooth texture, such as glass. The tactile sensor signals input from touching the tactile transducer to the smooth texture are transformed into a statistical model of the input signal and stored as a standard under the handle "smooth_texture". Later, in the recognition mode, an unknown object is touched by the tactile transducer resulting in a sample tactile sensor signal. Recognition of unknown touch signals requires sampling and digitizing the touch transducer's signals. These digitized sensor signals are then processed into metadata. The metadata is then compared with the standard statistical models of "rough_texture" and "smooth_texture". The most likely match is then the inferred touch recognition result.

Combinations of two or more types of sensors can have their signals combined into an input metadata vector that characterizes a composite sampling event. The composite sampling event can be recognized using the principles of Hidden Markov Modeling (HMM). An example composite sampling event can be the state of the health and fatigue of the user of a wireless device 800. For example, a wireless device 800 can be equipped with a tactile transducer which outputs tactile sensor signals in response to the hand force and pulse rate of the user who is gripping the wireless device 800. The wireless device 800 can be equipped with a temperature sensor which outputs body temperature signals in response to the user gripping the wireless device 800. Hidden Markov Modeling (HMM) can be used to recognize a force/temperature input metadata vector that characterizes the combination of the hand force and the temperature sensor signals resulting from a sampling event. A composite sampling event in this example can have an extended duration so that the force sensor can transduce the pulse rate of the user over a period of time.

In the training stage, the tactile sensor signals and the force sensor signals are output while the user is in a condition of good health and resting normally. The tactile sensor signals and the force sensor signals are combined into a force/temperature input metadata vector which is transformed into a statistical model of the input signals. The statistical model is stored as a standard in the computer memory of the wireless device 800 under the handle "good_health_resting_normally". Other training sessions are conducted with the user in different states of health and fatigue. For example, the user may be training the wireless device 800 while working late at night at the office. The tactile sensor signals and the force sensor signals resulting from holding the wireless device 800, are combined into a force/temperature input metadata vector for the user in the condition of being in good health but fatigued. The force/temperature input metadata vector is transformed into a statistical model of the input signals and stored as a standard under the handle "good_health_fatigued".

Later, in the recognition mode, as the user holds the wireless device 800, the tactile sensor signals and the force sensor signals are sampled. The Health/Fatigue_State recognition consists of sampling and digitizing the touch transducer's signals. These digitized sensor signals are then processed into a metadata vector. The metadata vector is then compared with the standard statistical models of handle "good_health_resting_normally" and "good_health_fatigued". The most likely match is then the inferred touch recognition result.

In accordance with the feature, this recognition result can be used by a health maintenance application program in the wireless device 800, to provide useful and appropriate information to the user. For example, a health maintenance program can process the recognition result, and in response, signal an alarm to the user and provide suggestions for medications to palliate the sensed fatigue. One problem with automatic recognition programs is that they are either relatively large or they call databases that are relatively large in comparison to the memory capacity of the wireless device 800.

Another aspect of the feature is the recognition result can be used by a supplementary application program in a remote server, to provide additional and more detailed useful and appropriate information to the user. For example, the server can access a large database of suggestions for medications to palliate the sensed fatigue of the user. The results of the search of the database can be returned to the wireless device 800. The server can also maintain a personal profile of the user's characteristics and preferences and it can use that profile in automatically formulate its query to the database. For example, the user's drug allergies can be stored in the server's database, to insure that recommendations are not made that will result in an allergic reaction by the user to the suggested medication.

FIG. 12 is a functional block diagram of the wireless device 800, the server 826, and the web server 827, and their interaction when exchanging the metadata vector 1134 and the privacy control data 1206'. These exchanges are bulk encrypted with a symmetric session key, such as a Data Encryption Standard (DES) key, to protect the privacy of the data. To insure the integrity of the metadata vector 1134 and the privacy control data 1206', a message authentication code (MAC) can be computed and appended to the data, as described in the above referenced book by Stephen Thomas entitled *SSL and TLS*, published by John Wiley and Sons, 2000. To insure that the source of the metadata vector 1134 and the privacy control data 1206' cannot be repudiated, a digital signature can be appended to the data, as described in the above referenced book by Richard E. Smith entitled *Internet Cryptography*, published by Addison Wesley, 1997.

FIG. 12 shows the scope of the distributed context awareness implementation. The wireless device 800 has context sensitive applications A, B, X, and Y either downloaded or in firmware. The wireless device 800 may locally preprocess part of the context information in the metadata vector 1134 before sending it to the context inference engine 827 in the network server 826 which is capable of processing the data and responding back with the resulting current context. The wireless device 800 may run application programs that require accessing the web service server 827 to provide context sensitive services to the mobile user.

FIG. 13 shows how processing of sensor data from the sensors in the wireless device 800, can be distributed between the wireless device and the network server 826. The operation in FIG. 13 is as follows:

1. The sensors continuously provide the sensor data to the Context Inference Engine 884 (see also 1201 in FIG. 12) in the wireless device 800.
2. An application program that utilizes the context awareness APIs 1202 may request the latest context information, or the application program may be registered to receive any changes to specific context information.
3. The Context Inference Engine 1201 securely contacts the Context Inference Engine 827 of the network server 826 and sends the metadata vector 1134 to the server 826. Depending on the sensors and the implementation details, Context Inference Engine 1201 may preprocess part of the sensor data in the metadata vector 1134 prior to sending it. Depending on the sensors and the interval for processing, there may be virtual connection open between Context Inference Engine 1201 and Context Inference Engine 827 for frequent data exchanges. Context Inference Engine 827 at the network server 826, has the processing power and memory capacity to handle computationally intensive and/or memory intensive processing of the preprocessed sensor data in the metadata vector 1134 to produce the current context result information.
4. Context Inference Engine 827 at the network server 826 may utilize local user information (history information, customer details) stored in the user database 1306 for making a more accurate determination of the mobile user's current context.

5. Context Inference Engine 827 at the network server 826 then securely returns the current context awareness information to Context Inference Engine 1201 in the wireless device 800.
6. Context Inference Engine 1201 in the wireless device 800 then provides the current context awareness information through Context Awareness APIs 1202 to the application programs registered for to receive that information.

FIG. 13 shows how Web Services in Web Service Server 827 are enabled to receive current context results of the wireless device 800. Web Services Server 827 has a software system for server application program A and an execution environment for server application programs X and Y that are similar to the software system SS1 and execution environment (Exec. Env.) in the wireless device 800 shown in FIG. 12. Server Application programs A, X, and Y in Web Service Server 827 may require access through the Context Awareness APIs 1310 to provide Web Services with the current context of the wireless device 800.

In FIG. 13, Web Service Server 827 uses the Context Inference Client 1312 to contact the Context Inference Server 1308 in the network server 826. Context Inference Client 1312 may utilize customer database information in database 1313 to enhance the context sensitivity capabilities of the web server 827. The contact to the network server 826 is done through a context awareness interface 1309 to the Context Inference Server 1308 in the network server 826.

Context Inference Server 1308 registers the Web Services of the web server 827 through the privacy control 1304 of the network server 826 to the Context Inference Engine 827. Privacy control 1304 has a cached copy 1305 of the Privacy Profile 1207 of the wireless device 800. This enables processing of the privacy check in the network Server 826 for access requests from web server 827. The communication between web server 827 and network server 826 is secured using the Internet secure protocols such as HTTPS or SSL. The Context Inference Server 1308 can publish its own service as a Web Service to other Web Services on the Internet, in which case the implementation of the interface 1309 between web server 827 and network server 826 can be Extensible Markup Language (XML) messages carried in the Simple Object Access Protocol (SOAP) messaging protocol.

The Context inference Engine 827 in the network server 826 will receive processed sensor metadata vector 1134 information and possibly some application API information originated from the Context Inference Engine 1201 of the wireless device 800. The Context inference Engine 827 of the network server has user database 1306 information of the behavior of the user and of the past usage of the wireless device. The Context inference Engine 827 of the network server may also have third party services available (such as instances offering content and/or services) to be offered to potential users. What is offered to the user can also depend on the user profile 1305. The nature of the Context inference Engine 1201 information of the wireless device 800 that is conveyed to the Context inference Engine 827 of the network can be controlled with the privacy control 1206 that is managed by the user of the wireless device 800. The user may thus fully or partly disable the Context inference Engine 827 of the network to control the amount of his/her information that can be used by third party services. The privacy control 1206 enables the user to control access by anyone to his/her private information.

The Context inference Engine 1201 of the wireless device receives an input from the API interface 154 from the applications A, B, X, or Y located in the wireless device 800. An example would be from a calendar application program indicating that a meeting is starting in 25 minutes time. As another example the calendar application program indicates that Lisa is having a birthday tomorrow into which you are participating. The Context inference Engine 1201 of the wireless device can convey processed result information to the Context inference Engine 827 of the network server. Now in addition to the sensor information, information from the application programs A, B, X, or Y can also be used in the decision making of the Context inference Engine 1201 of the wireless device. A combination of the sensor information and information coming from the application programs A, B, X, or Y can be processed by the Context inference Engine 1201. The user's behavior or usage patterns can be detected from the sensor and recorded in the user database, concerning the usage of the application programs. As previously discussed, the processing of this combined information from the sensors and from the application programs can be shared between the Context inference Engine 1201 and the Context inference Engine 827.

The information transfer from the Context inference Engine 1201 of the wireless device to the Context inference Engine 827 of the network server can be done in alternative ways. The system can be managed so that the current consumption and transfer capacity between the wireless device 800 and the network server 826 is taken into account. The context information does not always have to be collected so frequently that it would have to be periodically transferred to the network side 826 every few seconds. Depending on the application, the timing window applied to information transfer from the Context inference Engine 1201 of the wireless device 800 to the Context inference Engine 827 of the server 826 can vary from seconds to minutes. If there were no event change or condition change in the environment of the wireless device 800, there would be no need to transfer information to the Context inference Engine 827 of the server 826. Additionally information can be temporarily stored in a buffer in the wireless device 800, which can then transferred less frequently to the network Context inference Engine 827. Packet based GPRS and UMTS can support the less frequent information transfer rates. Also, it is advantageous to send the network Context inference Engine 827 information from the wireless device 800 as an attachment, immediately subsequent to other signaling made to in the network direction from the wireless device 800, thus saving the radio transmitter of the wireless device 800 from having to be switched on again for transferring the Context inference Engine 1201 information separately to the network server 826.

Returning to FIG. 8, the relationship is shown between the network server 826, the Universal Description, Discovery and Integration (UDDI) registry 825, and a plurality of web site servers 827. UDDI is a defacto standard for an Internet-based registry. The UDDI registry 825 enables the network server 826 to discover new web sites for services and businesses on the Internet. Once such services and businesses are identified by the UDDI registry 825 to the network server 826, then the server 826 must apply the mobile user's cached privacy profile 1305 in FIG. 13, in order to prevent unauthorized access of the user's private data by application programs on the newly discovered web sites.

FIG. 14A is a network process flow diagram of the interaction of the wireless device 800 in the first column, network server 826 in the middle column, and web server 827 in the right column, when they carry out the determination of the current context of the wireless device 800. The process begins with the wireless device 800 in step 1400:

Step 1400: PRIVACY CONTROL 1206 IN WIRELESS DEVICE 800 SENDS UPDATED PRIVACY PROFILE TO NETWORK SERVER 826.

Then the network server 826 continues with step 1405:
Step 1405: NETWORK SERVER 826 UPDATES CACHED PRIVACY PROFILE 1305.

The wireless device 800 continues with the following steps 1401, 11500, and 1403:
Step 1401: SENSORS CONTINUOUSLY PROVIDE SENSOR DATA TO CONTEXT INFERENCE ENGINE 1201 IN WIRELESS DEVICE 800.
Step 11500: APPLICATION PROGRAM THAT USES CONTEXT AWARENESS API 1202 REQUESTS LATEST CONTEXT INFORMATION.
Step 1403: CONTEXT INFERENCE ENGINE 1201 CONTACTS CONTEXT INFERENCE ENGINE 827° F. THE NETWORK SERVER 826 AND SENDS THE METADATA VECTOR 1134 TO SERVER 826.

Then the network server 826 continues with steps 11535 and 1407:
Step 11535: CONTEXT INFERENCE ENGINE 827 AT NETWORK SERVER 826 USES LOCAL USER INFORMATION STORED IN USER DATABASE 1306 TO MAKE A MORE ACCURATE DETERMINATION OF THE MOBILE USER'S CURRENT CONTEXT.
Step 1407: NETWORK SERVER 826 REQUESTS DATA FROM WEB SERVER 827. THE NETWORK SERVER'S ACCESS IS AUTHORIZED BY CACHED PRIVACY PROFILE 1305 IN NETWORK SERVER.

Then the web server 827 continues with step 1409:
Step 1409: WEB SERVER PROVIDES USER INFORMATION STORED IN DATABASE 1313 TO NETWORK SERVER 826.

Then the network server 826 continues with step 1408:
Step 1408: CONTEXT INFERENCE ENGINE 827 AT THE NETWORK SERVER 826 THEN SECURELY RETURNS THE CURRENT CONTEXT AWARENESS INFORMATION TO CONTEXT INFERENCE ENGINE 1201 IN THE WIRELESS DEVICE 800.

Then the wireless device 800 finishes with step 1404:
Step 1404: CONTEXT INFERENCE ENGINE 1201 IN THE WIRELESS DEVICE 800 THEN PROVIDES THE CURRENT CONTEXT AWARENESS INFORMATION THROUGH CONTEXT AWARENESS APIs 1202 TO THE APPLICATION PROGRAMS REGISTERED TO RECEIVE THAT INFORMATION.

Figure 15:
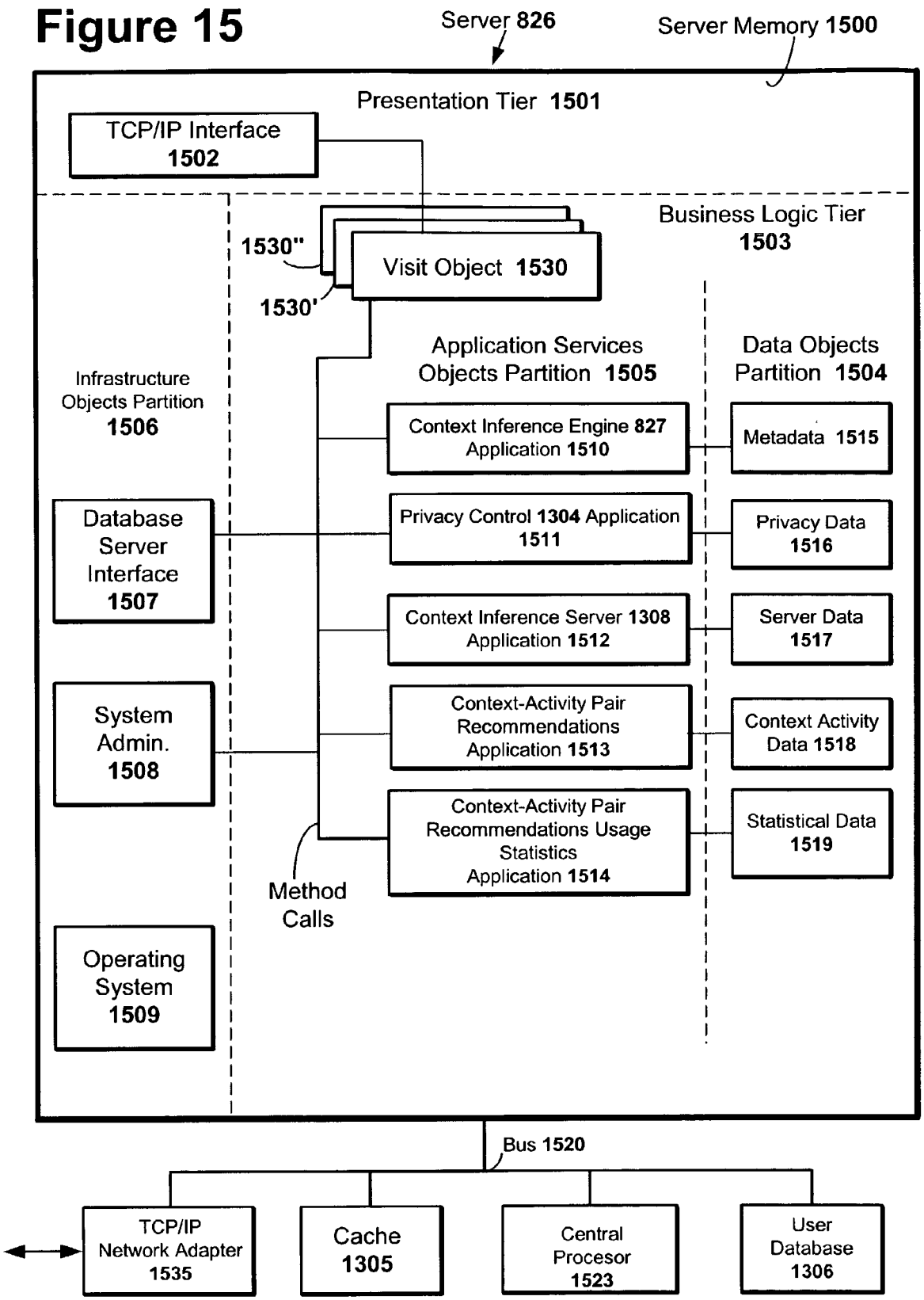
FIG. 15 is a functional block diagram of an example of a network server showing the memory storing the application services software programs needed to perform various operations, such as service recommendations.

FIG. 15 is a functional block diagram of the network server 826, showing the memory 1500 storing the application services software programs needed to perform the operations of the feature. The memory is connected by the bus 1520 to the cache 1305, user database 1306, TCP/IP network adapter 1535, and central processor 1523. The memory 1500 stores programs which are sequences of executable instructions which, when executed by the processor 410, carry out the methods of the feature.

In FIG. 15, the functional components of an exemplary network server 826 are shown arranged as an object model. The object model groups the object oriented software programs into components that perform the major functions and applications in network server 826. The object model for memory 1500 of network server 826 employs a three-tier architecture that includes presentation tier 1501, infrastructure objects partition 1506, and business logic tier 1503. The object model further divides business logic tier 1503 into two partitions, application objects partition 1506 and data objects partition 1504.

Presentation tier 1501 retains the programs that manage the device interfaces to network server 826. In FIG. 15, presentation tier 1501 includes network interface 1502. A suitable implementation of presentation tier 1501 may use Java servlets to interact with WAP protocol gateway 823 via the hypertext transfer protocol ("HTTP"). The Java servlets ran within a request/response server that manages the exchange of messages between WAP protocol gateway 823 and network server 826. A Java servlet is a Java program that runs within a Web server environment. A Java servlet takes a request as input, parses the data, performs logic operations, and issues a response back to WAP protocol gateway 823. The Java runtime platform pools the Java servlets to simultaneously service many requests. Network interface 1502 accepts request messages from WAP protocol gateway 823 and passes the information in the request to visit object 1530 for further processing. Visit object 1530 passes the result of that processing to network interface 1502 for transmission back to the WAP protocol gateway 823. Network interface 1502 may also use network adapter 1535 to exchange data with another user device.

Infrastructure objects partition 1506 retains the programs that perform administrative and system functions on behalf of business logic tier 1503. Infrastructure objects partition 1506 includes operating system 1509, and an object oriented software program component for database server interface 1507, and system administrator interface 432.

Business logic tier 1503 in FIG. 15 includes multiple instances of visit object 1530, 1530', 1530". A separate instance of visit object 1530 exists for each network interface 1502 session. Each visit object 1530 is a stateful session object that includes a persistent storage area from initiation through termination of the session, not just during a single interaction or method call. The persistent storage area retains information associated with the session.

When WAP protocol gateway 823 sends a metadata vector 1134 message to network server 826, the message is sent to network interface 1502 to invoke a method that creates visit object 1530 and stores connection information as a state in visit object 1530. Visit object 1530 may, in turn, invoke a method in context inference engine 827 application 1510 to perform a context inference on the metadata vector and return a current context result.

When WAP protocol gateway 823 sends a privacy control data 8243 message to network server 826, the message is sent to network interface 1502 to invoke a method that creates visit object 1530 and stores connection information as a state in visit object 1530. Visit object 1530 may, in turn, invoke a method in privacy control 1304 application 1511 to update the cached privacy profile 1305.

When WAP protocol gateway 823 sends a context-activity pair message 8241 to network server 826, the message is sent to network interface 1502 to invoke a method that creates visit object 1530 and stores connection information as a state in visit object 1530. Visit object 1530 may, in turn, invoke a method in context-activity pair recommendations application 1513. Application 1513 compares four types of activities in the context-activity pairs received from the wireless device 800, with the recommendations in the database 830: [1] past recommendations, [2] past services used, [3] prestored service preferences, and [4] special requested service requirements. Application 1513 may, in turn make a method call to context-activity recommendations usage statistics application 1514.

When WAP protocol gateway 823 sends a metadata vector message of the user's command to network server 826, the message is sent to network interface 1502 to invoke a method that creates visit object 1530 and stores connection information as a state in visit object 1530. A description of server programming applications developed with Enterprise Java Beans is provided in the book by Ed Roman entitled *Mastering Enterprise Java Beans*, published by John Wiley and Sons, 1999. A description of the use of an object model in the design of server applications is provided in the book by Matthew Reynolds entitled *Beginning E-Commerce*, Wrox Press Inc., 2000, (ISBN: 1861003986). Java servlets and the development of web site servers is described in the book by Duane K. Fields, et al. entitled *Web Development with Java Server Pages*, published by Manning Publications Co., 2000.

Example Wireless Application Protocol (WAP) Embodiment

The user's Wireless Application Protocol (WAP)-enabled portable wireless device 800 accesses a small file called a deck which is composed of several smaller pages called cards which are small enough to fit into the display area of the device's browser 801. The small size of the browser 801 and the small file sizes accommodate the low memory constraints of the portable wireless device 800 and the low-bandwidth constraints of a wireless network 821. The cards are written in the Wireless Markup Language (WML) which is specifically devised for small screens and one-hand navigation without a keyboard. The WML language is scaleable from two-line text displays on the browser 801 of a cellular telephone, up through large LCD screens found on smart phones and personal communicators. The cards written in the WML language can include programs written in WMLScript, which is similar to JavaScript, but makes minimal demands on memory and CPU power of the device 800 because it does not contain many of the unnecessary functions found in other scripting languages.

The Nokia WAP Client Version 2.0 is a software product containing the components necessary to implement the WAP client on the wireless device 800. These components include a Wireless Markup Language (WML) Browser, WMLScript engine, Push Subsystem, and Wireless Protocol Stack. The Nokia WAP Client is a source-code product that can port and integrate into wireless devices such as mobile phones and wireless PDAs. Application programs 813 stored in the wireless device 800 interact with the WAP Client to implement a variety of communications applications. Details of the Nokia WAP Client Version 2.0 can be found in the online paper: *Nokia WAP Client Version 2.0, Product Overview*, Nokia Internet Communications, 2000, www.nokia.com/corporate/wap.

The WAP Client includes the Wireless Public Key infrastructure (PKI) feature, providing the infrastructure and the procedures required for authentication and digital signatures for servers and mobile clients. Wireless PKI is a certificate-based system that utilizes public/private key pairs associated with each party involved in a mobile transaction. Wireless Identity Module (WIM) is a security token feature of the WAP Client, which includes security features, such as the public and private keys and service certificates, needed for user authentication and digital signatures. Additionally, it has the ability to perform cryptographic operations to encrypt and decrypt messages.

The WAP protocol gateway 823 links the Internet 824 and the wireless network 821. The WAP protocol gateway 823 includes the Wireless Public Key infrastructure (PKI) feature to help provide a secure Internet connection to the wireless device 800. The WAP protocol gateway 823 enables the WAP-enabled wireless device 800 to access Internet applications such as headline news, exchange rates, sports results, stock quotes, online travel and banking services, or to download distinctive ringing tones.

The user's WAP-enabled portable wireless device 800 communicates with the wireless access point 820 and can exchange messages for distances up to several kilometers. The types of wireless networks 821 supported by the WAP standard include Cellular Digital Packet Data (CDPD), Code-Division Multiple Access (CDMA), Global System for Mobile Communications (GSM), Time Division Multiple Access (TDMA), GPRS, 3G-Broadband, and the like. The overall process of communication between the user's WAP-enabled wireless device (the client) 800, through the WAP protocol gateway 823, to the server 826 resembles the way Web pages are served on the Internet using the HyperText Transfer Protocol (HTTP) or World Wide Web protocol:

[1] The user presses a phone key on the user's device 800 related to the Uniform Resource Locator (URL) of the server 826.

[2] The user's device 800 sends the URL, via the wireless access point 820 and the wireless network 821, to the gateway 823 using WAP protocols.

[3] The gateway 823 translates the WAP request into an HTTP request and sends it over the Internet 824 to the server 826, via Transmission Control Protocol/Internet Protocol (TCP/IP) interfaces.

[4] The server 826 handles the request just like any other HTTP request received over the Internet. The server 826 either returns a WML deck or a HyperText Markup Language (HTML) page back to the gateway 823 using standard server programs written, for example in Common Gateway Interface (CGI) programs, Java servlets, or the like.

[5] The gateway 823 receives the response from the server 826 on behalf of the user's device 800. If the response is an HTML page, it gets transcoded into WML if necessary. Then the WML and WMLScript coding is encoded into a byte code that is then sent to the user's device 800.

[6] The user's device 800 receives the response in the WML byte code and displays the first card in the deck on the browser 801 to the user.

In FIG. 8, the protocol gateway 823 includes a WAP protocol stack organized into five different layers. An application layer is the wireless application environment, which executes portable applications and services. A session layer is the wireless session protocol, which supplies methods for the organized exchange of content between client/server applications. A transaction layer is the wireless transaction protocol, which provides methods for performing reliable transactions. A security layer is the wireless transport layer security, which provides authentication, privacy, and secure connections between applications. The transport layer is the wireless datagram protocol, which shelters the upper layers from the unique requirements of the diverse wireless network protocols, such as CDPD, CDMA, GSM, etc. Additional information about the WAP standard and the WAP protocol stack can be found in the book by Charles Arehart, et al. entitled, *Professional WAP*, published by Wrox Press Ltd., 2000 (ISBN 1-861004-04-1).

Alternate Embodiment

Figure 16F:
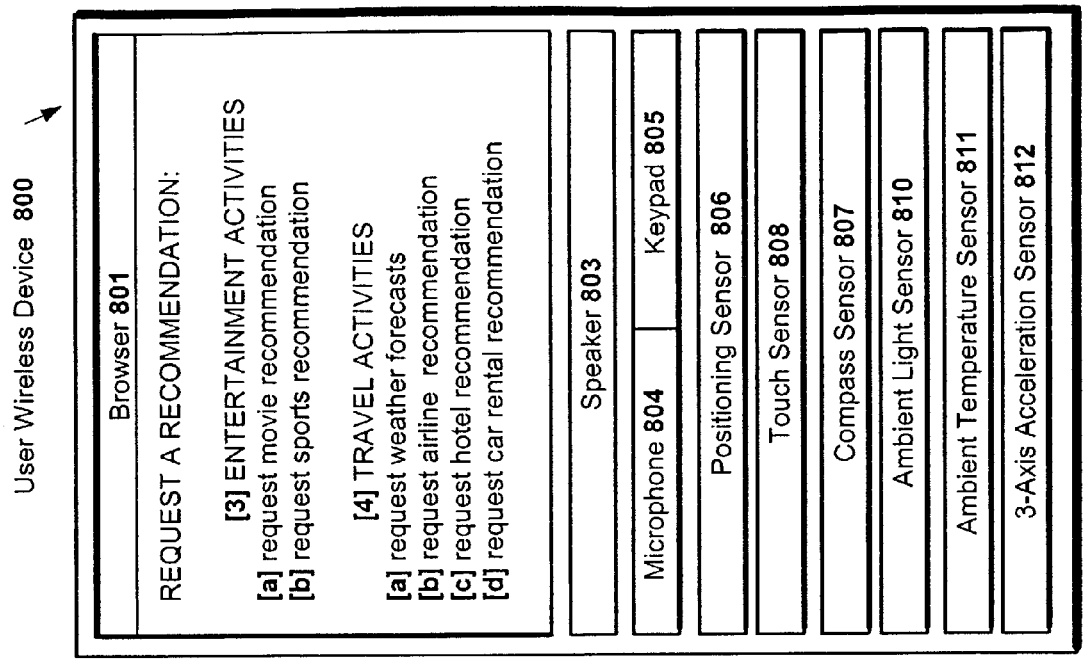
FIGS. 16E and 16F show an alternate embodiment of an example of the user's wireless device with the REQUEST A RECOMMENDATION sub-menu of the Recommendation Web Services menu.
Figure 16E:
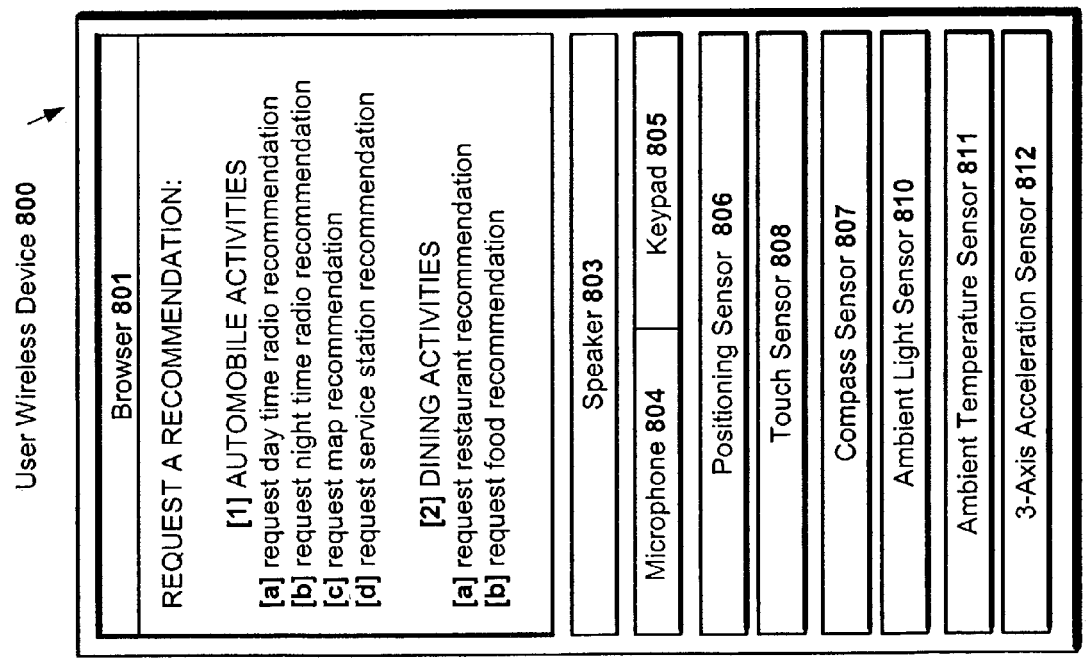

FIGS. 16A and 16B show an alternate embodiment of the user's wireless device with the UPDATE PRIVACY FEA- TURES sub menu of the recommendation web services menu. FIGS. 16A and 16B will be discussed further below. FIGS. 16C and 16D show the user's wireless device with the MANAGE CONTEXT-ACTIVITY PROFILE sub menu of the recommendation web services menu. The MANAGE CONTEXT-ACTIVITY PROFILE sub menu offers the user the option of managing preference values for the following categories:

(1) AUTOMOBILE
    (a) day time radio preferences
    (b) night time radio preferences
    (c) map display preferences
    (d) service station preferences
(2) DINING
    (a) restaurant preferences
    (b) food preferences
(3) ENTERTAINMENT
    (a) movie preferences
    (b) sports preferences
(4) TRAVEL
    (a) weather forecasts
    (b) airline preferences
    (c) hotel preferences
    (d) car rental preferences If the user selects the option of (c) REQUEST A RECOMMENDATION, from the recommendation web services menu of FIG. 9A, then the REQUEST A RECOMMENDATION sub menu is displayed on the wireless device, as is shown in FIGS. 16E and 16F. The options presented to the user in the REQUEST A RECOMMENDATION sub menu are activity categories. The activity categories are displayed as follows:

(1) AUTOMOBILE ACTIVITIES
    (a) request day time radio recommendation
    (b) request night time radio recommendation
    (c) request map recommendation
    (d) request service station recommendation
(2) DINING ACTIVITIES
    (a) request restaurant recommendation
    (b) request food recommendation
(3) ENTERTAINMENT ACTIVITIES
    (a) request movie recommendation
    (b) request sports recommendation
(4) TRAVEL ACTIVITIES
    (a) request weather forecasts
    (b) request airline recommendation
    (c) request hotel recommendation
    (d) request car rental recommendation If the user selects the option of DINING ACTIVITIES and specifically "request restaurant recommendation" in the browser 801 of FIG. 16E, then the wireless device 800 proceeds to interact with the network server 826, to produce the result of the browser 801 displaying the page shown in FIG. 16G. As is seen in FIG. 16G, the user selected activity of "DINING-restaurant" is coupled with the context that the wireless device 800 determines to exist at the present time in the vicinity of the wireless device 800. The activity coupled with a description of the current context, is transmitted from the wireless device 800 to the network server 826. There at the server 826, context-activity pairs in the database 830 are approximately matched to the current context-activity pair received from the device 800, and the server accesses associated recommendations that are stored in the database 830. The associated recommendations are then transmitted back to the device 800. The user can thereafter initiate access to the digital services via short-cut or other user input form. For short cuts, the user selects or inputs a desired service, such as via URL address. The wireless device 800 compares the service with past used services at and determines whether this is the first time the service has been accessed. If not, the wireless device 800 proceeds to accesses the service. A database may be maintained by wireless device 800 and/or network server 826, in which user short-cuts are maintained for each service. As shown, a database may store a service name, a service access mode, a host address/channel, short-cuts for the host address/channel, extensions (e.g., service name) and short-cuts for the extensions. For example, a user seeking to access the service at "yahoomobile.com/news/world.wml" would employ the shortcut command: "yahoomobile" then "worldnews".

Bookmark/Short-Cut Example

An operational example of wireless device 800 employing, locally or remotely, a service recommendation subsystem in combination with bookmarking subsystem is discussed below with reference to FIGS. 8 and 3H through 3J. A user initiates a browsing operation via the browser 801 to trigger a recommendation process to be performed locally at the wireless device 800 or remotely at network server 826 (discussed in greater detail above). In either case, a subset of recommended digital services are determined from a plurality of digital services (which may be quite a large set) based on user-related filter criteria, such as a current context. The subset of recommended services reflects those services the user would likely desire, preferably with a high probability, in the current context.

For instance, a user, such as a business person, operating his or her wireless device 800 between 11:00 AM-2:00 PM on Wall St. during the daytime at a temperature between 15° C.-25° C. and a speed between 0-50 kph at 1:00 pm may be provided with the following recommended services:

---

Host: wap.yahooMobile.com
Services (address):
   -world news (/news/world.wml)
   -business news (/news/business.wml)
   -F1 news (/sports/f1/news.wml)
Host: wap.business.com
Services (address):
   -on-line news (/online.wml)
   -main news (/index.wml)
   -stock quotes: Nokia (/stocks/quotes.pl?ticker=NOK)
Host: wap.f1-forum.com
Services (address):
   -news (/news.wml)
   -results (/results.wml)
   -table (/table.wml)
Host: wap.weatherOnLine.com:
Services:
   -Helsinki tomorrow (/forecast.pl?city=Helsinki&day=+1)

---

The recommended services may be outputted, audibly and/or visibly, in a menu form (if desired) to the user. Thereafter, the user selects the following browsing command (host, service): "f1-forum, news". The command may be a touchscreen link, or an icon, located on the display 802. The bookmark/shortcut engine (855 or 856) identifies the host and service commands by comparing the commands to the limited set of most probable host and service alternatives and informs the browser 801 which service should be loaded, e.g., wap.f1-forum.com/news.wml.

Figure 9H:
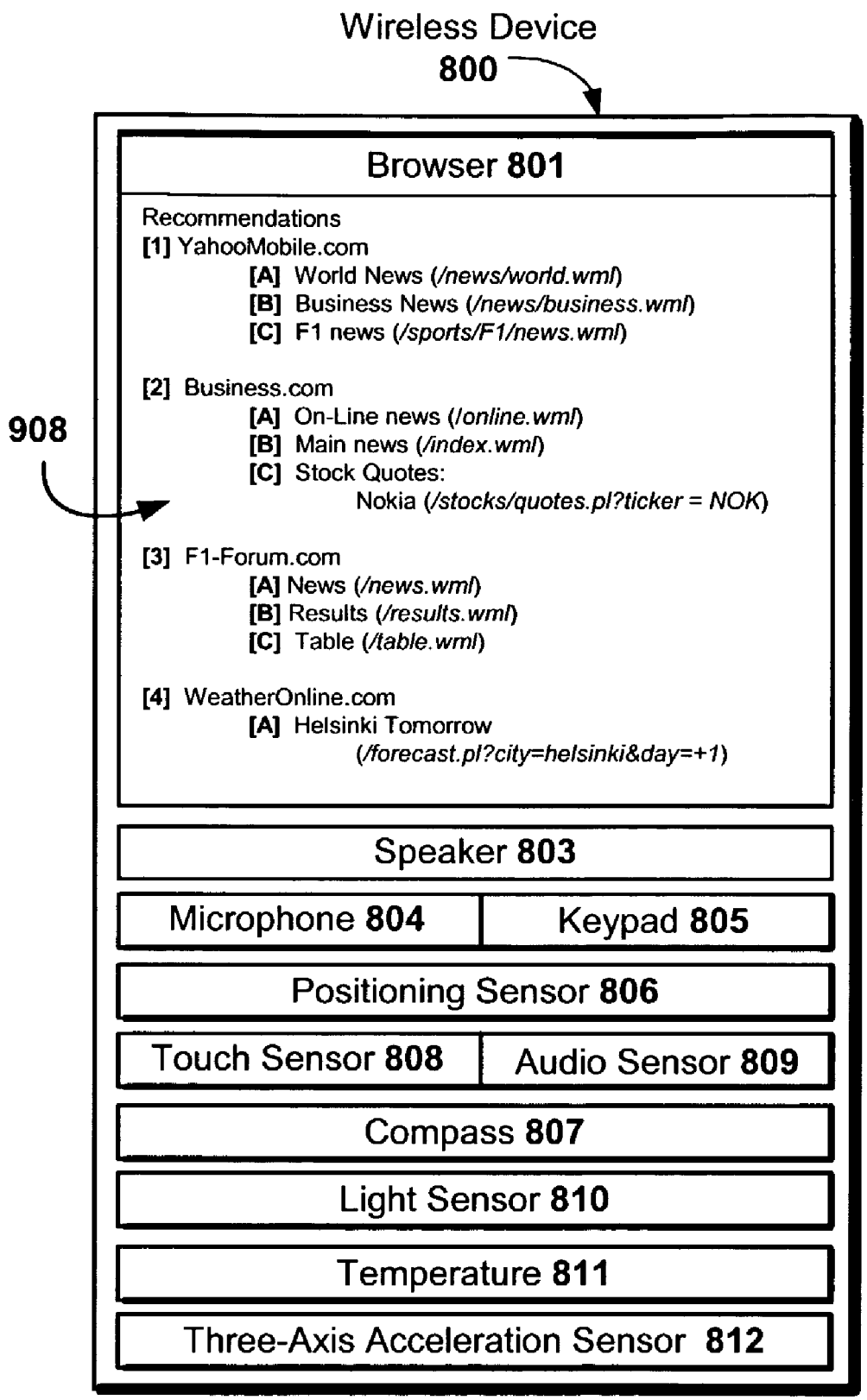
FIG. 9H show an example of the user's wireless device displaying recommendation results in a menu form FIGS. 9I and J show examples of the user's wireless device displaying recommendation results in a hierarchical menu form.

One example of such a menu is shown in FIG. 9H in which both the host and service names are displayed for selection by the user. Another example of such a menu is shown in FIGS.

Figure 9J:
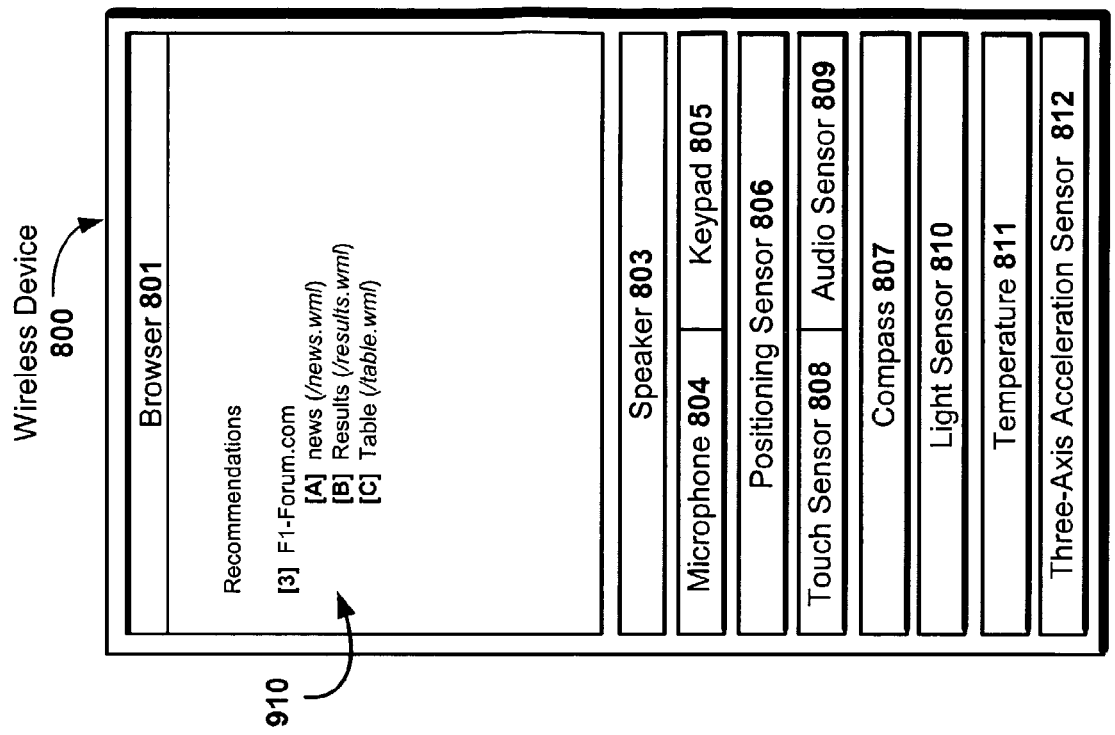
FIGS. 9B and C show an example of the user's wireless device displaying the SELECT SERVICE CATEGORY sub-menu and the ENTER SPECIAL SERVICE REQUIREMENTS sub-menu, respectively.
FIGS. 9D and E show an example of the user's wireless device displaying the CHANGE STORED SERVICE PREFERENCES sub-menu and the CHANGE PRIVACY FILTER SETTINGS sub-menu, respectively.
FIGS. 9F and 9G show an example of the user's wireless device displaying the recommendation results, for recommendations with no age restriction filter and for recommendations with a filter for family oriented subject matter, respectively.
Figure 9I:
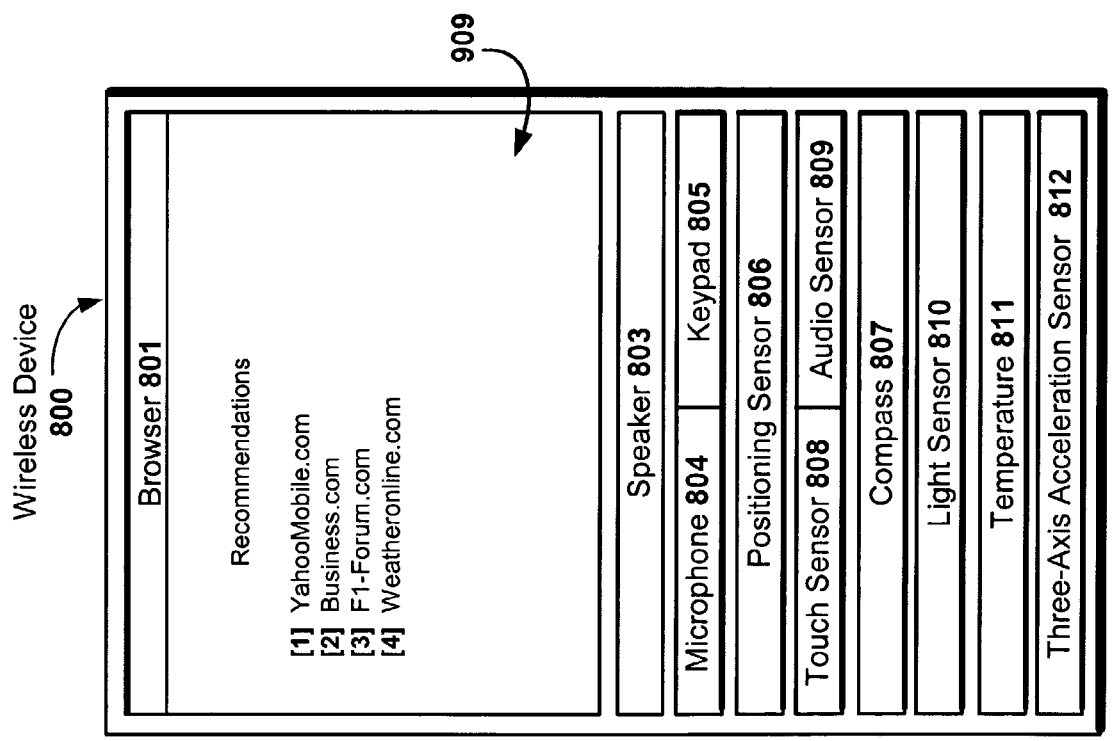

9I-J in which FIG. 9I shows an initial menu of the host names of the recommended services and FIG. 9J shows a subsequent menu of the service name of the selected host name. In this example, the user may access the home page of a service site by an initial command, and then browse the service extensions of the site through addition commands. Such an arrangement provides a multi-layered access arrangement to reduce further the range of short-cuts to be processed, as well as providing multi-modal input functionality in initial service access and subsequent browsing.

Another embodiment includes the automatic delivery of bookmarked short-cuts to a wireless device according to the history log and sensor information. Using the teachings shown above, log formats may me algorythmically (or manually) organized to provide information of matters like: service name, URL (host port, path, filename), number of times accessed, time of last/first access, links to other URL's, derived information on the service, and metadata received from the service. The information can be averaged or compressed with context information on other factors as well, e.g.: date and time, geographical/logical terminal location (e.g., office, home, airport, etc.—logical information may also include available BlueTooth™ devices), type of network connection (e.g., GPRS, WCDMA, BlueTooth™, including capacity, quality, supported network services, etc.), operational mode of the device (e.g. selected profile: "meeting", "silent", "outdoors", etc.), or other information, including sensor data or other context information. The logs may be also configured to contain one row per service instead of one row per request, in order to reduce the amount of stored information.

Thus, as an example, a user may obtain bus schedules and read daily news services (e.g., Yahoo!™, Wall Street Journal) when travelling to work. Under an embodiment of the present invention, the wireless device 800 or server 826 would organize the bookmarks or links accordance to the service accessed, and the time of day the service was accessed. Once enabled by the user, the links or bookmarks most often used by the user for that time of day would be presented for user selection. As the time of day changes, the bookmarks or links shown to the user may change as well. It is understood in the teachings of the invention that a multitude of content/context combinations may be made, and preferences may be organized or set as rules for presentation. As an example, the following list shows a portion of the types of preference combinations that may be made:

(1) prefer services in which the number of embedded link "hops" in the content is large, calculated by the number of links that need to be followed to be able to parse from one service to the next (to maximize the efficiency of saved browsing efforts);
(2) prefer service for which the number of embedded link "hops" in the content is small (to increase the probability of recommending the desired service);
(3) prefer links that contain links to the largest number of services (to reduce the number of recommendation);
(4) prefer services that cannot be used by following the known links from a current service (to avoid unnecessary bookmarking);
(5) prefer services that can be used by following the known link from the current service (to link to other services embedded within link);
(6) prefer services that are located in the same host as the current service;
(7) prefer services that are not located in the same host as the current service;
(8) prefer services that have high access frequencies from current service (to increase accuracy);
(9) prefer services that have been recently accessed (to recommend services of importance to the user);
(10) prefer services that have not been recently accessed (to refresh previously used services);
(11) prefer services that have been recently accessed for the first time (to improve the adaptivity of the recommendations);
(12) prefer services that have dynamic or static content (to better recommend types of services);
(13) exclude services that can be accessed using a hypertext link from the current service (to reduce the number of recommendations);
(14) exclude services visited during the current session.

Although illustrative embodiments have been described herein in detail, it should be noted and understood that the descriptions and drawings have been provided for purposes of illustration only and that other variations both in form and detail can be made thereupon without departing from the spirit and scope of the invention. The terms and expressions have been used as terms of description and not terms of limitation. There is no limitation to use the terms or expressions to exclude any equivalents of features shown and described or portions thereof.

What is claimed is:

1. A method comprising:
obtaining network activity data comprising services previously accessed by a user, including context information describing sensed environment of a wireless device based on sensor data from a plurality of sensors, and short-cut data describing at least one bookmark for said wireless device, along with at least one preference instruction for describing services accessed by the user and related to the user's usage of the services;
processing the network activity data in accordance with the at least one preference instruction; and
generating in a recommendation engine in the wireless device, in accordance with the at least one preference instruction, at least one recommended service from a plurality of services available, wherein each of the at least one recommended service having at least one short-cut associated therewith.

2. The method according to claim 1, wherein the preference instruction is correlated to the network activity data.

3. The method according to claim 1, wherein said bookmark is further processed and transmitted as an icon.

4. The method according to claim 2, wherein the preference instruction comprises access times for services.

5. The method according to claim 2, wherein the preference instruction comprises optimizing the number of links embedded within the at least one service.

6. The method according to claim 2, wherein the preference instruction comprises optimizing links to a specified number of services.

7. The method according to claim 2, wherein the preference instruction comprises services that cannot be used by following the known links from a current service.

8. The method according to claim 2, wherein the preference instruction comprises services that can be used by following a known link from a current service being accessed.

9. The method according to claim 2, wherein the preference instruction comprises services that are located in the same host as a current service being accessed.

10. The method according to claim 2, wherein the preference instruction comprises services that are not located in the same host as a current service being accessed.

11. The method according to claim 2, wherein the preference instruction comprises access frequency of the services.

12. The method according to claim 2, wherein the preference instruction comprises services that are accessed for the first time.

13. The method according to claim 2, wherein the preference instruction comprises services that can be accessed using a hypertext link from the current service.

14. The method according to claim 2, wherein the preference instruction comprises services that are currently accessed.

15. The method according to claim 13, wherein the context information comprises a currently sensed environment of the wireless device.

16. The method according to claim 15, wherein the currently sensed environment is established through at least one sensor.

17. The method according to claim 16, wherein the sensor is selected from the group consisting of a position sensor, a compass, a touch sensor, an audio sensor, a light sensor and a temperature sensor.

18. The method according to claim 1, wherein the context information comprises a currently sensed network access point of the wireless device.

19. The method according to claim 1, wherein said short-cut data is transmitted in an XML format.

20. The method according to claim 1, wherein the context information comprises a time of day.

21. The method according to claim 1, wherein the context information comprises a day of the week.

22. The method according to claim 1, wherein the context information comprises a logical terminal location.

23. The method according to claim 1 wherein the context information comprises a type of network connection.

24. The method according to claim 1, wherein the context information comprises an operational mode of the device.

25. Apparatus comprising:
a network access apparatus for receiving network activity data comprising services previously accessed by a user, including context information describing sensed environment of a wireless device based on sensor data from a plurality of sensors, and short-cut data describing at least one bookmark for said wireless device, along with at least one preference instruction for describing services accessed by the user and related to the user's usage of the services;
a storage memory, coupled to the network access apparatus, for storing the network activity data, short-cut data and at least one preference instruction;
a processor, coupled to the network access apparatus, wherein said processor processes network activity data in accordance with the at least one preference instruction, and
a recommendation engine initiates transmission of at least one recommended service from plurality of services available to the wireless device in accordance with the at least one preference instruction, wherein each of the at least one recommended service having at least one short-cut associated therewith.

26. The apparatus according to claim 25, wherein the preference instruction is correlated to the network activity data.

27. The apparatus according to claim 25, wherein said bookmark is further processed and transmitted as an icon.

28. The apparatus according to claim 25, wherein the network activity data further comprises context information.

29. The apparatus according to claim 26, wherein the preference instruction comprises access times for services.

30. The apparatus according to claim 26, wherein the preference instruction comprises the number of links embedded within the at least one service.

31. The apparatus according to claim 26, wherein the preference instruction comprises links to a specified number of services.

32. The apparatus according to claim 26, wherein the preference instruction comprises services with that cannot be used by following the known links from a current service.

33. The apparatus according to claim 26, wherein the preference instruction comprises services that can be used by following a known link from a current service being accessed.

34. The apparatus according to claim 26, wherein the preference instruction comprises services that are located in the same host as a current service being accessed.

35. The apparatus according to claim 26, wherein the preference instruction comprises services that are not located in the same host as a current service being accessed.

36. The apparatus according to claim 26, wherein the preference instruction comprises access frequency of the services.

37. The apparatus according to claim 26, wherein the preference instruction comprises services that are accessed for the first time.

38. The apparatus according to claim 26, wherein the preference instruction comprises services that can be accessed using a hypertext link from the current service.

39. The apparatus according to claim 26, wherein the preference instruction comprises services that are currently accessed.

40. The apparatus according to claim 25, wherein the context information comprises a currently sensed environment of the wireless device.

41. The apparatus according to claim 40, wherein the currently sensed environment is established through at least one sensor.

42. The apparatus according to claim 41, wherein the sensor is selected from the group consisting of a position sensor, a compass, a touch sensor, an audio sensor, a light sensor and a temperature sensor.

43. The apparatus according to claim 26, wherein the context information comprises a currently sensed network access point of the wireless device.

44. The apparatus according to claim 25, wherein said short-cut data is transmitted in an XML format.

45. The apparatus according to claim 25, wherein the context information comprises a time of day.

46. The apparatus according to claim 25, wherein the context information comprises a day of the week.

47. The apparatus according to claim 25, wherein the context information comprises a logical terminal location.

48. The apparatus according to claim 25, wherein the context information comprises a type of network connection.

49. The apparatus according to claim 25, wherein the context information comprises an operational mode of the device.

50. A method comprising:
storing at least one preference instruction for describing services accessed by a user and related to a user's usage of the services for said wireless device for obtaining recommendation services;
obtaining network activity data comprising services previously accessed by a user, including context information describing sensed environment of a wireless device based on sensor data from a plurality of sensors, and short-cut data describing at least one bookmark for said wireless device;

processing network activity data and short-cut data in accordance with the at least one preference instruction; and receiving from a recommendation engine at least one recommended service from a plurality of services available in accordance with the processed data, wherein each of the at least one recommended service having at least one short-cut associated therewith.

51. The method according to claim 50, wherein the preference instruction is correlated to the network activity data.

52. The method according to claim 50, wherein said bookmark is further processed and transmitted as an icon.

53. The method according to claim 51, wherein the preference instruction comprises access times for services.

54. The method according to claim 51, wherein the preference instruction comprises the number of links embedded within the at least one service.

55. The method according to claim 51, wherein the preference instruction comprises links to a specified number of services.

56. The method according to claim 51, wherein the preference instruction comprises services that cannot be used by following the known links from a current service.

57. The method according to claim 51, wherein the preference instruction comprises services that can be used by following a known link from a current service being accessed.

58. The method according to claim 51, wherein the preference instruction comprises services that are located in the same host as a current service being accessed.

59. The method according to claim 51, wherein the preference instruction comprises services that are not located in the same host as a current service being accessed.

60. The method according to claim 51, wherein the preference instruction comprises access frequency of the services.

61. The method according to claim 51, wherein the preference instruction comprises services that are accessed for the first time.

62. The method according to claim 51, wherein the preference instruction comprises services that can be accessed using a hypertext link from the current service.

63. The method according to claim 51, wherein the preference instruction comprises services that are currently accessed.

64. The method according to claim 50, wherein the context information comprises a currently sensed environment of the wireless device.

65. The method according to claim 64, wherein the currently sensed environment is established through at least one sensor.

66. The method according to claim 65, wherein the sensor is selected from the group consisting of a position sensor, a compass, a touch sensor, an audio sensor, a light sensor and a temperature sensor.

67. The method according to claim 50, wherein the context information comprises a currently sensed network access point of the wireless device.

68. The method according to claim 50, wherein said short-cut data is transmitted in an XML format.

69. The method according to claim 50, wherein the context information comprises a time of day.

70. The method according to claim 50, wherein the context information comprises a day of the week.

71. The method according to claim 50, wherein the context information comprises a logical terminal location.

72. The method according to claim 50, wherein the context information comprises a type of network connection.

73. The method according to claim 50, wherein the context information comprises an operational mode of the device.

74. A wireless device comprising:
a storage memory for storing at least one preference instruction for describing services accessed by a user and related to the user's usage of the services for a wireless device for obtaining recommendation services;
a network access apparatus comprising services previously accessed by a user for communicating network activity data, including context information describing sensed environment of the wireless device based on sensor data from a plurality of sensors, and short-cut data describing at least one bookmark for said wireless device and the at least one preference instruction; and
a processor for processing network activity data and short-cut data in accordance with the at least one preference instruction, wherein said network access apparatus receives from a recommendation engine at least one recommended service from a plurality of services available in accordance with the processed data, wherein each of the at least one recommended service having at least one short-cut associated therewith.

75. The wireless device according to claim 74, wherein the preference instruction is correlated to the network activity data.

76. The wireless device according to claim 74, wherein said bookmark is further processed and transmitted as an icon.

77. The wireless device according to claim 75, wherein the preference instruction comprises access times for services.

78. The wireless device according to claim 75, wherein the preference instruction comprises the number of links embedded within the at least one service.

79. The wireless device according to claim 75, wherein the preference instruction comprises links to a specified number of services.

80. The wireless device according to claim 75, wherein the preference instruction comprises services that cannot be used by following the known links from a current service.

81. The wireless device according to claim 75, wherein the preference instruction comprises services that can be used by following a known link from a current service being accessed.

82. The wireless device according to claim 75, wherein the preference instruction comprises services that are located in the same host as a current service being accessed.

83. The wireless device according to claim 75, wherein the preference instruction comprises services that are not located in the same host as a current service being accessed.

84. The wireless device according to claim 75, wherein the preference instruction comprises access frequency of the services.

85. The wireless device according to claim 75, wherein the preference instruction comprises services that are accessed for the first time.

86. The wireless device according to claim 75, wherein the preference instruction comprises services that can be accessed using a hypertext link from the current service.

87. The wireless device according to claim 75, wherein the preference instruction comprises services that are currently accessed.

88. The wireless device according to claim 74 wherein the context information comprises a currently sensed environment of the wireless device.

89. The wireless device according to claim 88, wherein the currently sensed environment is established through at least one sensor.

90. The wireless device according to claim 89, wherein the sensor is selected from the group consisting of a position sensor, a compass, a touch sensor, an audio sensor, a light sensor and a temperature sensor.

91. The wireless device according to claim 74, wherein the context information comprises a currently sensed network access point of the wireless device.

92. The wireless device according to claim 74, wherein said short-cut data is transmitted in an XML format.

93. The wireless device according to claim 74, wherein the context information comprises a time of day.

94. The wireless device according to claim 74, wherein the context information comprises a day of the week.

95. The wireless device according to claim 74, wherein the context information comprises a logical terminal location.

96. The wireless device according to claim 74, wherein the context information comprises a type of network connection.

97. The wireless device according to claim 74, wherein the context information comprises an operational mode of the device.

98. A computer readable memory containing program instructions, executable in a computer system, for enabling user access to services through a wireless device and providing a recommendation service, comprising:

program instructions for obtaining network activity data comprising services previously accessed by a user, including context information describing sensed environment of a wireless device based on sensor data from a plurality of sensors, and short-cut data describing at least one bookmark for said wireless device, along with at least one preference instruction for describing services accessed by the user and related to a user's usage of the services;

program instructions for processing the network activity data in accordance with the at least one preference instruction; and program instructions for generating in a recommendation engine in the wireless device, in accordance with the at least one preference instruction, at least one recommended service from a plurality of services available, wherein each of the at least one recommended service having at least one short-cut associated therewith.

\* \* \* \* \*